US011673126B2

(12) United States Patent
Takeda et al.

(10) Patent No.: US 11,673,126 B2
(45) Date of Patent: Jun. 13, 2023

(54) CLUSTER-SUPPORTING POROUS CARRIER AND METHOD FOR PRODUCING SAME

(71) Applicants: TOYOTA JIDOSHA KABUSHIKI KAISHA, Toyota (JP); GENESIS RESEARCH INSTITUTE, INC., Nagoya (JP)

(72) Inventors: Yoshihiro Takeda, Nagoya (JP); Namiki Toyama, Nagoya (JP); Kazuhiro Egashira, Nagoya (JP); Toshiaki Tanaka, Nagoya (JP); Seitoku Ito, Nagoya (JP); Masahiko Ichihashi, Nagoya (JP)

(73) Assignees: TOYOTA JIDOSHA KABUSHIKI KAISHA, Toyota (JP); GENESIS RESEARCH INSTITUTE, INC., Nagoya (JP)

( * ) Notice: Subject to any disclaimer, the term of this patent is extended or adjusted under 35 U.S.C. 154(b) by 144 days.

(21) Appl. No.: 16/620,055

(22) PCT Filed: Jun. 27, 2018

(86) PCT No.: PCT/JP2018/024459
§ 371 (c)(1),
(2) Date: Dec. 6, 2019

(87) PCT Pub. No.: WO2019/004318
PCT Pub. Date: Jan. 3, 2019

(65) Prior Publication Data
US 2021/0077986 A1 Mar. 18, 2021

(30) Foreign Application Priority Data

Jun. 27, 2017 (JP) .............................. JP2017-125685

(51) Int. Cl.
*B01J 35/00* (2006.01)
*B01J 29/44* (2006.01)
*B01D 53/86* (2006.01)
*B01J 29/46* (2006.01)
*B01J 37/34* (2006.01)
*F01N 3/10* (2006.01)

(52) U.S. Cl.
CPC .............. *B01J 29/44* (2013.01); *B01D 53/86* (2013.01); *B01J 29/46* (2013.01); *B01J 35/0006* (2013.01); *B01J 37/349* (2013.01); *F01N 3/10* (2013.01)

(58) Field of Classification Search
None
See application file for complete search history.

(56) References Cited

U.S. PATENT DOCUMENTS

| | | | |
|---|---|---|---|
| 4,552,855 A | 11/1985 | Ozin et al. | |
| 6,210,563 B1 | 4/2001 | Tsao et al. | |
| 6,362,123 B1 | 3/2002 | Tsao et al. | |
| 6,419,998 B1* | 7/2002 | McGrath | B01J 35/0013 427/523 |
| 6,908,874 B2* | 6/2005 | Woodhead | A24D 1/02 502/65 |
| 9,150,486 B2 | 10/2015 | Geboers et al. | |
| 11,014,073 B2 | 5/2021 | Egashira et al. | |
| 2004/0001782 A1* | 1/2004 | Kumar | B01J 35/04 422/177 |
| 2005/0092132 A1* | 5/2005 | Hirata | B22F 9/14 75/346 |
| 2007/0227351 A1 | 10/2007 | Garcia-Martinez | |
| 2011/0065025 A1* | 3/2011 | Yu | B01J 35/006 502/309 |
| 2012/0010453 A1 | 1/2012 | Ohkubo et al. | |
| 2012/0077672 A1* | 3/2012 | Chu | H01M 4/925 977/773 |
| 2012/0301363 A1* | 11/2012 | Kim | B01J 35/06 502/343 |
| 2013/0189607 A1* | 7/2013 | Sakai | H01M 4/8657 429/535 |
| 2013/0274096 A1* | 10/2013 | Wu | B01J 37/0045 502/304 |

(Continued)

FOREIGN PATENT DOCUMENTS

JP    S59132940 A      7/1984
JP    63109159    *    5/1988

(Continued)

OTHER PUBLICATIONS

Partial translation of Written Opinion of the International Searching Authority, International Application No. PCT/JP2018/024459, dated Sep. 11, 2018.
Carlsson et al., "The Structure of Iron Oxide Implanted Zeolite Y, Determined by High-Resolution Electron Microscopy and Refined with Selected Area Electron Diffraction Amplitudes," Chem. Eur. J. 1999, 5, No. 1, 244-249.
Okamoto et al., "Structure of intrazeolite molybdenum oxide clusters and their catalysis of the oxidation of ethyl alcohol," Phys. Chem. Chem. Phys., 2002, 4, 2852-2862.
Okamura et al., "Energy-Dispersive XAFS Studies on the Spontaneous Dispersion of PdO and the Formation of Stable Pd Clusters in Zeolites," J. Phys. Chem. B, 2004, 108, 6250-6255.

(Continued)

*Primary Examiner* — Sheng H Davis
(74) *Attorney, Agent, or Firm* — Dickinson Wright, PLLC

(57) ABSTRACT

There is provided a cluster-supporting porous carrier having improved heat resistance and/or catalytic activity, and a method for producing it. The cluster-supporting porous carrier of the invention has porous carrier particles (20) such as zeolite particles, and metal oxide clusters (16) supported within the pores of the porous carrier particles. The method of the invention for producing the cluster-supporting porous carrier includes providing a dispersion containing a dispersing medium (11) and porous carrier particles dispersed in the dispersing medium, forming positively charged metal oxide clusters (16) in the dispersion, and supporting the metal oxide clusters within the pores of the porous carrier particles (20) by electrostatic interaction.

9 Claims, 30 Drawing Sheets

(56) References Cited

U.S. PATENT DOCUMENTS

| | | | |
|---|---|---|---|
| 2013/0281284 A1 | 10/2013 | Matsuo et al. | |
| 2014/0128246 A1* | 5/2014 | Garcia-Martinez | C10G 47/16 502/73 |
| 2014/0303266 A1 | 10/2014 | Hyman | |
| 2014/0342902 A1 | 11/2014 | Osaki et al. | |
| 2019/0001306 A1 | 1/2019 | Takeda et al. | |

FOREIGN PATENT DOCUMENTS

| | | | |
|---|---|---|---|
| JP | 2002534558 A | 10/2002 | |
| JP | 2006212464 A | 8/2006 | |
| JP | 2010-069415 A | 4/2010 | |
| JP | 2012148272 A | 8/2012 | |
| JP | 2013-146697 A | 8/2013 | |
| JP | 2014-534902 A | 12/2014 | |
| WO | 9111501 A1 | 8/1991 | |
| WO | 0040676 A1 | 7/2000 | |
| WO | 2016/066869 A1 | 5/2016 | |
| WO | 2017/115767 A1 | 7/2017 | |

OTHER PUBLICATIONS

Sebastian Grundner et al., "Single-site trinuclear copper oxygen clusters in mordenite for selective conversion of methane to methanol," Nature Communications, 2015, vol. 6, Article No. 7546, pp. 1-9.

Ortalan V, et al. Abstract of "Direct imaging of single metal atoms and clusters in the pores of dealuminated HY zeolite", Nat Nanotechnol. 2010, 7, p. 506.

Guzman et al. "Supported molecular catalysts: metal complexes and clusters on oxides and zeolites", 2003, pp. 3303-3318. (Jun. 16, 2003).

Semaltianos N.G., "Nanoparticles by Laser Ablation of Bulk Target Materials in Liquids", pp. 67-92, From: Handbook of Nanoparticles, 2016.

Juan C. Fierro-Gonzalez, et al., "Gold Nanoclusters Entrapped in the α-Cages of Y Zeolites: Structural Characterization by X-ray Absorption Spectroscopy", The Journal of Physical Chemistry C, 2007, vol. 111, p. 6645-6651. (Mar. 2, 2007).

Ann J. Liang, et al., "Time-Resolved Structural Characterization of Formation and Break-up of Rhodium Clusters Supported in Highly Dealuminated Y Zeolite", The Journal of Physical Chemistry C, 2008, vol. 112, p. 18039-18049.

O. P. Tkachenko, et al., "Reduction of Copper in Porous Matrixes. Stepwise and Autocatalytic Reduction Routes", The Journal of Physical Chemistry B, 2005, vol. 109, p. 20979-20988.

Salim Caliskan, et al., Zeolite confined rhodium(O) nanoclusters as highly active, reusable, and long-lived catalyst in the methanolysis of ammonia-borane, Applied Catalysis B: Environmental, 93: 387-394. (Oct. 29, 2009).

Shuichi Hashimoto, et al., "Fabrication of Gold Nanoparticle-Doped Zeolite L Crystals and Characterization by Optical Microscopy: Laser Ablation- and Crystallization Inclusion-Based Approach", American Chemical Society, 39 (112): 15089-15093. (Sep. 5, 2008).

Egashira et al., U.S. Appl. No. 16/018,497, Office Action dated Aug. 23, 2019.

Egashira et al., U.S. Appl. No. 16/018,497, Office Action dated Mar. 4, 2020.

Egashira et al., U.S. Appl. No. 16/018,497, Office Action dated Aug. 11, 2020.

Egashira et al., U.S. Appl. No. 16/018,497, Office Action dated Oct. 19, 2020.

Egashira et al., U.S. Appl. No. 16/018,497, Notice of Allowance dated Apr. 8, 2021.

* cited by examiner (a)

(b)

(a)

(b)

(a)

(b)

(a)

(b)

(a)

(b)

(a)

(b)

(a)

(b)

(a)

(b)

(a)

(b)

CLUSTER-SUPPORTING POROUS CARRIER AND METHOD FOR PRODUCING SAME

FIELD

The present invention relates to a cluster-supporting porous carrier and a method for producing same, and specifically to a cluster-supporting porous carrier to be used as a catalyst for exhaust gas purification, liquid phase chemical synthesis reaction, gas phase chemical synthesis reaction, fuel cell reaction and air battery reaction, and to a method for producing it.

BACKGROUND

Porous carriers such as zeolite are used as molecular sieves, ion-exchange materials, catalysts, catalyst carriers, adsorbents and the like. When zeolite is used as a catalyst or a catalyst carrier, in particular, high heat resistance is necessary so as to withstand the high temperature of catalytic reaction conditions and regeneration conditions.

Supported catalysts having catalyst metals supported on catalyst carriers are used in a wide range of fields, being employed as catalysts for exhaust gas purification, liquid phase chemical synthesis reaction, gas phase chemical synthesis reaction, fuel cell reaction and air battery reaction.

With such supported catalysts, it is known that the sizes of the catalyst metal particles supported on the catalyst carrier is important. In this regard, PTL 1 proposes a supported catalyst having catalyst metal particles with sizes of 1 nm to 10 nm supported on a carrier of alumina, silica, titania, zirconia or a combination thereof. Also, PTL 2 proposes a catalyst for nitrogen oxide, having copper ions supported on zeolite by ion-exchange. PTL 3 proposes drying palladium supported on zeolite by ion-exchange and then reducing it to form clusters to produce a cluster-supported catalyst, and using the cluster-supported catalyst in coupling reaction.

PTL 4, which was unpublished at the time of the basic application for this case, discloses a cluster-supported catalyst having porous carrier particles with acid sites, such as zeolite, and catalyst metal clusters supported within the pores of the porous carrier particles, and also a method for producing it.

Such catalysts, including exhaust gas purifying catalysts, usually employ precious metals such as platinum, palladium or rhodium as the catalyst metals. Because these precious metals are limited resources and are expensive, however, the use of base metals other than precious metals in the form of oxides has been studied, but metal oxide catalysts such as base metal oxides have lower catalytic activity than precious metal catalysts used in their metallic states.

In this regard, PTL 5 proposes homogeneously introducing a base metal supported catalyst onto the partition surfaces of a honeycomb substrate to support it, thereby effectively using the base metal as a catalyst in an exhaust gas purifying catalyst.

CITATION LIST

[Patent Literature]

[PTL 1] Japanese Unexamined Patent Publication No. 2006-212464
[PTL 2] Japanese Unexamined Patent Publication No. 2012-148272
[PTL 3] Japanese Unexamined Patent Publication No. 2010-69415
[PTL 4] International Patent Publication No. WO2017/115767
[PTL 5] Japanese Unexamined Patent Publication No. 2013-146697

SUMMARY

Technical Problem

As mentioned above, there is a need for porous carriers of zeolite and the like that have high heat resistance. Moreover, while various constructions have been proposed for using base metals as catalysts in the form of their metal oxides, there is a demand for metal oxide supporting catalysts with even further improved catalytic activity.

The present invention therefore provides a metal oxide supporting catalyst having a porous carrier such as zeolite which has high heat resistance, and having improved catalytic activity, as well as a method for producing it.

Solution to Problem

The present inventors have found that a specific metal oxide-supporting porous carrier has improved heat resistance and/or catalytic activity, and have thereupon devised the following invention.

<Aspect 1>
A cluster-supporting porous carrier having porous a carrier particles, and metal oxide clusters supported within the pores of the porous carrier particles.

<Aspect 2>
The cluster-supporting porous carrier according to aspect 1, wherein the porous carrier particles are zeolite particles.

<Aspect 3>
The cluster-supporting porous carrier according to aspect 1 or 2, wherein the metal oxide clusters are positively charged, and are supported at the acid sites within the pores of the porous carrier particles by electrostatic interaction.

<Aspect 4>
The cluster-supporting porous carrier according to any one of aspects 1 to 3, wherein the metal oxide clusters are clusters of a base metal oxide or clusters of a complex metal oxide containing the base metal.

<Aspect 5>
The cluster-supporting porous carrier according to aspect 4, wherein the metal oxide clusters are clusters of an oxide of a metal selected from the group consisting of cerium, zirconium, manganese, molybdenum, vanadium, aluminum and their combinations, or clusters of a complex oxide including such metals.

<Aspect 6>
The cluster-supporting porous carrier according to aspect 5, wherein the metal oxide clusters are selected from the group consisting of ceria-zirconia complex oxide, alumina-ceria-zirconia complex oxide, ceria-zirconia-lanthanum oxide-yttrium oxide complex oxide and alumina-ceria-zirconia-lanthanum oxide-yttrium oxide complex oxide.

<Aspect 7>
The cluster-supporting porous carrier according to any one of aspects 1 to 6, which additionally has catalyst metal clusters supported within the pores of the porous carrier particles.

<Aspect 8>
A cluster-supporting porous carrier wherein:
a metal oxide cluster-supporting porous carrier according to any one of aspects 1 to 7, and a metal cluster-supporting porous carrier are mixed together, and the metal cluster-supporting porous carrier has porous carrier particles and catalyst metal clusters supported within the pores of the porous carrier particles.

<Aspect 9>

The cluster-supporting porous carrier according to aspect 7 or 8, wherein the catalyst metal clusters are positively charged, and are supported at the acid sites within the pores of the porous carrier particles by electrostatic interaction.

<Aspect 10>

The cluster-supporting porous carrier according to any one of aspects 7 to 9, wherein the catalyst metal clusters are selected from the group consisting of rhodium, palladium, platinum or copper clusters, and their combinations.

<Aspect 11>

The cluster-supporting porous carrier according to any one of aspects 1 to 9, which is to be used as a catalyst.

<Aspect 12>

The cluster-supporting porous carrier according to aspect 11, which is to be used as an exhaust gas purifying catalyst.

<Aspect 13>

The cluster-supporting porous carrier according to aspect 11, which is to be used as a catalyst for liquid phase synthesis reaction, gas phase synthesis reaction, air batteries or fuel cell reaction.

<Aspect 14>

A catalyst device having a cluster-supporting porous carrier according to any one of aspects 11 to 13, and a substrate supporting the cluster-supporting porous carrier.

<Aspect 15>

A method for producing a cluster-supporting porous carrier, wherein:

the cluster-supporting porous carrier has porous carrier particles and metal oxide clusters supported within the pores of the porous carrier particles, and the method for producing a cluster-supporting porous carrier includes the following steps:

providing a dispersion containing a dispersing medium and porous carrier particles dispersed in the dispersing medium, and forming positively charged metal oxide clusters in the dispersion and supporting the metal oxide clusters within the pores of the porous carrier particles by electrostatic interaction.

<Aspect 16>

The method according to aspect 14, wherein the metal oxide particles that are to form the metal oxide clusters are dispersed in the dispersion, and the metal oxide clusters are formed in the dispersion by a laser ablation process in which the metal oxide particles are irradiated with a laser.

<Aspect 17>

The method according to aspect 14 or 15, wherein the clusters are formed in the dispersion by one of the following methods:

submerged laser ablation,
submerged microwave ablation,
submerged plasma ablation,
plus-minus inversion, or
submerged reduction.

<Aspect 18>

The method according to aspect 16, wherein the metal ion forming the metal oxide is reduced by submerged reduction using a reducing agent to form clusters in the dispersion, and the dispersion is irradiated with plasma and/or microwaves to accelerate reduction by the reducing agent.

<Aspect 19>

The method according to any one of aspects 14 to 16, wherein the dispersing medium of the dispersion is an organic solvent.

Advantageous Effects of Invention

The cluster-supporting porous carrier of the invention can provide improved heat resistance and/or improved catalytic activity.

BRIEF DESCRIPTION OF DRAWINGS

FIG. 6($a$) shows the results for temperature increase, and FIG. 6($b$) shows the results for temperature decrease.

FIG. 7($a$) shows the results for temperature increase, and FIG. 7($b$) shows the results for temperature decrease.

FIG. 8($a$) shows the results for temperature increase, and FIG. 8($b$) shows the results for temperature decrease.

FIG. 9($a$) shows the results for temperature increase, and FIG. 9(b) shows the results for temperature decrease.

DESCRIPTION OF EMBODIMENTS

Figure 1A:
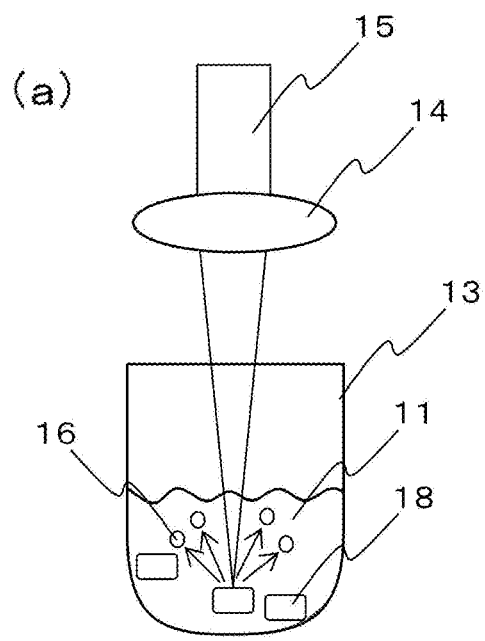
FIG. 1A is a pair of diagrams showing one aspect of the method for producing a cluster-supported catalyst according to the invention.
Figure 1A:
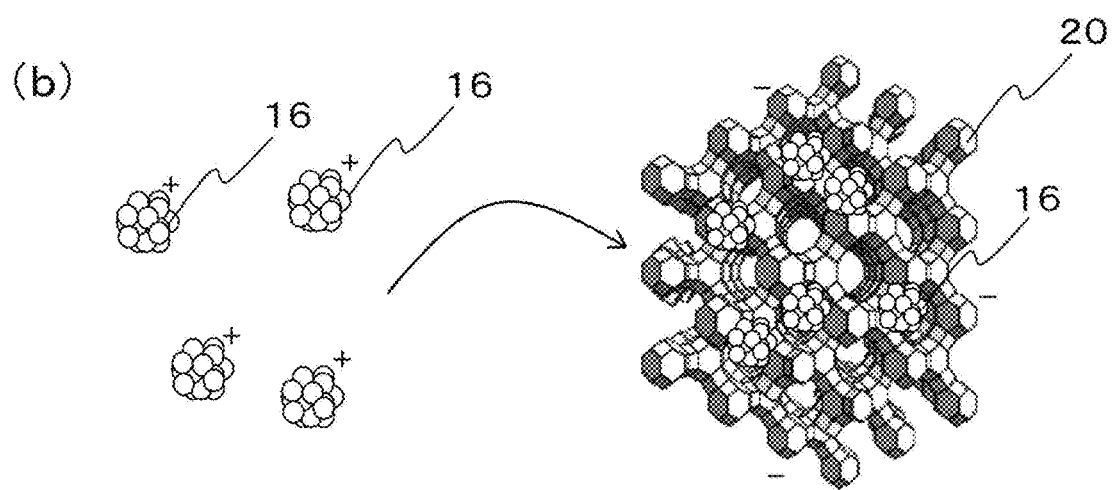

Embodiments of the invention will now be explained in detail. The present invention is not limited to the embodiments described below, and various modifications may be implemented within the scope of the gist thereof.

<Cluster-Supporting Porous Carrier>

The cluster-supporting porous carrier of the invention has a porous carrier particle, and metal oxide clusters supported within the pores of the porous carrier particle. The cluster-supporting porous carrier of the invention can be produced by the method of the invention which is described below. The cluster-supporting porous carrier of the invention may also be produced by loading metal ions onto porous carrier particles by ion-exchange, reducing the loaded metal ions with a reducing agent to form metal clusters, and then oxidizing the metal clusters by an ion-exchange/reduction/oxidation method. This oxidation step may be carried out as part of the drying step or as a separate step.

The metal oxide clusters are positively charged, and they may be supported at the acid sites within the pores of the porous carrier particles by electrostatic interaction. The cluster-supporting porous carrier of the invention can be produced by the method of the invention which is described below.

Without being limited to theory, it is believed that in the cluster-supporting porous carrier of the invention, the metal oxide provides excellent heat resistance to the porous carrier and/or the metal oxide has more excellent catalytic activity compared to metal oxides in other states because the metal oxide clusters maintain a fine state within the pores of the porous carrier, and/or because the metal oxide clusters are stably anchored within the pores of the porous carrier, and particularly because they are stably anchored at negatively charged locations within the pores, and more particularly at the acid sites within the pores.

Incidentally, the term "cluster" is generally defined as an aggregate of up to several hundred chemical species, but for the purpose of the invention, "cluster-supporting porous carrier" means a porous carrier having a cluster-containing fine metal oxide supported on carrier particles.

The cluster-supporting porous carrier of the invention is preferably used as a catalyst such as an exhaust gas purifying catalyst, a catalyst for liquid phase compound synthesis reaction, a catalyst for gas phase synthesis reaction, a catalyst for an air battery or a catalyst for a fuel cell, and as a carrier for these, and particularly as an exhaust gas purifying catalyst and its carrier.

The cluster-supporting porous carrier of the invention may additionally have catalyst metal clusters supported within the pores of the porous carrier particles.

The cluster-supporting porous carrier of the invention may be used as a mixture with other catalysts, and particularly it may be used in a form physically mixed with a catalyst having a metal cluster-supporting porous carrier, i.e. porous carrier particles and catalyst metal clusters supported within the pores of the porous carrier particles.

The catalyst metal clusters may be catalyst precious metal clusters, and specifically clusters of precious metals such as gold, silver, platinum, palladium, rhodium, iridium, ruthenium and osmium.

The method of further supporting catalyst metal clusters within the pores of the porous carrier particles of the cluster-supporting porous carrier of the invention, and the method for producing the metal cluster-supporting porous carrier, may be carried out with reference to the following description relating to the method of the invention for supporting metal oxide clusters on a porous carrier.

Using the cluster-supporting porous carrier of the invention in combination with catalyst metal clusters such as catalyst precious metal clusters, is preferred from the viewpoint of obtaining a combination of the catalytic effect of the metal oxide clusters and the catalytic effect of the catalyst metal clusters.

<Metal Oxide>

The metal oxide forming the metal oxide clusters may be an oxide of any metal or metalloid that is capable of being supported within the pores of the porous carrier. In particular, the metal oxide forming the metal oxide clusters may be any metal oxide that can improve the heat resistance of the porous carrier, such as zeolite, and/or any oxide that can be used as a catalyst for the intended purpose. The metal oxide is, for example, a base metal oxide which is an oxide of a base metal, i.e. a metal other than a precious metal, and especially a base metal oxide in which the metal is a transition metal, or a base metal oxide in which the metal is a typical metal.

Specifically, a base metal oxide in which the metal is a transition metal may be an oxide of a metal selected from the group consisting of rare earth metals, zirconium, titanium, vanadium, chromium, manganese, iron, cobalt, nickel, copper, zinc, molybdenum, tungsten and rhenium, as well as their combinations. Rare earth metals include scandium, yttrium, lanthanum, cerium, praseodymium and neodymium, and particularly cerium.

A base metal oxide wherein the metal is a typical metal (a metal other than a transition metal), may be, specifically, an oxide of a metal selected from the group consisting of aluminum, gallium, silicon, germanium, indium and tin, and their combinations.

More specifically, the metal oxide may be an oxide of a metal selected from the group consisting of cerium, manganese, molybdenum and vanadium, and their combinations, or a complex oxide including such metals. In particular, the metal oxide may be a ceria-zirconia complex oxide, or an alumina-ceria-zirconia complex oxide.

<Porous Carrier Particles>

The porous carrier particles may be any porous carrier particles that are usable for the intended purpose, and particularly they may be a porous carrier composed of an oxide of a metal or metalloid, examples being particles of materials selected from the group consisting of microporous materials, mesoporous materials, macroporous materials, and combinations thereof.

A microporous material is a porous material in which the maximum peak of the volume-based pore size distribution is in the range of greater than 0.1 nm and up to 2 nm, a mesoporous material is a porous material in which the maximum peak of the pore size distribution is in the range of greater than 2 nm and up to 50 nm, and a macroporous material is a porous material in which the maximum peak of the pore size distribution is in the range of greater than 50 nm. For the invention, the volume-based pore size distribution is the value based on nitrogen adsorption, which can be obtained by a BET system (adsorption isotherm) using a TriStar II 3020 Series automatic specific surface area/pore distribution measuring apparatus (Shimadzu Corp.), for example.

Specifically, the microporous material may be a material selected from the group consisting of active carbon, zeolite, clay silicates, and combinations thereof, for example. Zeolite particles may be zeolite derivative particles or heterogenous element-introduced zeolite particles, where the heterogenous element introduced into heterogenous element-introduced zeolite particles may be an element selected from the group consisting of boron, iron, germanium, gallium, lanthanum, titanium and combinations thereof, for example.

Zeolite particles may be any zeolite particles that can be used for the intended purpose.

Examples of zeolites include type A (LTA), ferrierite (FER), type MCM-22 (MWW), type ZSM-5 (MFI), silicalite-type, mordenite-type (MOR), type L (LTL), type Y and type X (FAU), beta-type (BEA), type SSZ (CHA), and combinations of these.

In order for the porous carrier particles to stably support the catalyst metal oxide within the pores, and/or for the activity of the supported catalyst metal oxide to be satisfactorily exhibited, a porous carrier having acid sites (that is, electron-rich sites or negatively charged sites) in the pores, such as zeolite, is preferred.

<Catalyst Device>

The catalyst device of the invention has a cluster-supporting porous carrier of the invention, a substrate supporting the cluster-supporting porous carrier, and optionally, a vessel that houses the substrate.

The substrate used in the catalyst device of the invention may be a honeycomb substrate, and especially a cordierite honeycomb substrate. The optional vessel used in the catalyst device of the invention may be a metal vessel made of stainless steel, etc.

<Method for Producing Cluster-Supporting Porous Carrier>

In the method of producing a cluster-supporting porous carrier according to the invention, a cluster-supporting porous carrier having a porous carrier particle and metal oxide clusters supported within the pores of the porous carrier particle, and particularly a cluster-supporting porous carrier of the invention, is produced.

The method includes providing a dispersion containing a dispersing medium and porous carrier particles dispersed in the dispersing medium, forming positively charged metal clusters or metal oxide clusters in the dispersion, and supporting the metal clusters or metal oxide clusters at the negatively charged sites within the pores of the porous carrier particles, and especially at the acid sites within the pores, by electrostatic action. The method may also include drying and firing the porous carrier particles that have supported the metal clusters. In this method, when metal clusters instead of metal oxide clusters are supported in the porous carrier particles, they may be subjected to oxidizing treatment to convert the metal clusters to metal oxide clusters, as necessary.

According to the method of the invention, metal or metal oxide clusters are formed in a dispersion containing porous carrier particles, and the formed metal or metal oxide clusters are supported within the pores of the porous carrier particles, thus allowing metal clusters of controlled sizes, and particularly metal or metal oxide clusters having relatively uniform sizes, to be supported within the pores of the porous carrier particles. The sizes of the metal or metal oxide clusters can be controlled by regulating the conditions for forming the metal or metal oxide clusters in the dispersion.

In the method of the invention, electrostatic interaction between the metal or metal oxide clusters and the negatively charged sites of the porous carrier particles allows the metal or metal oxide clusters to be supported within the pores of the porous carrier particles.

The electrostatic interaction allows positively charged metal or metal oxide clusters to be supported at the negatively charged sites within the pores of the porous carrier particles that are negatively charged, and particularly at the acid sites within the pores.

<Metal Oxide>

The metal oxides that may be used in the method of the invention may be any mentioned in relation to the cluster-supporting porous carrier of the invention.

<Porous Carrier Particles>

The porous carrier particles that may be used in the method of the invention may also be any mentioned in relation to the cluster-supporting porous carrier of the invention.

The porous carrier particles used in the method of the invention are preferably zeolite particles. When zeolite particles are used as the porous carrier particles, the positively charged metal or metal oxide clusters can be supported at the negatively charged sites within the pores of the negatively charged zeolite particles, and particularly at the acid sites within the pores, by electrostatic action. Therefore, the zeolite particles preferably have a relatively low zeta potential, such as a zeta potential of −50 mV or lower, −70 mV or lower, −90 mV or lower or −100 mV or lower. For the same reason, the zeolite particles preferably have relatively numerous acid sites, i.e. they preferably have a relatively small Si/(Al and B) ratio, such as a Si/(Al and B) ratio of 500 or smaller, 300 or smaller, 100 or smaller or 50 or smaller.

In the method of the invention it is possible to provide a dispersion by pulverizing porous carrier particles and dispersing the pulverized porous carrier particles in a dispersing medium.

By thus pulverizing the porous carrier particles in advance, it is possible to accelerate loading of the metal or metal oxide clusters within the pores of the porous carrier particles. Since the porous carrier particles pulverized in this manner will sometimes be rendered amorphous, the porous carrier particles may be recrystallized by annealing, if necessary, either before or after loading of the metal or metal oxide clusters.

<Dispersing Medium of Dispersion>

The dispersing medium used for the dispersion may be any dispersing medium that is able to draw the metal or metal oxide clusters into the pores of the porous carrier particles by electrostatic interaction between the metal or metal oxide clusters and the porous carrier particles, and particularly the acid sites of the porous carrier particles.

In this regard, the dispersing medium may be selected so that when the metal or metal oxide clusters are supported within the pores of the porous carrier particles by electrostatic interaction, the surfaces of the metal or metal oxide clusters are positively charged and the locations within the pores of the porous carrier particles, and particularly the acid sites within the pores of the porous carrier particles, are negatively charged. In order to accelerate loading of the metal or metal oxide clusters into the pores of the porous carrier particles, therefore, the pH of the dispersing medium may be regulated and/or a salt may be added to the dispersing medium, to adjust the zeta potential and/or the ionization rate of the metal or metal oxide clusters and/or the porous carrier particles.

While the surface potential of the metal or metal oxide clusters and the porous carrier particles cannot be directly measured, it can be indirectly determined by measuring the zeta potential (electrokinetic potential).

For example, the zeta potential of platinum clusters largely depends on the pH, the zeta potential increasing slightly with decreasing pH when the pH is 8 or lower. This is thought to occur because the platinum atoms on the surfaces of the platinum clusters are partially oxidized, the platinum atoms that have been oxidized with decreasing pH being in the form of Pt—OH, while at the same time protons are added to some of the platinum atoms on the platinum cluster surfaces to form Pt—H$^+$, resulting in higher positive charge density and thereby increasing the zeta potential.

When the pH is higher than 8, on the other hand, the zeta potential of the platinum clusters drastically decreases with increasing pH. This is thought to occur because the platinum atoms that have been oxidized with increasing pH are in the form of Pt—O$^-$, while some of the surfaces of the platinum clusters are deprotonated, resulting in lower positive charge density, and thereby lowering the zeta potential.

When electrostatic interaction is used, the dispersing medium may be either aqueous or nonaqueous, although it is generally preferred to use a nonaqueous dispersing medium such as an organic solvent. This is because if an aqueous dispersing medium is used, since water has a large dielectric constant (dielectric constant: 80), i.e. high polarity, the metal or metal oxide clusters become stabilized in the dispersing medium, often preventing adequate loading of the metal clusters within the pores of the porous carrier particles.

On the other hand, if a dispersing medium with relatively low polarity, i.e. a dispersing medium with a relatively small dielectric constant is used, the metal or metal oxide clusters will not become stabilized in the dispersing medium and can therefore be supported and stabilized by electrostatic interaction within the pores of the porous carrier particles.

Therefore, the dispersing medium used may be a dispersing medium having a smaller dielectric constant than water (dielectric constant: 80), such as a dispersing medium having a dielectric constant of 50 or less, 40 or less, 30 or less, 25 or less, or 20 or less. Specific dispersing mediums to be used include acetone (dielectric constant: 20), 2-propanol (dielectric constant: 18), ethanol (dielectric constant: 25), methanol (dielectric constant: 32) and carbon tetrachloride (dielectric constant: 2.2).

<Formation of Metal Oxide Clusters>

Metal or metal oxide clusters, and particularly positively charged metal or metal oxide clusters, can be formed in the dispersion by any desired method. The method of forming such metal clusters may be submerged laser ablation, submerged microwave ablation, a submerged plasma method, plus-minus inversion, or submerged (liquid phase) reduction.

Submerged laser ablation, submerged microwave ablation and submerged plasma ablation are methods of forming metal clusters by irradiating a laser, microwaves or plasma onto a metal or metal oxide target disposed in the dispersion, and/or the metal or metal oxide particles dispersed in the dispersion.

In a plus-minus inversion method, first a metal ion source with a minus electrical charge is combined with the porous carrier that is in a state of minus electrification in a solution, and especially an aqueous solution. The minus charges repel each other in this state, so that no ion exchanger is formed. They are introduced into the solution by focusing of a pulse laser. This causes formation of plasma at the focal site of the laser, producing various chemical species (such as ligand-removed metal ions, and positive metal ions formed by dissociation of electrons of the negative metal ion source) from the metal ion source, while neutral metal atoms also aggregate at the positive metal ions, forming positively charged metal clusters. The positively charged metal or metal oxide clusters produced in this manner are supported at the negatively charged sites, and particularly the acid sites, of the porous carrier by electrostatic interaction.

Submerged reduction is a method in which a reducing agent is used to reduce the metal ion of the metal oxide in solution, forming metal clusters.

For submerged reduction, the reducing agent used may be any reducing agent that can reduce metal ions in solution, and specifically, a hydride reducing agent such as sodium borohydride, or an alcohol such as propanol, may be used. In addition, the dispersing medium used in submerged reduction is preferably a dispersing medium that is stable with the reducing agent used, the dispersing medium being able to dissolve the metal salt that is the metal ion supply source, and the reducing agent. Therefore, the same compound may be used as both the reducing agent and the dispersing agent, and an alcohol, for example, may be used as both the reducing agent and dispersing agent.

In submerged reduction, microwaves and submerged plasma may be optionally used in addition to the reducing agent, to promote reduction of the metal ions.

In order to form metal clusters having controlled sizes, such as metal clusters having relatively uniform sizes, microwaves or submerged plasma may optionally be used in addition to the reducing agent in the submerged reduction to promote reduction of uniform metal ions in the dispersion.

The present invention will now be explained in further detail with reference to examples, with the understanding that the scope of the invention is naturally not limited to the examples or their descriptions.

EXAMPLES

Example 1 and Comparative Example 1
(Alumina-Ceria-Zirconia Complex Oxide Particles)

Example 1

Alumina-ceria-zirconia complex oxide particles (ACZ oxide particles) and zeolite carrier particles were dispersed in acetone, and the complex oxide particles were subjected to laser ablation to form alumina-ceria-zirconia complex oxide particle cluster-supporting zeolite. The ACZ oxide particles also contained lanthanum oxide and yttrium oxide, in addition to alumina, ceria and zirconia.

Specifically, as shown in FIG. 1A(a), water 11 as the dispersing medium dispersing ACZ oxide particles 18 and zeolite carrier particles (not shown), was placed in a vessel 13, and the ACZ oxide particles 18 in the water 11 were irradiated with a laser 15 through a lens 14 to form ACZ oxide clusters 16 in the water by laser ablation. At least some of the ACZ oxide clusters 16 formed in this manner were positively charged, whereby they were electrically drawn in and supported at the negatively charged sites, and especially the acid sites, of the zeolite carrier particles 20, as shown in FIG. 1A(b).

The laser light was a Nd:YAG laser fundamental wave (1064 nm, 10 Hz), with an intensity of 2 W.

The cluster-supporting carrier particles were removed from the water and dried at about 25° C. for about 1 hour, and then fired at 300° C. for 2 hours, to obtain a catalyst for Example 1 having ACZ oxide clusters supported on zeolite.

The carrier particles and laser irradiation time in Example 1 were as follows:

Carrier particles: type MFI zeolite (MFI) (Si/Al ratio: 40)
Laser irradiation time: 9 hours Comparative Example 1

The ACZ oxide particles dispersed in water for Example 1 were used directly as a catalyst for Comparative Example 1.

<Evaluation>

The ACZ oxide cluster-supporting zeolite catalyst of Example 1 and the ACZ oxide catalyst of Comparative Example 1 were subjected to oxygen pretreatment by heating at 800° C. for 30 minutes in an atmosphere of 10 vol % oxygen and the remainder helium.

The oxygen-pretreated catalysts of Example 1 and Comparative Example 1 were raised in temperature from 25° C. to 800° C. and then lowered in temperature from 800° C. to 25° C. at a rate of 10° C./min in reactive gas, and the temperature at which 50 vol % carbon monoxide (CO) was purified ($T(50\%_{CO})$) and the temperature at which 50 vol % nitrogen monoxide (NO) was purified ($T(50\%_{NO})$) were evaluated. The obtained results are shown below.

$T(50\%_{CO})$

Example 1 (ACZ oxide cluster-supporting zeolite catalyst):

389° C. (temperature increase), 374° C. (temperature decrease)

Comparative Example 1 (ACZ oxide catalyst):

511° C. (temperature increase), 482° C. (temperature decrease)

$T(50\%_{NO})$

Example 1 (ACZ oxide cluster-supporting zeolite catalyst):

376° C. (temperature increase), 344° C. (temperature decrease)

Comparative Example 1 (ACZ oxide catalyst):

(50% purification not reached) (temperature increase and decrease)

The reactive gas composition was carbon monoxide: 0.65 vol %, oxygen: 0.25 vol %, nitrogen monoxide: 0.15 vol % and helium: remainder, and the space velocity was 30,000 $h^{-1}$.

The catalyst of Example 1 used for evaluation had a total ACZ oxide cluster-supporting zeolite catalyst mass of 30 mg, of which the ACZ oxide mass was 0.95 mg. The catalyst of Comparative Example 1 used for evaluation, however, had an ACZ oxide mass of 30 mg.

As seen from these results, the ACZ oxide cluster-supporting zeolite catalyst of Example 1 had significantly superior catalytic activity compared to the common ACZ oxide catalyst of Comparative Example 1 which was not supported on zeolite.

Example 2 and Comparative Example 2
(Manganese Oxide)

Example 2

Manganese oxide cluster-supporting zeolite was produced in the same manner as Example 1, except that manganese oxide particles were used instead of ACZ oxide particles.

Comparative Example 2

The manganese oxide particles used in Example 2 were directly used as the catalyst for Comparative Example 2.
<Evaluation>
The manganese oxide cluster-supporting zeolite catalyst of Example 2 and the manganese oxide catalyst of Comparative Example 2 were evaluated for carbon monoxide and nitrogen monoxide purification, in the same manner as Example 1 and Comparative Example 1. In this case, however, evaluation was not of the temperature at which the purification rate for carbon monoxide and nitrogen monoxide was 50 vol % but rather the temperature at which the purification rate for carbon monoxide and nitrogen monoxide was 20 vol % ($T(20\%_{CO})$ and $T(20\%_{NO})$), with temperature decrease from 800° C. to room temperature. The obtained results are shown below.

$T(20\%_{CO})$

Example 2 (Manganese oxide cluster-supporting zeolite catalyst): 260° C. (temperature decrease) Comparative Example 2 (Manganese oxide catalyst): 317° C. (temperature decrease)

$T(20\%_{NO})$

Example 2 (Manganese oxide cluster-supporting zeolite catalyst): 376° C. (temperature decrease)
Comparative Example 2 (Manganese oxide catalyst): (20% purification not reached) (temperature decrease)

The catalyst of Example 3 used for evaluation had a total manganese oxide cluster-supporting zeolite catalyst mass of 30 mg, of which the manganese oxide mass was 0.24 mg. The catalyst of Comparative Example 2 used for evaluation, however, had a manganese oxide mass of 30 mg.

As seen from these results, the manganese oxide cluster-supporting zeolite catalyst of Example 1 had significantly superior catalytic activity compared to the common manganese oxide catalyst of Comparative Example 2 which was not supported on zeolite.

Reference Examples 3A and 3B, and Examples 3C-F (Preparation Example 3-1) Preparation of Rhodium Cluster-Supporting Zeolite ($Rh_{cluster}$/MFI)

Rhodium cluster-supporting zeolite was produced by laser ablation of a rhodium target in acetone.

Figure 1B:
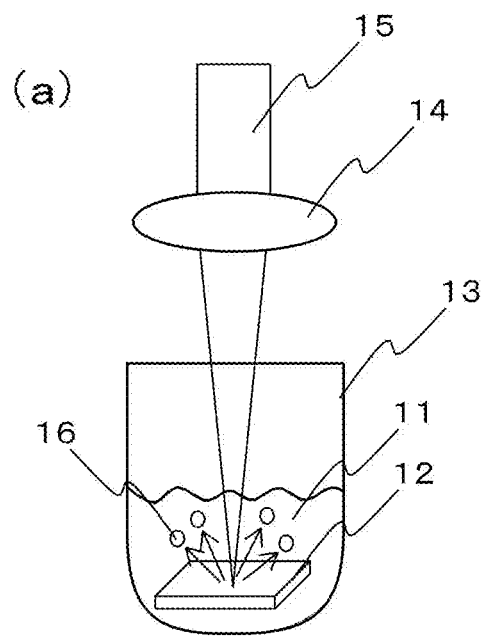
FIG. 1B is a pair of diagrams showing another aspect of the method for producing a cluster-supported catalyst according to the invention.
Figure 1B:
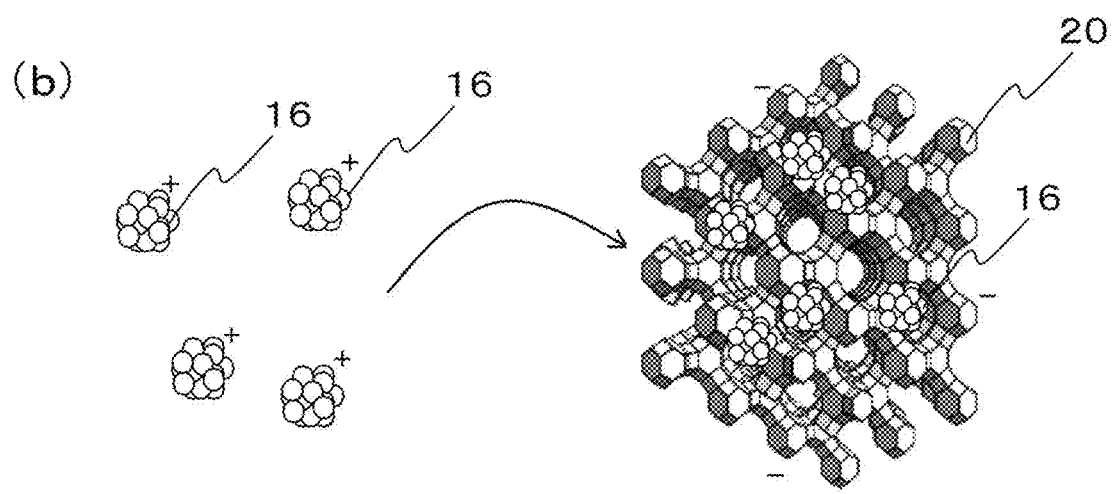

Specifically, as shown in FIG. 1B(a), acetone 11 was placed in a vessel 13, as a dispersing medium in which type ZSM-5 zeolite (MFI) (Si/Al ratio: 40) (not shown) was dispersed, a rhodium target 12 was set in the acetone 11, and the gold target 12 in the acetone 11 was irradiated with a laser 15 through a lens 14, to form rhodium clusters 16 in the acetone by laser ablation. The rhodium clusters 16 formed in this manner were positively charged, whereby they were electrically drawn in and supported at the negatively charged sites. i.e. the acid sites, of the zeolite carrier particles 20, as shown in FIG. 1B(b).

The laser light was a Nd:YAG laser fundamental wave (1064 nm, 10 Hz), with an intensity of 2 W.

The cluster-supporting carrier particles were removed from the acetone and dried at about 25° C. for about 1 hour, and then fired at 300° C. for 2 hours to obtain rhodium cluster-supporting zeolite having rhodium clusters supported on zeolite.

The laser irradiation time was as follows:
Laser irradiation time: 4 hours
Rhodium loading mass: 0.33 mass %

(Preparation Example 3-2) Preparation of Rhodium Cluster- and ACZ Oxide Cluster-Supporting Zeolite (($Rh_{cluster}$+$ACZ_{cluster}$)/MFI) (Simultaneous Contact Loading)

Rhodium cluster- and ACZ oxide cluster-supporting zeolite (simultaneous contact loading) was prepared in the same manner as Preparation Example 3-1, except that a rhodium, aluminum, cerium and zirconium target was set in the acetone.

(Preparation Example 3-3) Preparation of Ceria Cluster-Supporting Zeolite ($Ce_{cluster}$/MFI)

Ceria cluster-supporting zeolite was prepared in the same manner as Preparation Example 3-1, except that a cerium target was set in the acetone instead of a rhodium target, and the zeolite particles used were type ZSM-5 zeolite (MFI) (Si/Al ratio: 1500) instead of type ZSM-5 zeolite (MFI) (Si/Al ratio: 40).

(Preparation Example 3-4) Preparation of Rhodium Cluster- and Ceria Cluster-Supporting Zeolite (($Rh_{cluster}$+$Ce_{cluster}$)/MFI) (Simultaneous Contact Loading)

Rhodium cluster- and ceria cluster-supporting zeolite (simultaneous contact loading) was prepared in the same manner as Preparation Example 3-1, except that a rhodium target and a cerium target were set in the acetone.

(Preparation Example 3-5) Preparation of Rhodium Cluster- and Ceria Cluster-Supporting Zeolite (Sequential Contact Loading) (($Rh_{cluster}$+$Ce_{cluster}$)/MFI)

Rhodium cluster- and ceria cluster-supporting zeolite (sequential contact loading) was prepared in the same manner as Preparation Example 3-1, except that the zeolite dispersed in the acetone was rhodium cluster-supporting zeolite obtained in the same manner as Preparation Example 3-1, and a cerium target was set in the acetone instead of a rhodium target.

Reference Example 3A

Rhodium cluster-supporting zeolite ($Rh_{cluster}$/MFI) obtained in the same manner as Preparation Example 3-1 was used as a catalyst.

Reference Example 3B

Rhodium cluster-supporting zeolite ($Rh_{cluster}$/MFI) obtained in the same manner as Preparation Example 3-1 and ceria-zirconia complex oxide particles (CZ oxide particles) were physically mixed and used as a catalyst.

Example 3C

Rhodium cluster- and ACZ oxide cluster-supporting zeolite (($Rh_{cluster}$+$ACZ_{cluster}$)/MFI) (simultaneously contact loading) obtained in the same manner as Preparation Example 3-2 was used as a catalyst.

Example 3D

Rhodium cluster-supporting zeolite ($Rh_{cluster}$/MFI) obtained in the same manner as Preparation Example 3-1, and ceria cluster-supporting zeolite ($Ce_{cluster}$/MFI) obtained in the same manner as Preparation Example 3-3 were physically mixed and used as a catalyst.

Example 3E

Rhodium cluster- and ceria cluster-supporting zeolite (($Rh_{cluster}$+$Ce_{cluster}$)/MFI) (simultaneously contact loading) obtained in the same manner as Preparation Example 3-4 was used as a catalyst.

Example 3F

Rhodium cluster- and ceria cluster-supporting zeolite (($Rh_{cluster}$+$Ce_{cluster}$)/MFI) (sequential contact loading) obtained in the same manner as Preparation Example 3-5 was used as a catalyst.

<Evaluation>

The catalysts of Reference Examples 3A and B and Examples 3C to 3F were evaluated for carbon monoxide and nitrogen monoxide purification with temperature increase from 100° C. to 600° C., in the same manner as Example 1 and Comparative Example 1. The obtained results are shown below.

TABLE 1

|  |  | T (50% CO) | T (50% NO) |
|---|---|---|---|
| Reference Example 3A | $Rh_{cluster}$/MFI | 347° C. | 332° C. |
| Reference Example 3B | $Rh_{cluster}$/MFI + CZ oxide particles (physical mixture) | 313° C. | 323° C. |
| Example 3C | ($Rh_{cluster}$ + $ACZ_{cluster}$)/MFI (simultaneously contact loading) | 231° C. | 233° C. |
| Example 3D | $Rh_{cluster}$/MFI + $Ce_{cluster}$/MFI (physical mixture) | 313° C. | 305° C. |
| Example 3E | ($Rh_{cluster}$ + $Ce_{cluster}$)/MFI (simultaneously contact loading) | 256° C. | 248° C. |
| Example 3F | ($Rh_{cluster}$ + $Ce_{cluster}$)/MFI (sequential contact loading) | 272° C. | 286° C. |

As seen by the results, the catalysts of Examples 3C to 3F which used a combination of rhodium cluster-supporting zeolite and metal oxide cluster-supporting zeolite had significantly superior catalytic activity compared to the catalyst of Example 3A which used the rhodium cluster-supporting zeolite alone, and the catalyst of Reference Example 3B which used a combination of rhodium cluster-supporting zeolite and ceria-zirconia complex oxide particles.

Example 4 (Ceria-Zirconia Complex Oxide Particles)

CZ oxide cluster-supporting zeolite was produced using a mixture of ceria oxide particles and zirconia oxide particles instead of ACZ oxide particles.

<Evaluation>

The CZ oxide cluster-supporting zeolite catalyst of Example 4 was subjected to oxygen pretreatment by heating at 800° C. for 30 minutes in an atmosphere of 10 vol % oxygen and the remainder helium.

The oxygen pretreated catalyst of Example 4 was raised in temperature from room temperature to 800° C. at a rate of 10° C./min in reactive gas, and the catalytic action in the following water-gas shift reaction was evaluated.

$$CO+H_2O \rightarrow CO_2+H_2$$

The water-gas shift reaction commenced from approximately 200° C.

The reactive gas composition was carbon monoxide: 2 vol %, water: few % and helium: remainder, and the space velocity was 30,000 $h^{-1}$.

The catalyst of Example 4 used for evaluation had a total CZ oxide cluster-supporting zeolite catalyst mass of 30 mg, of which the CZ oxide mass was 1.2 mg.

As seen by these results, common CZ oxide particles did not have significant purification performance in the water-gas shift reaction, but the CZ oxide cluster-supporting zeolite catalyst of Example 4 exhibited significant purification performance in the water-gas shift reaction.

Reference Example 5A, Example 5B, Comparative Example 5C and Example 5D (Preparation Example 5-1) Preparation of Palladium Cluster-Supporting Zeolite ($Pd_{cluster}$/MF)

Palladium cluster-supporting zeolite was prepared in the same manner as Preparation Example 3-1, except that a palladium target was used instead of the rhodium target.

(Preparation Example 5-2) Preparation of Ceria Cluster-Supporting Zeolite ($Ce_{cluster}$/MFI)

Ceria cluster-supporting zeolite was prepared in the same manner as Preparation Example 3-1, except that a cerium target was set in the acetone instead of a rhodium target.

(Preparation Example 5-3) Preparation of Palladium-Supporting Alumina (Pd/$Al_2O_3$)

Palladium was impregnated and supported on alumina powder using a tetramine palladium(II) chloride aqueous solution, and it was fired at 600° C. for 4 hours to produce palladium-supporting alumina.

Reference Example 5A

Palladium cluster-supporting zeolite ($Pd_{cluster}$/MFI) obtained in the same manner as Preparation Example 5-1 was used as a catalyst.

Example 5B

Palladium cluster-supporting zeolite ($Pd_{cluster}$/MFI) obtained in the same manner as Preparation Example 5-1 and ceria cluster-supporting zeolite ($Ce_{cluster}$/MFI) obtained in the same manner as Preparation Example 5-2 were physically mixed and used as a catalyst.

Comparative Example 5C

Palladium-supporting alumina ($Pd/Al_2O_3$) obtained in the same manner as Preparation Example 5-3 was used as a catalyst.

Example 5D

Palladium-supporting alumina ($Pd/Al_2O_3$) obtained in the same manner as Preparation Example 5-3 and ceria cluster-supporting zeolite ($Ce_{cluster}$/MFI) obtained in the same manner as Preparation Example 5-2 were physically mixed and used as a catalyst.

<Evaluation>

A model gas containing 0.1 vol % nitrogen monoxide, 0.1 vol % carbon monoxide and the remainder helium was circulated through the catalysts of Reference Example 5A, Example 5B, Comparative Example 5C and Example 5D, listed below by their abbreviations, at a rate of 10° C./min with a space velocity of 10,000 $h^{-1}$, and the temperature was increased from room temperature to 800° C., after which the temperature was decreased to room temperature, and the number of carbon monoxide molecules that could be oxidized to carbon dioxide molecules by one palladium atom in one second at a temperature of 60° C. during the temperature decrease was evaluated.

Reference Example 5A: $Pd_{cluster}$/MFI
Example 5B: $Pd_{cluster}$/MFI+$Ce_{cluster}$/MFI (physical mixture)
Comparative Example 5C: $Pd/Al_2O_3$
Example 5D: $Pd/Al_2O_3$+$Ce_{cluster}$/MFI (physical mixture)

Figure 2A:
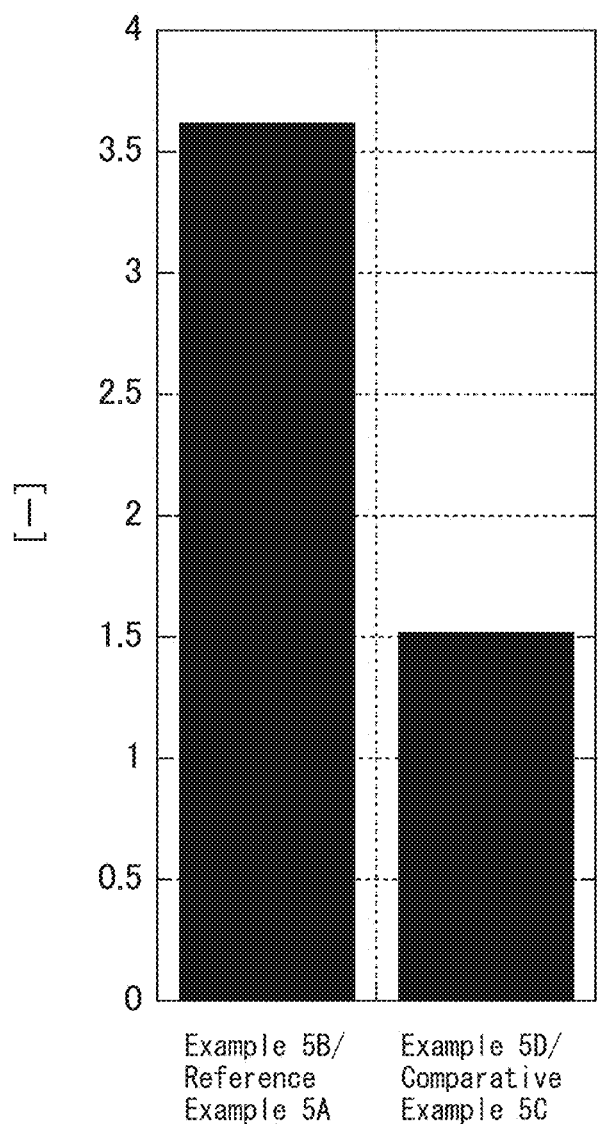
FIG. 2A is a graph showing the results of a carbon monoxide oxidation test for the catalysts of Reference Example 5A, Example 5B, Comparative Example 5C and Example 5D.

The left side of FIG. 2A shows a comparison between the results obtained with the catalyst of Example 5B and the results obtained with the catalyst of Reference Example 5A, i.e. the effect of physically mixing the ceria cluster-supporting zeolite ($Ce_{cluster}$/MFI) with the catalyst of Reference Example 5A to produce the catalyst of Example 5B. The right side of FIG. 2A shows a comparison between the results obtained with the catalyst of Example 5D and the results obtained with the catalyst of Comparative Example 5C, i.e. the effect of physically mixing the ceria cluster-supporting zeolite ($Ce_{cluster}$/MFI) with the catalyst of Comparative Example 5C to produce the catalyst of Example 5D.

As seen from the results in FIG. 2A, the catalysts of Examples 5B and 5D which used ceria cluster-supporting zeolite in a physical mixture had significantly superior catalytic activity compared to the catalysts of Reference Example 5A and Comparative Example 5C which did not use ceria cluster-supporting zeolite.

Moreover, as seen by the results in FIG. 2A, the effect of physical mixture with ceria cluster-supporting zeolite was greater for the catalyst of Example 5B mixed with palladium cluster-supporting zeolite, than with the catalyst of Example 5D mixed with palladium-supporting alumina.

Reference Example 6A. Example 6B, Comparative Example 6C and Example 6D (Preparation Example 6-1) Preparation of Platinum Cluster-Supporting Zeolite ($Pt_{cluster}$/MFI)

Platinum cluster-supporting zeolite was prepared in the same manner as Preparation Example 3-1, except that a platinum target was used instead of the rhodium target.

(Preparation Example 6-2) Preparation of Ceria Cluster-Supporting Zeolite ($Ce_{cluster}$/MFI)

Ceria cluster-supporting zeolite was prepared in the same manner as Preparation Example 3-1, except that a cerium target was set in the acetone, instead of setting a rhodium target.

(Preparation Example 6-3) Preparation of Platinum-Supporting Alumina ($Pt/Al_2O_3$)

Platinum was impregnated and supported on alumina powder using a tetramine platinum(II) nitrate aqueous solution, and it was fired at 300° C. for 2 hours to produce platinum-supporting alumina.

Reference Example 6A

Platinum cluster-supporting zeolite ($Pt_{cluster}$/MFI) obtained in the same manner as Preparation Example 6-1 was used as a catalyst.

Example 6B

Platinum cluster-supporting zeolite ($Pt_{cluster}$/MFI) obtained in the same manner as Preparation Example 6-1 and ceria cluster-supporting zeolite ($Ce_{cluster}$/MFI) obtained in the same manner as Preparation Example 6-2 were physically mixed and used as a catalyst.

Comparative Example 6C

Platinum-supporting alumina ($Pt/Al_2O_3$) obtained in the same manner as Preparation Example 6-3 was used as a catalyst.

Example 6D

Platinum-supporting alumina ($Pt/Al_2O_3$) obtained in the same manner as Preparation Example 6-3 and ceria cluster-supporting zeolite ($Ce_{cluster}$/MFI) obtained in the same manner as Preparation Example 6-2 were physically mixed and used as a catalyst.

<Evaluation>

A model gas containing 8 vol % oxygen, 0.3 vol % carbon monoxide and the remainder helium was circulated through the catalysts of Reference Example 6A, Example 6B, Comparative Example 6C and Example 6D, listed below by their abbreviations, at a rate of 10° C./min with a space velocity of 10,000 $h^{-1}$, and the temperature was increased from room temperature to 800° C., after which the temperature was decreased to room temperature, and the number of carbon monoxide molecules that could be oxidized to carbon dioxide molecules by one platinum atom in one second at a temperature of 60° C. during the temperature decrease was evaluated.

Reference Example 6A: $Pt_{cluster}$/MFI
Example 6B: $Pt_{cluster}$/MFI+$Ce_{cluster}$/MFI (physical mixture)
Comparative Example 6C: $Pt/Al_2O_3$
Example 6D: $Pt/Al_2O_3$+$Ce_{cluster}$/MFI (physical mixture)

Figure 2B:
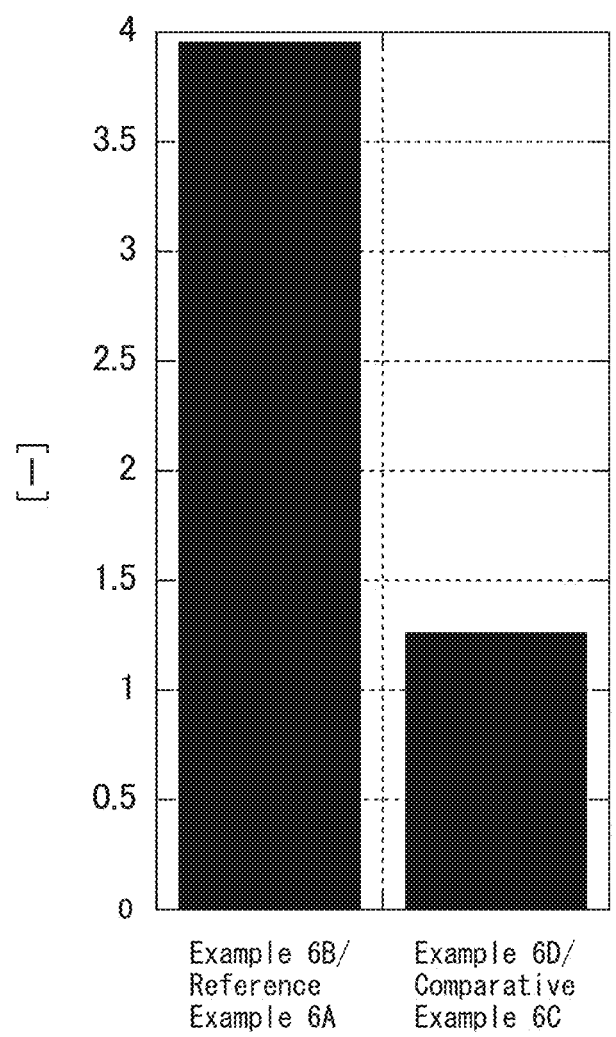
FIG. 2B is a graph showing the results of a carbon monoxide oxidation test for the catalysts of Reference Example 6A, Example 6B, Comparative Example 6C and Example 6D.

The left side of FIG. 2B shows a comparison between the results obtained with the catalyst of Example 6B and the results obtained with the catalyst of Reference Example 6A, i.e. the effect of physically mixing the ceria cluster-supporting zeolite ($Ce_{cluster}$/MFI) with the catalyst of Reference Example 6A to produce the catalyst of Example 6B. The right side of FIG. 2B shows a comparison between the results obtained with the catalyst of Example 6D and the results obtained with the catalyst of Comparative Example 6C, i.e. the effect of physically mixing the ceria cluster-supporting zeolite ($Ce_{cluster}$/MFI) with the catalyst of Comparative Example 6C to produce the catalyst of Example 6D.

As seen from the results in FIG. 2B, the catalysts of Examples 6B and 6D which used ceria cluster-supporting zeolite in a physical mixture had significantly superior catalytic activity compared to the catalysts of Reference Example 6A and Comparative Example 6C which did not use ceria cluster-supporting zeolite.

Moreover, as seen by the results in FIG. 2B, the effect of physical mixture with ceria cluster-supporting zeolite was greater for the catalyst of Example 6B mixed with platinum cluster-supporting zeolite, than with the catalyst of Example 6D mixed with platinum-supporting alumina.

Reference Example 7A, Example 7B, Comparative Example 7C and Example 7D (Preparation Example 7-1) Preparation of Rhodium Cluster-Supporting Zeolite ($Rh_{cluster}$/MFI)

Rhodium cluster-supporting zeolite was prepared in the same manner as Preparation Example 3-1.

(Preparation Example 7-2) Preparation of Ceria Cluster-Supporting Zeolite ($Ce_{cluster}$/MFI)

Ceria cluster-supporting zeolite was prepared in the same manner as Preparation Example 3-1, except that a cerium target was set in the acetone, instead of setting a rhodium target.

(Preparation Example 7-3) Preparation of Rhodium-Supporting Alumina ($Rh/Al_2O_3$)

Rhodium was impregnated and supported on alumina powder using a rhodium nitrate aqueous solution, and it was fired at 300° C. for 2 hours to produce rhodium-supporting alumina.

Reference Example 7A

Rhodium cluster-supporting zeolite ($Rh_{cluster}$/MFI) obtained in the same manner as Preparation Example 7-1 was used as a catalyst.

Example 7B

Rhodium cluster-supporting zeolite ($Rh_{cluster}$/MFI) obtained in the same manner as Preparation Example 7-1, and ceria cluster-supporting zeolite ($Ce_{cluster}$/MFI) obtained in the same manner as Preparation Example 7-2 were physically mixed and used as a catalyst.

Comparative Example 7C

Rhodium-supporting alumina ($Rh/Al_2O_3$) obtained in the same manner as Preparation Example 7-3 was used as a catalyst.

Example 7D

Rhodium-supporting alumina ($Rh/Al_2O_3$) obtained in the same manner as Preparation Example 7-3 and ceria cluster-supporting zeolite ($Ce_{cluster}$/MFI) obtained in the same manner as Preparation Example 7-2 were physically mixed and used as a catalyst.

<Evaluation>

A model gas containing 1 vol % carbon monoxide, 0.5 vol % oxygen and the remainder helium was circulated through the catalysts of Reference Example 7A, Example 7B, Comparative Example 7C and Example 7D, listed below by their abbreviations, at a rate of 10° C./min with a space velocity of 10,000 $h^{-1}$, and the temperature was increased from room temperature to 800° C., after which the temperature was decreased to room temperature, and the number of carbon monoxide molecules that could be oxidized to carbon dioxide molecules by one rhodium atom in one second at a temperature of 60° C. during the temperature decrease was evaluated.

Reference Example 7A: $Rh_{cluster}$/MFI
Example 7B: $Rh_{cluster}$/MFI+$Ce_{cluster}$/MFI (physical mixture)
Comparative Example 7C: $Rh/Al_2O_3$
Example 7D: $Rh/Al_2O_3$+$Ce_{cluster}$/MFI (physical mixture)

Figure 2C:
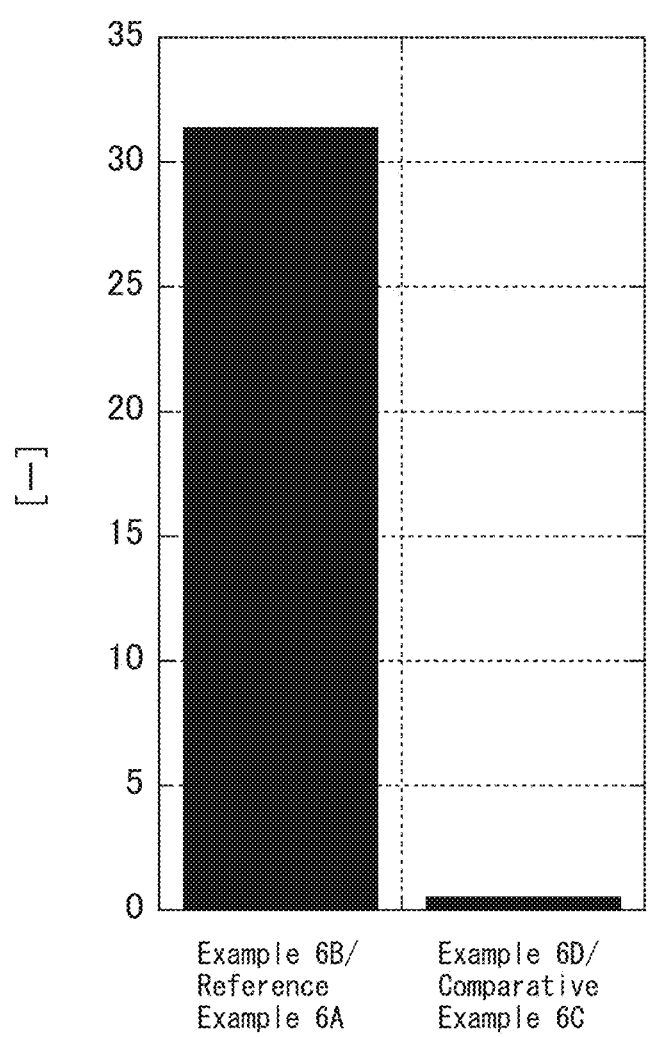
FIG. 2C is a graph showing the results of a carbon monoxide oxidation test for the catalysts of Reference Example 7A, Example 7B, Comparative Example 7C and Example 7D.

The left side of FIG. 2C shows a comparison between the results obtained with the catalyst of Example 7B and the results obtained with the catalyst of Reference Example 7A, i.e. the effect of physically mixing the ceria cluster-supporting zeolite ($Ce_{cluster}$/MFI) with the catalyst of Reference Example 7A to produce the catalyst of Example 7B. The right side of FIG. 2C shows a comparison between the results obtained with the catalyst of Example 7D and the results obtained with the catalyst of Comparative Example 7C, i.e. the effect of physically mixing the ceria cluster-supporting zeolite ($Ce_{cluster}$/MFI) with the catalyst of Comparative Example 7C to produce the catalyst of Example 7D.

As seen from these results, the catalysts of Examples 7B and 6D which used ceria cluster-supporting zeolite in a physical mixture had significantly superior catalytic activity compared to the catalysts of Reference Example 7A and Comparative Example 7C which did not use ceria cluster-supporting zeolite.

Moreover, as seen by the results in FIG. 2C, the effect of physical mixture with ceria cluster-supporting zeolite was greater for the catalyst of Example 7B mixed with rhodium cluster-supporting zeolite, than with the catalyst of Example 7D mixed with rhodium-supporting alumina.

Reference Example 8A and Examples 8B to 8E (Preparation Example 8-1) Preparation of Platinum Cluster-Supporting Zeolite ($Pt_{cluster}$/MFI)

Platinum cluster-supporting zeolite was prepared in the same manner as Preparation Example 3-1, except that a platinum target was used instead of the rhodium target.

(Preparation Example 8-2) Preparation of Ceria Cluster-Supporting Zeolite ($Ce_{cluster}$/MFI)

Ceria cluster-supporting zeolite was prepared in the same manner as Preparation Example 3-1, except that a cerium target was set in the acetone, instead of setting a rhodium target.

(Preparation Example 8-3) Preparation of Manganese Oxide Cluster-Supporting Zeolite ($Mn_{cluster}$/MFI)

Manganese oxide cluster-supporting zeolite was prepared in the same manner as Preparation Example 3-1, except that a manganese target was set in the acetone, instead of setting a rhodium target.

(Preparation Example 8-4) Preparation of Molybdenum Oxide Cluster-Supporting Zeolite ($Mo_{cluster}$/MFI)

Molybdenum oxide cluster-supporting zeolite was prepared in the same manner as Preparation Example 3-1, except that a molybdenum target was set in the acetone, instead of setting a rhodium target.

(Preparation Example 8-5) Preparation of Vanadium Oxide Cluster-Supporting Zeolite ($V_{cluster}$/MFI)

Vanadium oxide cluster-supporting zeolite was prepared in the same manner as Preparation Example 3-1, except that a vanadium target was set in the acetone, instead of setting a rhodium target.

Reference Example 8A

Platinum cluster-supporting zeolite ($Pt_{cluster}$/MFI) obtained in the same manner as Preparation Example 8-1 was used as a catalyst.

Example 8B

Platinum cluster-supporting zeolite ($Pt_{cluster}$/MFI) obtained in the same manner as Preparation Example 8-1 and ceria cluster-supporting zeolite ($Ce_{cluster}$/MFI) obtained in the same manner as Preparation Example 8-2 were physically mixed and used as a catalyst.

Example 8C

Platinum cluster-supporting zeolite ($Pt_{cluster}$/MFI) obtained in the same manner as Preparation Example 8-1 and manganese oxide cluster-supporting zeolite ($Mn_{cluster}$/MFI) obtained in the same manner as Preparation Example 8-3 were physically mixed and used as a catalyst.

Example 8D

Platinum cluster-supporting zeolite ($Pt_{cluster}$/MFI) obtained in the same manner as Preparation Example 8-1 and molybdenum oxide cluster-supporting zeolite ($Mo_{cluster}$/MFI) obtained in the same manner as Preparation Example 8-4 were physically mixed and used as a catalyst.

Example 8E

Platinum cluster-supporting zeolite ($Pt_{cluster}$/MFI) obtained in the same manner as Preparation Example 8-1 and vanadium oxide cluster-supporting zeolite ($V_{cluster}$/MFI) obtained in the same manner as Preparation Example 8-5 were physically mixed and used as a catalyst.

Comparative Example 8F

Platinum cluster-supporting zeolite ($Pt_{cluster}$/MFI) obtained in the same manner as Preparation Example 8-1 and cerium oxide powder were physically mixed and used as a catalyst.

<Evaluation: Number of Carbon Monoxide Molecules Oxidizable to Carbon Dioxide Molecules>

Figure 2D:
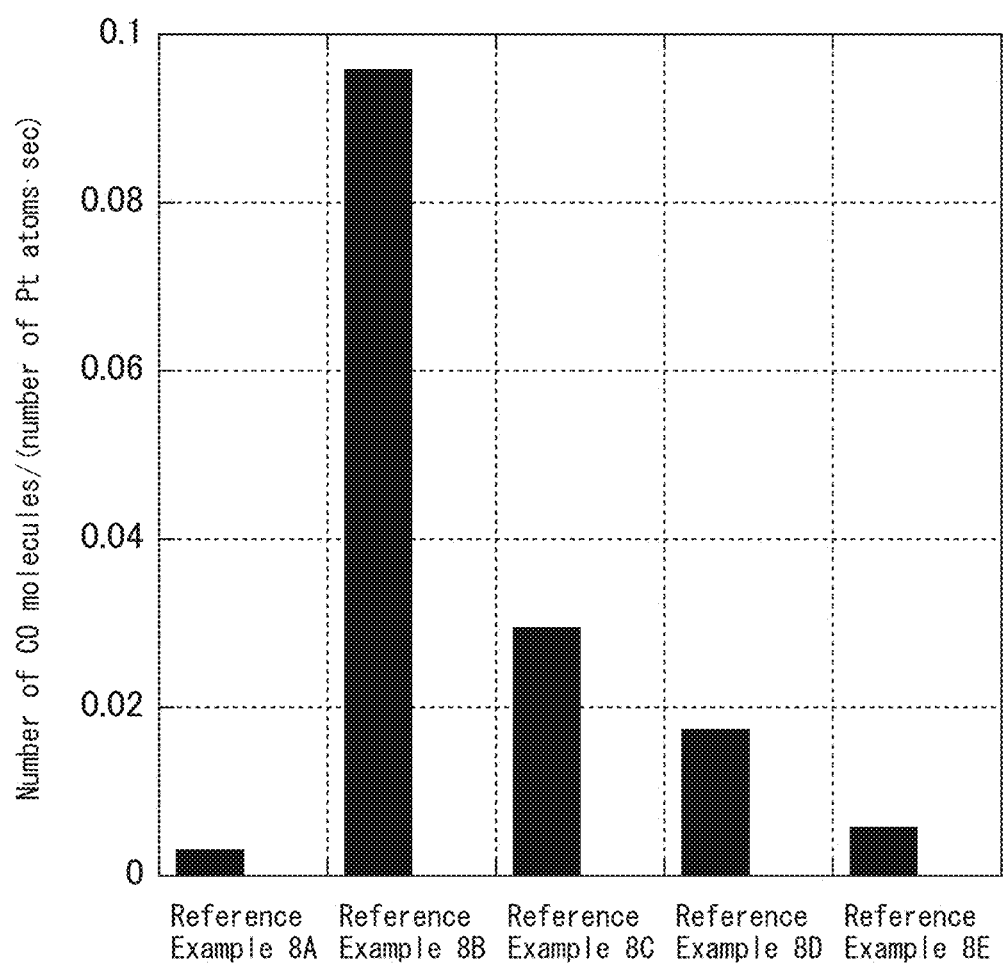
FIG. 2D is a graph showing the results of a carbon monoxide oxidation test for the catalysts of Reference Example 8A and Examples 8B to 8E.

A model gas containing 8 vol % oxygen, 0.3 vol % carbon monoxide and the remainder helium was circulated through the catalysts of Reference Example 8A and Examples 8B to 8E, listed below by their abbreviations, at a rate of 10° C./min with a space velocity of 10,000 $h^{-1}$, and the temperature was increased from room temperature to 800° C., after which the temperature was decreased to room temperature, and the number of carbon monoxide molecules that could be oxidized to carbon dioxide molecules by one platinum atom in one second at a temperature of 150° C. during the temperature decrease was evaluated. The results are shown in FIG. 2D.

Reference Example 8A: $Pt_{cluster}$/MFI
Example 8B: $Pt_{cluster}$/MFI+$Ce_{cluster}$/MFI
Example 8C: $Pt_{cluster}$/MFI+$Mn_{cluster}$/MFI
Example 8D: $Pt_{cluster}$/MFI+$Mo_{cluster}$/MFI
Example 8E: $Pt_{cluster}$/MFI+$V_{cluster}$/MFI As seen by these results, the catalysts of Examples 8B to 8E, which used ceria, manganese, molybdenum or vanadium cluster-supporting zeolite in physical mixture with platinum cluster-supporting zeolite ($Pt_{cluster}$/MFI), had superior catalytic activity compared to the catalyst of Reference Example 8A which did not use ceria cluster-supporting zeolite.

<Evaluation: Oxygen Storage Capacity>

A gas containing 0.67 vol % carbon monoxide and the remainder helium was circulated through the catalysts of Reference Example 8A, Examples 8B to 8E and Comparative Example 8F, listed below by their abbreviations, at 700° C. for 60 minutes with a space velocity of 30,000 h-1, and washing was carried out for 30 minutes with helium gas. A gas containing 33 vol % oxygen and the remainder helium was then circulated for 60 minutes with a space velocity of 30,000 $h^{-1}$, and washing was carried out for 60 minutes with helium gas at 700° C., to remove the non-adsorbed oxygen. Next, 0.67 vol % carbon monoxide was circulated through and the oxygen storage capacity (OSC) was measured from the amount of CO that underwent oxygen-free combustion and conversion to carbon dioxide. The following are the results, summarized as the numbers of oxygen atoms stored per metal atom forming the metal oxide clusters or powder.

Reference Example 8A: $Pt_{cluster}$/MFI
0.00 (number of oxygen atoms/number of metal atoms)
Example 8B: $Pt_{cluster}$/MFI+$Ce_{cluster}$/MFI
0.34 (number of oxygen atoms/number of metal atoms)
Example 8C: $Pt_{cluster}$/MFI+$Mn_{cluster}$/MFI
0.12 (number of oxygen atoms/number of metal atoms)
Example 8D: $Pt_{cluster}$/MFI+$Mo_{cluster}$/MFI
0.95 (number of oxygen atoms/number of metal atoms)
Example 8E: $Pt_{cluster}$/MFI+$V_{cluster}$/MFI
0.45 (number of oxygen atoms/number of metal atoms)
Comparative Example 8F: $Pt_{cluster}$/MFI+$CeO_2$ powder
0.039 (number of oxygen atoms/number of metal atoms)

The catalysts of Examples 8B to 8E, which used ceria, manganese, molybdenum or vanadium cluster-supporting zeolite in physical mixture with platinum cluster-supporting zeolite ($Pt_{cluster}$/MFI), had significantly more oxygen atoms stored per metal atom forming the metal oxide clusters or powder, compared to the catalyst of Example 8F which used ceria powder in physical mixture with platinum cluster-supporting zeolite ($Pt_{cluster}$/MFI).

Figure 2E:
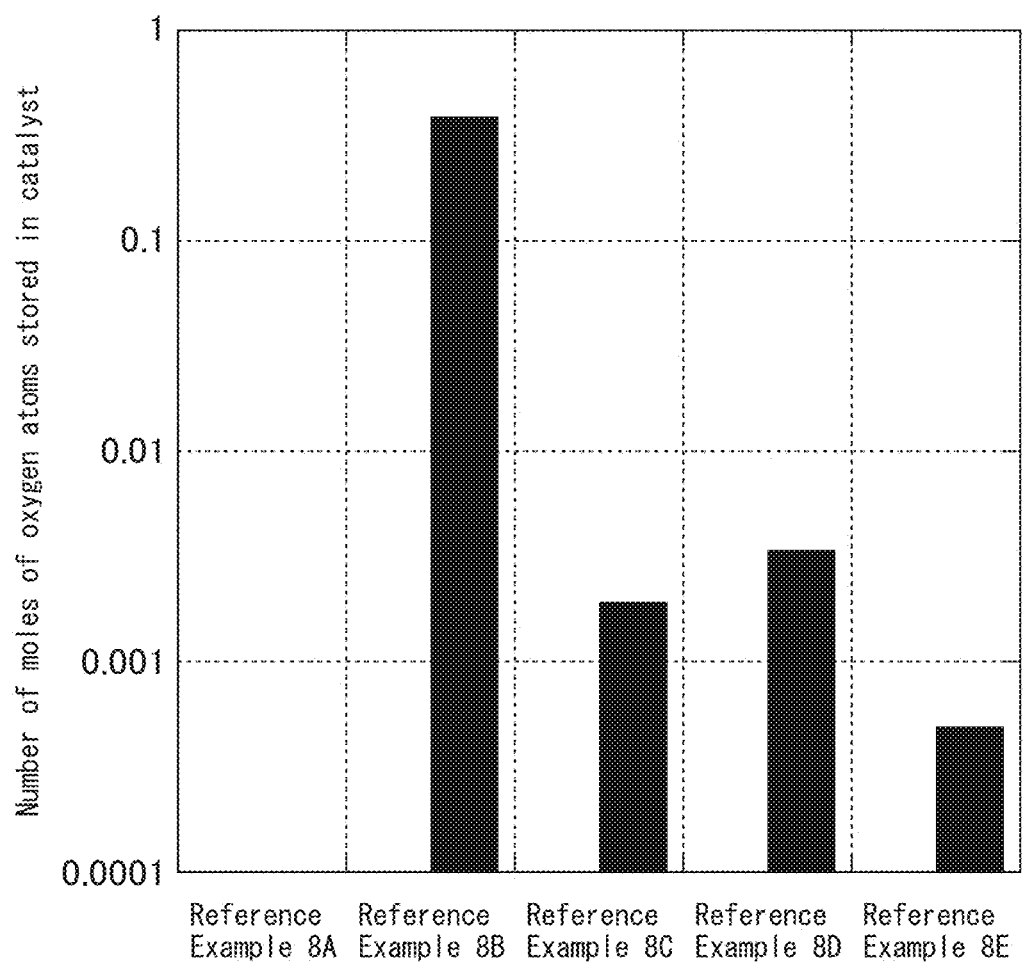
FIG. 2E is a graph showing the number of moles of oxygen atoms stored by the catalysts of Reference Example 8A and Examples 8B to 8E.

FIG. 2E shows the values obtained by multiplying the number of oxygen atom atoms stored per metal atom forming the metal oxide clusters or powder, by the number of metal atoms forming the metal oxide clusters or powder supported in the catalysts of Reference Example 8A and Examples 8B to 8E, or in other words, it shows the number of moles of oxygen atoms stored in the catalysts of Reference Example 8A and Examples 8B to 8E.

As seen by the results in FIGS. 2D and E the numbers of carbon monoxide molecules oxidizable to carbon dioxide molecule by the platinum atoms, shown in FIG. 2D, correlate with the numbers of oxygen atoms stored in the catalysts, shown in FIG. 2E.

Comparative Example 9A and Examples 9B to 9D

Comparative Example 9A

Figure 23A:
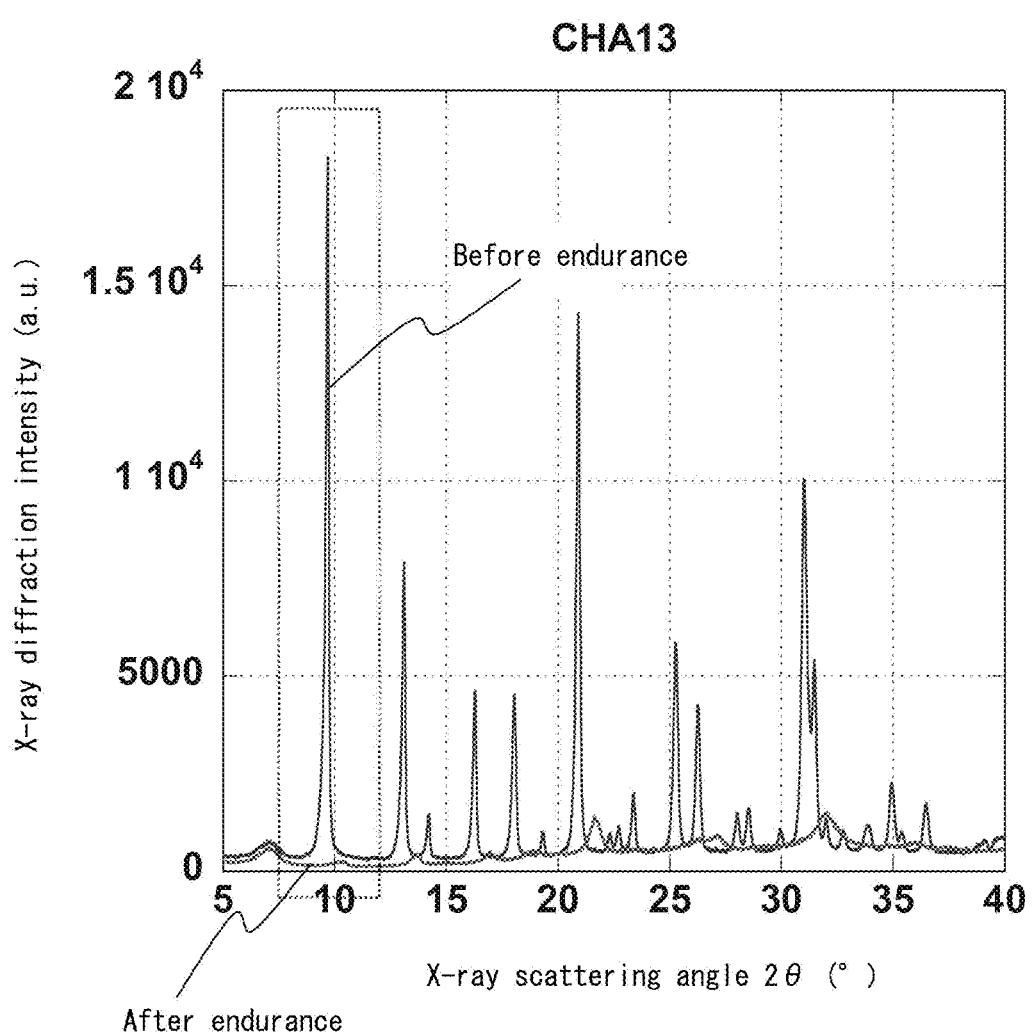
FIG. 23A is a graph showing the results of X-ray diffraction (XRD) analysis of chabazite (CHA)-type zeolite before and after heat endurance.

Chabazite (CHA13) zeolite was subjected to heat endurance in which it was heated, in a vacuum, from room temperature to 100° C. at a rate of 2° C./min, heated from 100° C. to 200° C. at a rate of 5° C./min, heated from 200° C. to 800° C. at a rate of 10° C./min, held at 800° C. for 5 minutes, heated from 800° C. to 900° C. at a rate of 10° C./min. held at 900° C. for 5 minutes, heated from 900° C. to 1000° C. at a rate of 10° C./min, and then held at 1000° C. for 5 minutes. XRD results were obtained with an X-ray diffraction (XRD) analysis device (X'Pert PRO MRD by Spectris Co., Ltd.) before and after the heat endurance. The results are shown in FIG. 23A.

Example 9B

Ceria cluster-supporting zeolite ($CeO_2$/CHA13) was produced in the same manner as Preparation Example 3-1, except that a cerium (Ce) target was set in the acetone instead of a rhodium target, and the zeolite used was the CHA-zeolite used in Comparative Example 9A.

Figure 23B:
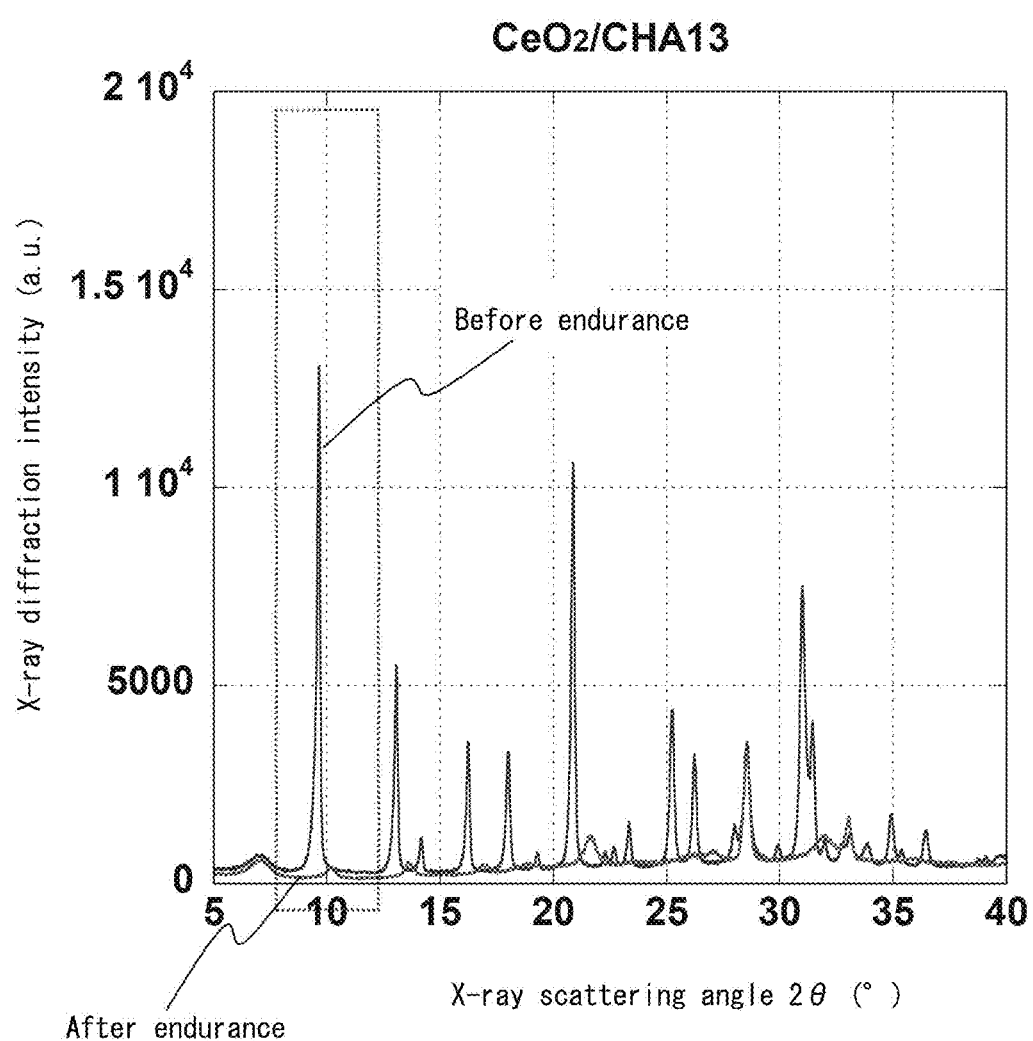
FIG. 23B is a graph showing the results of XRD of CHA-zeolite having ceria ($CeO_2$) clusters supported in the pores, before and after heat endurance.

The obtained ceria cluster-supporting zeolite was subjected to heat endurance in the same manner as Comparative Example 9A, and XRD results were obtained by X-ray diffraction analysis before and after heat endurance. The results are shown in FIG. 23B.

Example 9C

Zirconia cluster-supporting zeolite ($ZrO_2$/CHA13) was produced in the same manner as Preparation Example 3-1, except that a zirconium (Zr) target was set in the acetone instead of a rhodium target, and the zeolite used was the CHA-zeolite used in Comparative Example 9A.

Figure 23C:
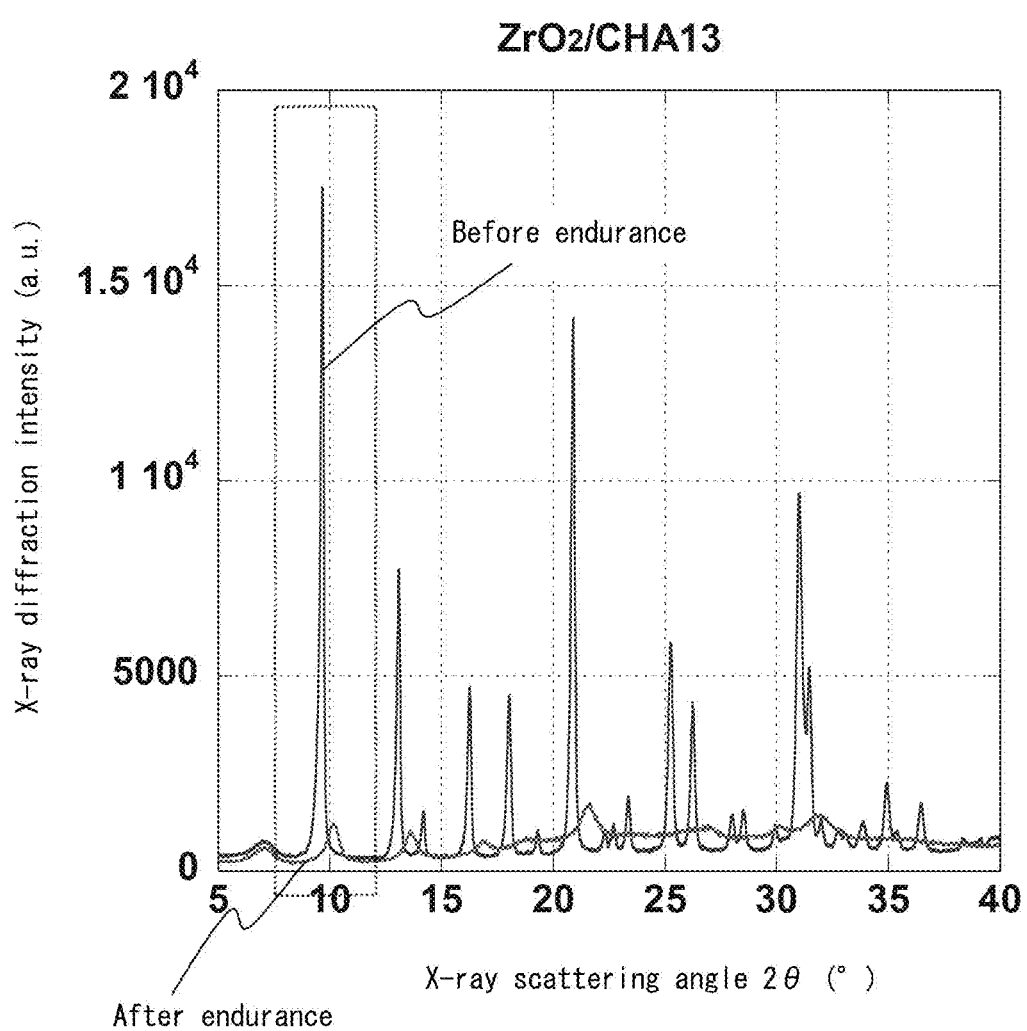
FIG. 23C is a graph showing the results of XRD of CHA-zeolite having zirconia ($ZrO_2$) clusters supported in the pores, before and after heat endurance.

The obtained zirconia cluster-supporting zeolite was subjected to heat endurance in the same manner as Comparative Example 9A, and XRD results were obtained by X-ray diffraction analysis before and after heat endurance. The results are shown in FIG. 23C.

Example 9D

Alumina cluster-supporting zeolite ($Al_2O_3$/CHA13) was produced in the same manner as Preparation Example 3-1, except that aluminum (Al) target was set in the acetone instead of a rhodium target, and the zeolite used was the CHA-zeolite used in Comparative Example 9A.

Figure 23D:
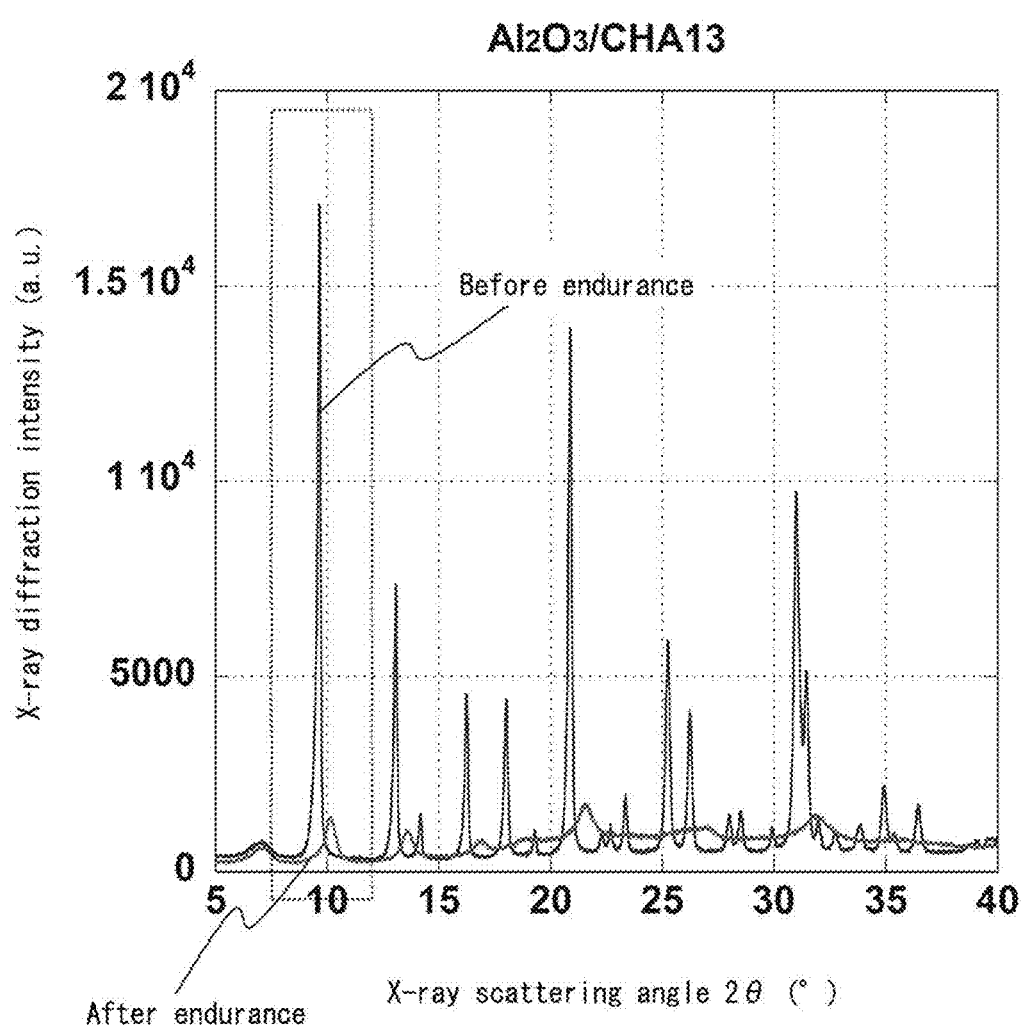
FIG. 23D is a graph showing the results of XRD of CHA-zeolite having alumina ($Al_2O_3$) clusters supported in the pores, before and after heat endurance.

The obtained alumina cluster-supporting zeolite was subjected to heat endurance in the same manner as Comparative Example 9A, and XRD results were obtained by X-ray diffraction analysis before and after heat endurance. The results are shown in FIG. 23D.

<Evaluation: Zeolite Lattice Reinforcement by Oxide Clusters>

Of the XRD results for Comparative Example 9A and Examples 9B to 9D shown in FIG. 23A to FIG. 23D, the peak with a scattering angle 2θ of near 10° in the low angle range, was a peak corresponding to large zeolite plane spacing, and therefore maintenance of the peak at this region after heat endurance suggests maintenance of the overall structure of the zeolite.

Figure 24:
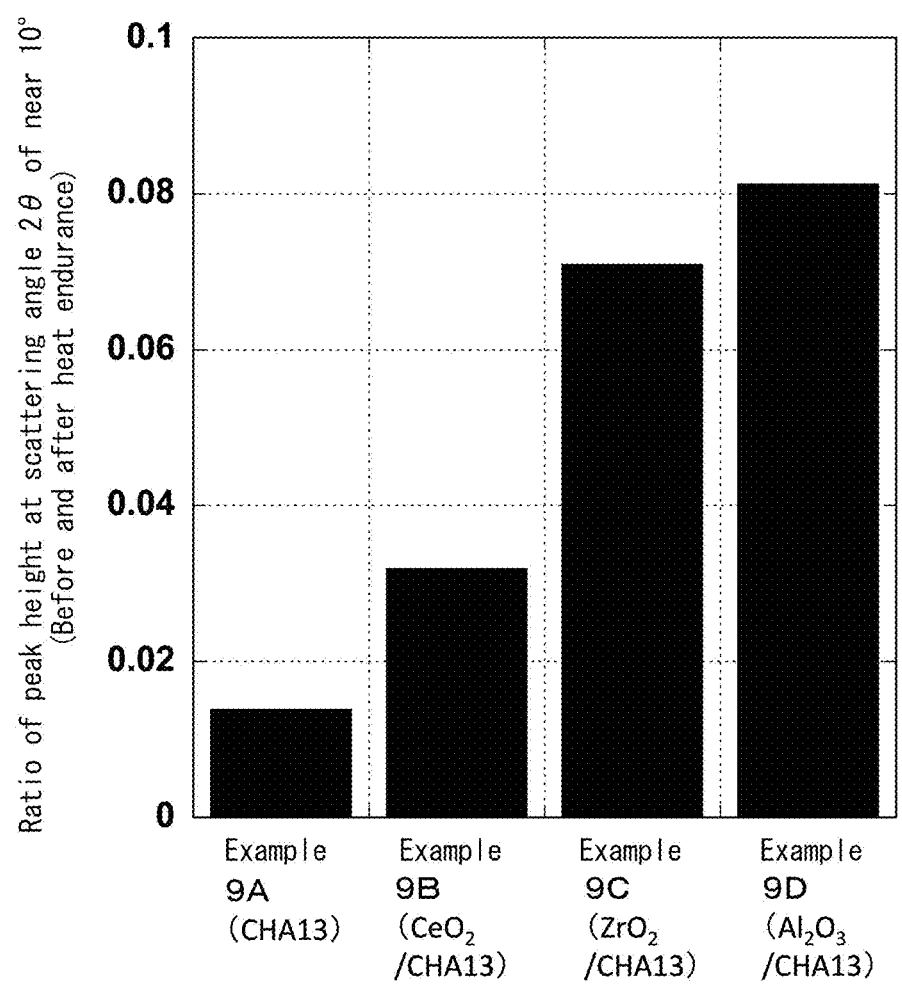
FIG. 24 is a graph comparing the peak height ratio for the scattering angles 2θ near 10° (peak height of scattering angle 2θ near 10 in the XRD results after heat endurance/peak height of scattering angle 2θ near 10° in the XRD results before heat endurance) for each of the results of XRD before and after heat endurance shown in FIGS. 23A to 23D.

For evaluation of the heat endurance property of zeolite, FIG. 24 shows a comparison of the ratios of the peak heights with a scattering angle 2θ of near 10° in the XRD results before and after heat endurance (peak height with scattering angle 2θ of near 100 in XRD results after heat endurance/ peak height with scattering angle 2θ of near 100 in XRD results before heat endurance), for Comparative Example 9A and Examples 9B to 9D which were shown in FIGS. 23A to 23D. The results shown in FIG. 24 suggest that in all of Examples 9B to 9D in which oxide clusters were supported in zeolite pores, the ratios of the peak heights with a scattering angle 2θ of near 10° after heat endurance were larger, and therefore the overall structure of the zeolite was maintained, compared to Comparative Example 9A in which oxide clusters were not supported.

For reference, the bond energy between zeolite and metal oxide clusters was determined by structural calculation with insertion of specific metal oxide clusters in CHA-zeolite pores. The results were as follows:

$Al_3O_6$: 0.8 eV
$Al_4O_6$: 0.6 eV
$Fe_3O_3$: 3.2 eV
$Fe_4O_6$: 2.4 eV
$Zn_3O_3$: 3.0 eV
$Zr_3O_6$: 3.2 eV
$Ce_3O_6$: 2.0 eV

As shown by the results of the structural calculation, the bond energy between zeolite and metal oxide clusters was positive in all cases where the metal oxide clusters were inserted into zeolite pores, suggesting that the zeolite had been stabilized by insertion of the metal oxide clusters.

Reference Examples and Reference Comparative Examples

In the following Reference Examples and Reference Comparative Examples, which are described as Examples and Comparative Examples in PTL 4, it is demonstrated that the method of the invention can support catalyst metal clusters in zeolite pores, and that the supported catalyst having catalyst metal clusters supported in pores has excellent exhaust gas purification performance.

Reference Examples 1 and 2 and Reference Comparative Example 1

In Reference Examples 1 and 2 and Reference Comparative Example 1, gold clusters were formed by laser ablation of a gold target in acetone, supporting the gold clusters on the carrier particles to prepare a gold cluster-supported catalyst. The fluorescence spectra of the catalysts obtained in Reference Examples 1 and 2 and Reference Comparative Example 1 were evaluated.

Reference Example 1

As shown in FIG. 1B(a), acetone 11 was placed in a vessel 13, as a dispersing medium in which carrier particles (not shown) were dispersed, a gold target 12 was set in the acetone 11, and the gold target 12 in the acetone 11 was irradiated with a laser 15 through a lens 14, to form gold clusters 16 in the acetone by laser ablation. The gold clusters 16 formed in this manner were positively charged, whereby they were electrically drawn in and supported at the negatively charged sites, i.e. the acid sites, of the zeolite carrier particles 20, as shown in FIG. 1B(b).

The laser light was a Nd:YAG laser fundamental wave (1064 nm, 10 Hz), with an intensity of 2 W.

The cluster-supporting carrier particles were removed from the acetone and dried at about 25° C. for about 1 hour, and then fired at 300° C. for 2 hours, to obtain a gold cluster-supported catalyst for Reference Example 1.

The carrier particles and laser irradiation time in Reference Example 1 were as follows:
Carrier particles: type ZSM-5 zeolite (MFI) (Si/Al ratio: 1500)
Laser irradiation time: 2 hours and 45 minutes Reference Example 2

A gold cluster-supported catalyst for Reference Example 2 was obtained in the same manner as Reference Example 1, except that the carrier particles and laser irradiation time were as follows:
Carrier particles: type ZSM-5 zeolite (MFI) (Si/Al ratio: 1500)
Laser irradiation time: 12 hours and 30 minutes Because the ablation efficiency differs depending on the surface condition of the carrier particles and the gold sheet, the laser ablation time was adjusted in Reference Example 2 and Reference Comparative Example 1 so that the amount of gold ablation was about the same as in Reference Example 1. The amount of gold ablation was judged based on the change in color of the dispersing medium.

Reference Comparative Example 1

A gold cluster-supported catalyst for Reference Comparative Example 1 was obtained in the same manner as Reference Example 1, except that the carrier particles and laser irradiation time were as follows:
Carrier particles: Fumed silica
Laser irradiation time: 30 minutes <Evaluation: Fluorescence Spectra>

Figure 3:
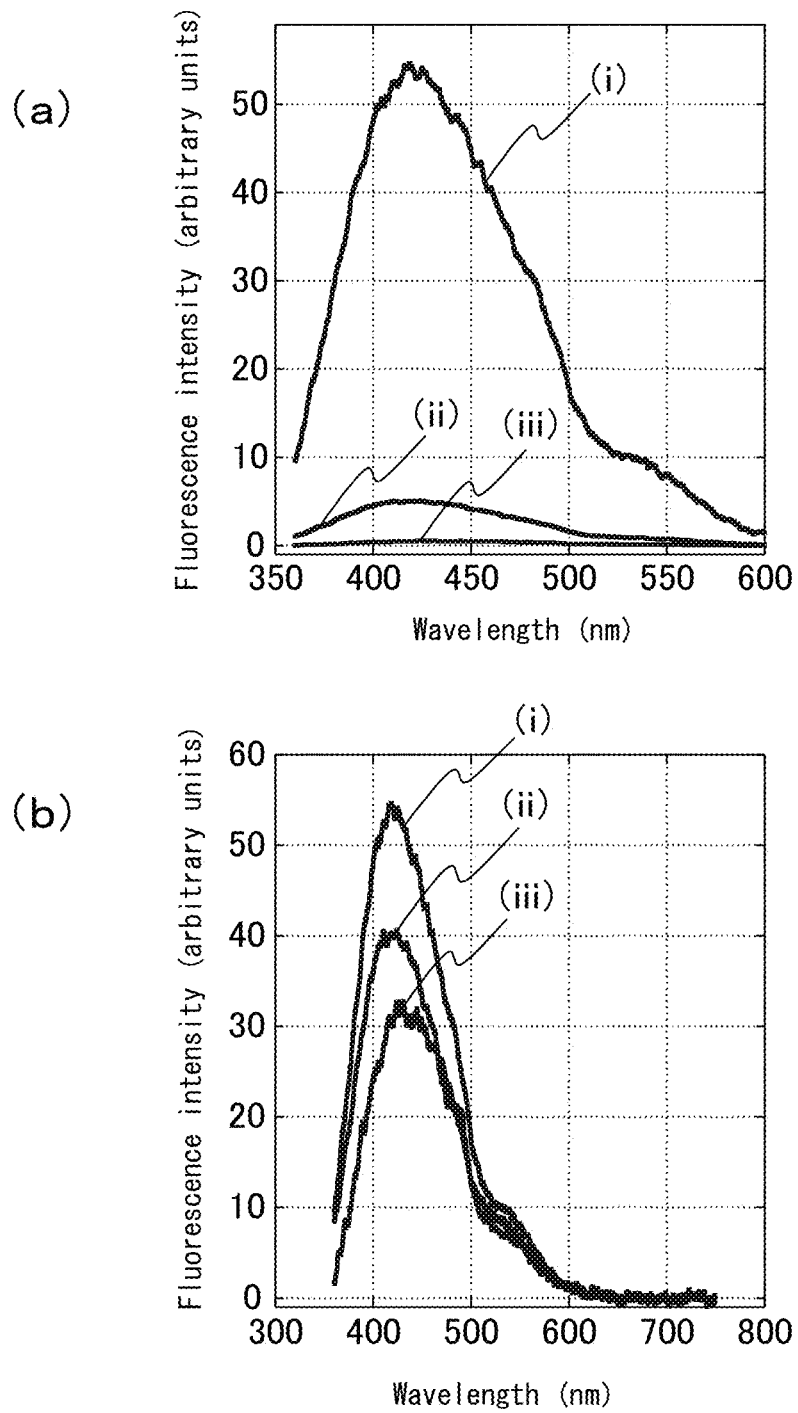
FIG. 3 is a pair of graphs showing the fluorescence spectra for the gold cluster supported catalysts of Reference Examples 1 and 2 and Reference Comparative Example 1.

The fluorescence spectra of the gold cluster-supported catalysts of Reference Examples 1 and 2 and Reference Comparative Example 1 were measured (excitation wavelength: 350 nm). The evaluation results for the fluorescence spectra are shown in FIG. 3(a), as a graph normalized to intensity per 1 mg of gold. In FIG. 3(a), the results for Reference Example 1 are shown as spectrum (i), the results for Reference Example 2 are shown as spectrum (ii), and the results for Reference Comparative Example 1 are shown as spectrum (iii).

In FIG. 3(a), the fluorescent signal near 400 nm is the spectrum of overlapping fluorescence from approximately octamer gold clusters. Therefore, FIG. 3(a) demonstrates that approximately octamer gold clusters were supported on carrier particles in relatively large amounts, with the gold cluster-supported catalysts of Reference Examples 1 and 2, and particularly with the gold cluster-supported catalyst of Reference Example 1.

FIG. 3(b) shows, for examination, the results for Reference Example 1 (spectrum (i)) at the same size, the results for Reference Example 2 (spectrum (ii)) magnified by 8×, and the results for Reference Comparative Example 1 (spectrum (iii)) magnified by 60×, based on the spectra of FIG. 3(a).

The results for Reference Comparative Example 1 which had gold clusters supported on fumed silica (spectrum (iii)) was shifted toward the long wavelength end in comparison to the results for Reference Examples 1 and 2 which had gold clusters supported on zeolite (spectra (i) and (ii)). This suggests that the gold clusters supported on fumed silica, of Reference Comparative Example 1, had larger particle sizes than the gold clusters supported on zeolite, of Reference Examples 1 and 2. The peak near 550 nm was attributed to Mie scattering due to nanoparticles adhering to the surfaces of the carrier particle surfaces together with the clusters.

<Other Metals>

Gold clusters were formed using a gold target in Reference Examples 1 and 2 and Reference Comparative Example 1 described above. The following metals were also used in the same manner as Reference Example 1, to confirm that other metal clusters can be formed by submerged laser ablation using the metal targets.

Aluminum, silicon, titanium, vanadium, chromium, manganese, iron, cobalt, nickel, copper, zinc, gallium, germanium, zirconium, niobium, silver, rhodium, ruthenium, palladium, indium, tin, tantalum, tungsten, iridium, platinum, cerium.

Of these metal clusters, copper, silver, rhodium, ruthenium, palladium and platinum were confirmed to produce observable fluorescence when irradiated with excitation light. Moreover, among these metal clusters, those of copper, silver, rhodium, ruthenium and platinum were confirmed to produce fluorescence when irradiated with excitation light even when the clusters produced by ion-exchange/reduction were on zeolite carrier particles.

Reference Example 3

For Reference Example 3, a copper cluster-supported catalyst having copper clusters supported on zeolite carrier particles was prepared in the same manner as Reference Example 1, except that a copper target was used instead of the gold target, and the zeolite carrier particles used were type ZSM-5 zeolite carrier particles (MFI) (Si/Al ratio: 40). The fluorescence spectrum of the obtained catalyst was evaluated.

Copper differs from gold in that it is oxidized in air, and therefore the copper clusters immediately after preparation were in the oxide state. Therefore, the copper cluster-supported catalyst did not emit fluorescence immediately after preparation.

Figure 4:
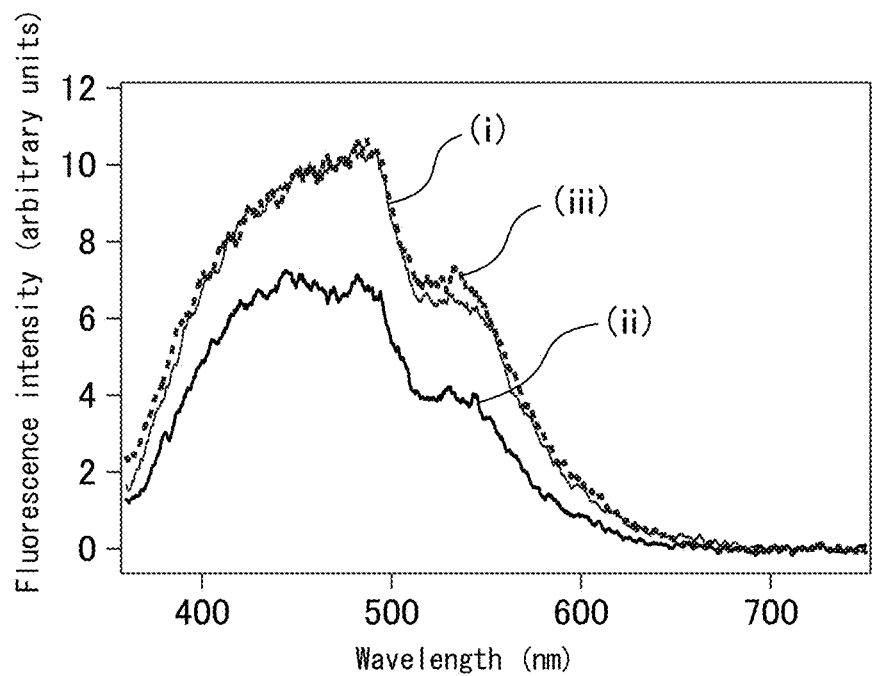
FIG. 4 is a graph showing fluorescence spectra for the copper cluster-supported catalyst of Reference Example 3 before and after oxidizing treatment and reduction treatment.

The obtained copper cluster-supported catalyst was heated under a hydrogen atmosphere at 300° C. for 2 hours for reduction treatment, and then the fluorescence intensity was evaluated. The reduced copper cluster-supported catalyst thereby exhibited fluorescence. The result of fluorescence intensity evaluation (excitation wavelength of 350 nm) is shown as spectrum (i) in FIG. 4. In spectrum (i), the fluorescence at 400 to 500 nm matches the previously reported fluorescent signal for octamers and nonamers of copper.

The reduced copper cluster-supported catalyst was then allowed to stand overnight in an air atmosphere for oxidizing treatment, and the fluorescence intensity was again evaluated. As a result, the copper cluster-supported catalyst that had been allowed to stand in the air atmosphere exhibited fluorescence, albeit weaker than before standing in the air atmosphere. The result of the fluorescence intensity evaluation is shown as spectrum (ii) in FIG. 4.

The copper cluster-supported catalyst that had been allowed to stand in the air atmosphere was then again subjected to reduction treatment as described above, and the fluorescence intensity was again evaluated. The copper cluster-supported catalyst that had been subjected to reduction treatment exhibited fluorescence equivalent to that before standing in the air atmosphere. The result of the fluorescence intensity evaluation is shown as spectrum (iii) in FIG. 4.

The fact that the copper cluster-supported catalyst after such oxidizing treatment and reduction treatment exhibited fluorescence equivalent to before treatment suggests that the copper clusters were held in the pores of the zeolite carrier particles, such that aggregation and similar changes in the copper clusters did not take place.

Reference Example 4 and Reference Comparative Example 2

In Reference Example 4 and Reference Comparative Example 2, the catalytic activities of a rhodium cluster-supported catalyst (Reference Example 4) and a commercially available exhaust gas purifying catalyst (Reference Comparative Example 2) were evaluated.

Specifically, Reference Example 4 and Reference Comparative Example 2 were carried out in the following manner.

Reference Example 4

For Reference Example 4, rhodium clusters were supported on zeolite carrier particles in the same manner as Reference Example 1, except that a rhodium target was used instead of the gold target, and the zeolite carrier particles used were beta zeolite carrier particles (BEA) (Si/Al ratio: 40).

An evaluation gas having the composition shown below was circulated through 30 mg of the obtained rhodium cluster-supported catalyst ($Rh_{cluster}$/BEA), while a procedure of heating it in an electric furnace from room temperature up to a peak heating temperature of 640° C. to 800° C., at a heating rate of 12° C./min, over a period of 24 hours, and then cooling to room temperature, was repeated, and the temperature at which 50% of the supplied carbon monoxide was consumed ($T_{CO(50\%)}$) was evaluated.

Carbon monoxide (CO): 0.3%
Oxygen ($O_2$): 8%
Helium (He): Remainder

Figure 5:
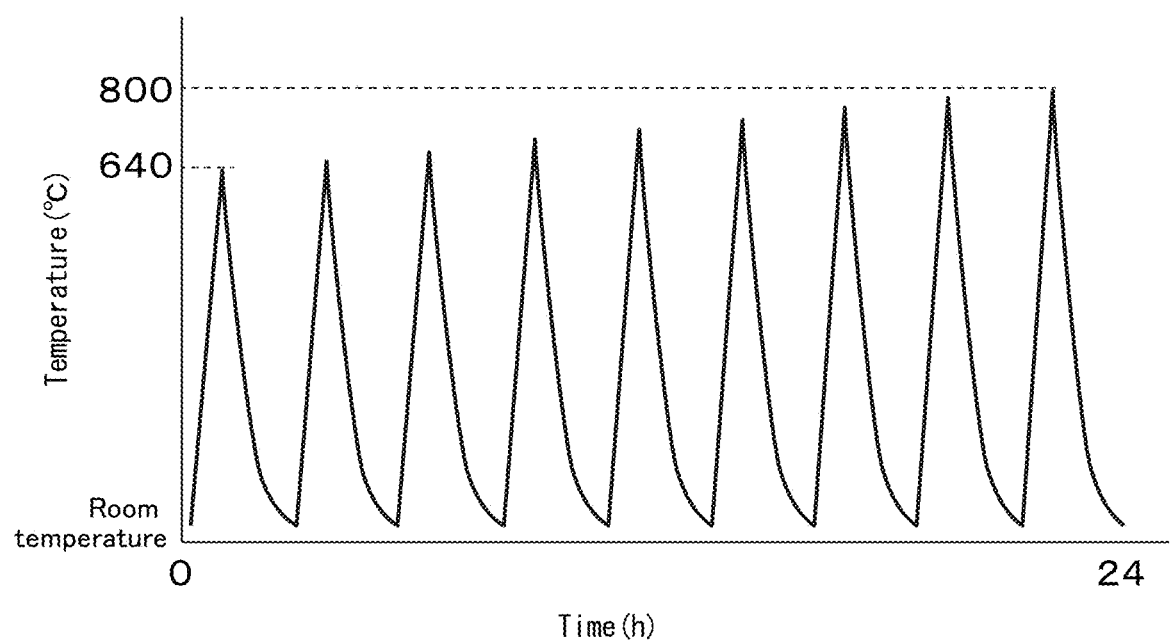
FIG. 5 is a graph showing temperature change for catalytic activity evaluation.

In the temperature change during the repeated steps of heating and cooling, as shown in FIG. 5, the peak heating temperature increased toward the latter half, and approximately 24 hours was required overall.

During the repeated steps of heating and cooling, the temperature of the evaluation gas was evaluated while increasing the peak heating temperature, i.e. during temperature increase. Similarly, during the repeated steps of heating and cooling, the temperature of the evaluation gas was evaluated while lowering the peak heating temperature, i.e. during temperature decrease.

Reference Comparative Example 2

For reference, a commercially available exhaust gas purifying catalyst ($Rh/Al_2O_3$—$CeO_2$—$ZrO_2$), as Reference Comparative Example 2, was evaluated with temperature increase and temperature decrease in the same manner as Reference Example 4.

<Evaluation: Durability>

Figure 6:
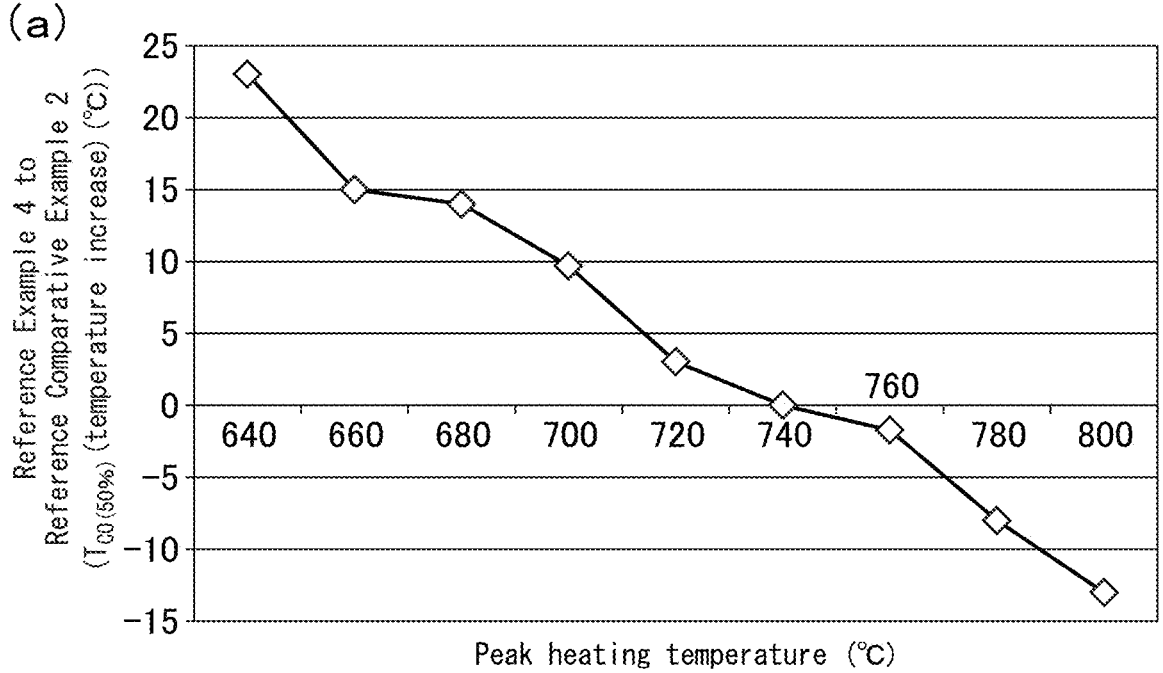
FIG. 6 is a pair of graphs showing carbon monoxide purification performance for the rhodium cluster-supported catalysts of Reference Example 4 and Reference Comparative Example 2.
Figure 6:
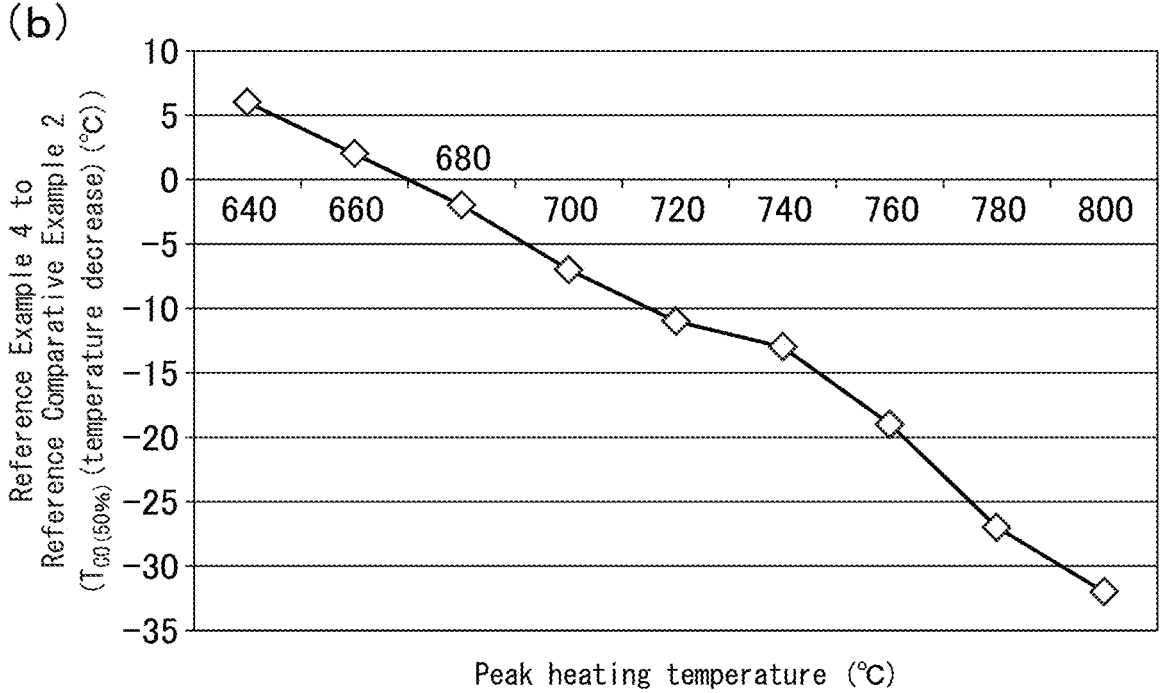

The evaluation results with temperature increase and temperature decrease are shown in FIGS. 6(*a*) and (*b*), as the difference between the results for Reference Example 4 and the results for Reference Comparative Example 2 (($T_{CO(50\%)}$ for Reference Example 4–($T_{CO(50\%)}$ for Reference Comparative Example 2)). A negative value for the difference indicates that the $T_{CO(50\%)}$ of Reference Example 4 was lower than the $T_{CO(50\%)}$ of Reference Comparative Example 2, i.e. that the low-temperature activity of the catalyst of Reference Example 4 was excellent. In FIG. 6, the abscissa represents the temperature at which accelerated degradation treatment was carried out (the peak temperature in FIG. 5).

From FIGS. 6(*a*) and (*b*) it is implied that the catalyst of Reference Example 4 exhibits more excellent exhaust gas purification performance than the catalyst of Reference Comparative Example 2 as the peak heating temperature increases. This indicates that the catalyst of Reference Example 4 is more resistant to degradation than the catalyst of Reference Comparative Example 2.

Without being limited to theory, it is possible that with the catalyst of Reference Comparative Example 2, random sintering of the rhodium particles took place as a result of heating at the peak heating temperature, since rhodium of various sizes from the single atom level to the submicrometer level was supported on the carrier, thus leading to degradation, whereas with the catalyst of Reference Example 4, the rhodium clusters were stably supported within the zeolite pores, such that degradation did not take place by the heat at the peak heating temperature.

The changes occurring when the peak heating temperature was 640° C. and 660° C. are changes in the firing process in which water molecules adsorbed to the zeolite were removed, and therefore it is essentially necessary to evaluate the catalytic activity from the change when the peak heating temperature is 700° C. or higher.

Reference Example 5 and Reference Comparative Example 3

With Reference Example 5 and Reference Comparative Example 3, catalysts having rhodium clusters supported on zeolite carrier particles or fumed silica carrier particles were obtained, and the obtained catalysts were evaluated for their catalyst durability.

Specifically, Reference Example 5 and Reference Comparative Example 3 were carried out in the following manner.

Reference Example 5

For Reference Example 5, rhodium clusters were supported on zeolite carrier particles in the same manner as Reference Example 1, except that a rhodium target was used instead of the gold target, and the zeolite carrier particles used were beta zeolite carrier particles (BEA) (Si/Al ratio: 40).

For the obtained rhodium cluster-supported catalyst ($Rh_{cluster}$/BEA), the temperature at which 50% of the supplied carbon monoxide was consumed ($T_{CO(50\%)}$) was evaluated during temperature increase and temperature decrease, in the same manner as Reference Example 4.

Reference Comparative Example 3

For Reference Comparative Example 3, rhodium clusters were supported on fumed silica particles in the same manner as Reference Example 1, except that a rhodium target was used instead of the gold target, and the carrier particles used were fumed silica particles.

For the rhodium cluster-supported catalyst ($Rh_{cluster}$/silica), the temperature at which 50% of the supplied carbon monoxide was consumed ($T_{CO(50\%)}$) was evaluated during temperature increase and temperature decrease, in the same manner as Reference Example 4.

<Evaluation: Durability>

Figure 7:
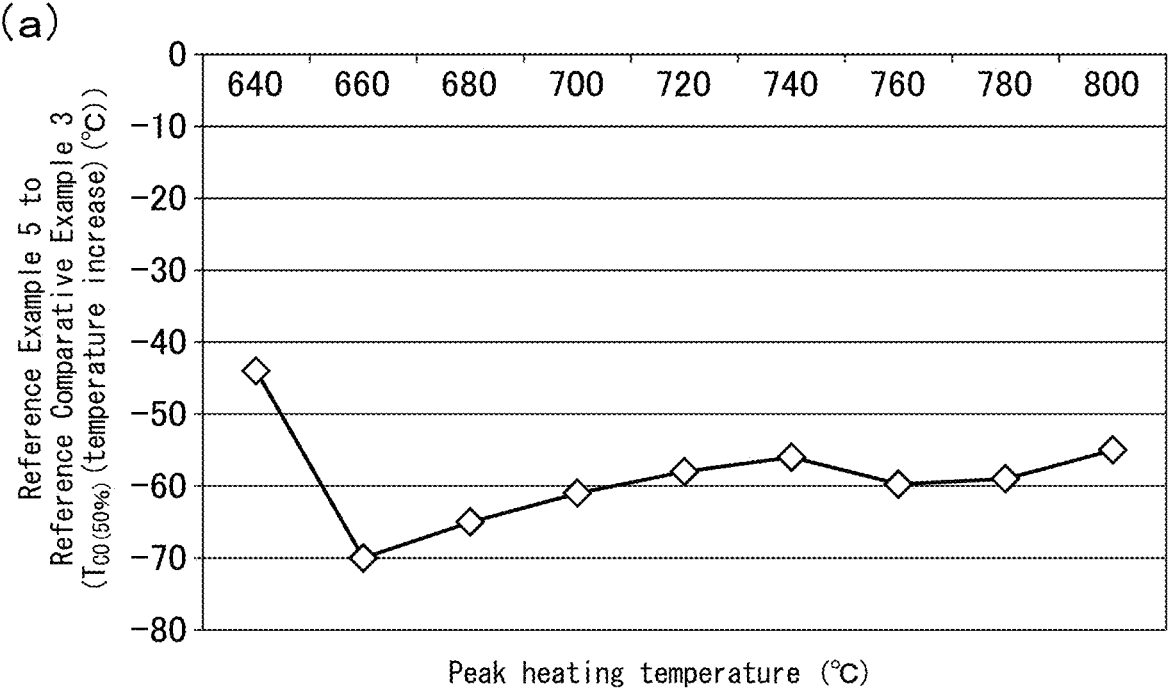
FIG. 7 is a pair of graphs showing carbon monoxide purification performance for the rhodium cluster-supported catalysts of Reference Example 5 and Reference Comparative Example 3.
Figure 7:
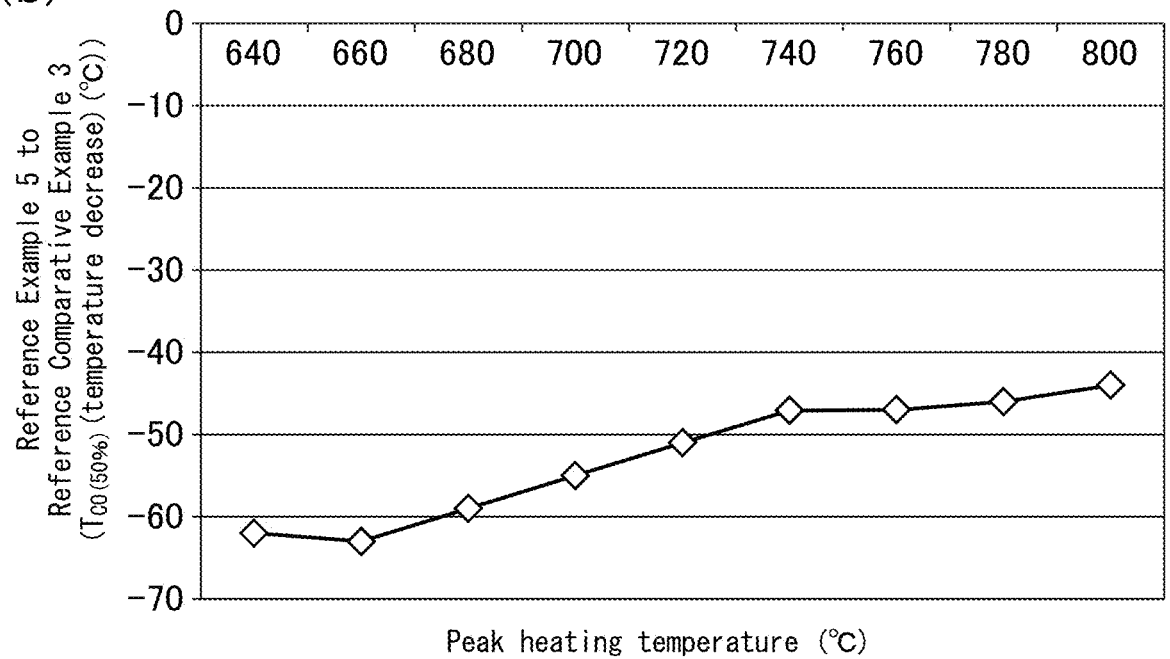

The evaluation results with temperature increase and temperature decrease are shown in FIGS. 7(a) and (b), as the difference between the results for Reference Example 5 and the results for Reference Comparative Example 3 (($T_{CO(50\%)}$ for Reference Example 5)–($T_{CO(50\%)}$ for Reference Comparative Example 3)). A negative value for the difference indicates that the $T_{CO(50\%)}$ of Reference Example 5 was lower than the $T_{CO(50\%)}$ of Reference Comparative Example 3, i.e. that the low-temperature activity of the catalyst of Reference Example 5 was excellent. In FIG. 7, the abscissa represents the temperature at which accelerated degradation treatment was carried out (the peak temperature in FIG. 5).

From FIGS. 7(a) and (b) it is implied that the catalyst of Reference Example 5 ($Rh_{cluster}$/BEA), which had rhodium clusters supported on beta zeolite carrier particles (BEA), had significantly superior low-temperature activity for all of the peak heating temperatures, compared to the catalyst of Reference Comparative Example 3 ($Rh_{cluster}$/silica) which had rhodium clusters supported on fumed silica carrier particles.

Without being limited to theory, it is possible that this is due to the fact that the fumed silica used in the catalyst of Reference Comparative Example 3 did not have pores, the rhodium clusters therefore being supported only on the surfaces, and consequently the rhodium clusters aggregated or underwent particle growth during loading of the rhodium clusters onto the carrier and/or during accelerated degradation. In other words, it is possibly due to the fact that the rhodium clusters of the catalyst of Reference Example 5 were stably supported within the pores of the zeolite carrier, whereas the rhodium clusters of the catalyst of Reference Comparative Example 3 were present on the outer surfaces of the fumed silica carrier.

Reference Example 6 and Reference Comparative Example 4

In Reference Example 6 and Reference Comparative Example 4, catalysts were obtained having rhodium clusters supported on zeolite carrier particles, or not supported, and the obtained catalysts were evaluated for their catalyst durability.

Specifically, Reference Example 6 and Reference Comparative Example 4 were carried out in the following manner.

Reference Example 6

For Reference Example 6, rhodium clusters were supported on zeolite carrier particles in the same manner as Reference Example 1, except that a rhodium target was used instead of the gold target, and the zeolite carrier particles used were type ZSM-5 zeolite carrier particles (MFI) (Si/Al ratio: 40).

For the obtained rhodium cluster-supported catalyst ($Rh_{cluster}$/MFI), the temperature at which 50% of the supplied carbon monoxide was consumed ($T_{CO(50\%)}$) was evaluated during temperature increase and temperature decrease, in the same manner as Reference Example 4.

Reference Comparative Example 4

In Reference Comparative Example 4, rhodium clusters were dispersed in acetone in the same manner as Reference Example 1, except that a rhodium target was used instead of the gold target, and no carrier particles were used. Next, at the stage where the rhodium clusters aggregated to form aggregated particles of rhodium clusters, type ZSM-5 zeolite carrier particles (MFI) (Si/Al ratio: 40) as zeolite carrier particles were added to acetone to support the aggregated particles of rhodium clusters on the type ZSM-5 zeolite carrier particles (MFI), thereby preparing a catalyst for Reference Comparative Example 4 ($Rh_{particle}$/MFI).

For the obtained rhodium aggregated particle-supported catalyst ($Rh_{particle}$/MFI), the temperature at which 50% of the supplied carbon monoxide was consumed ($T_{CO(50\%)}$) was evaluated during temperature increase and temperature decrease, in the same manner as Reference Example 4.

<Evaluation: Durability>

Figure 8:
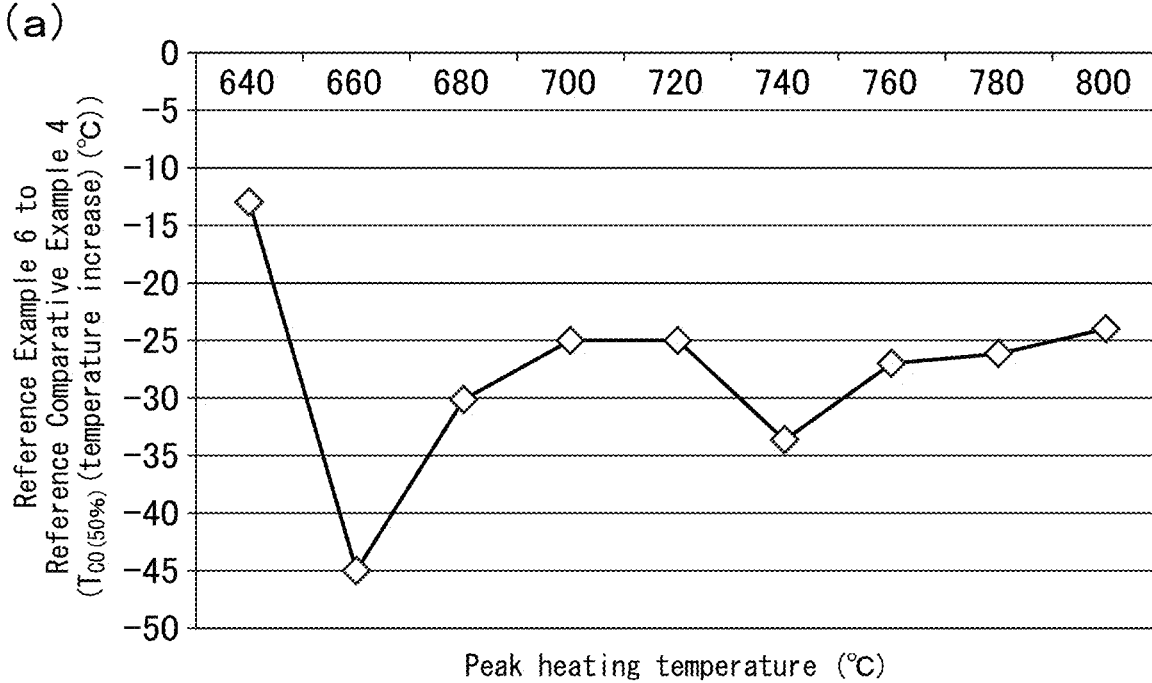
FIG. 8 is a pair of graphs showing carbon monoxide purification performance for the rhodium-supported catalysts of Reference Example 6 and Reference Comparative Example 4.
Figure 8:
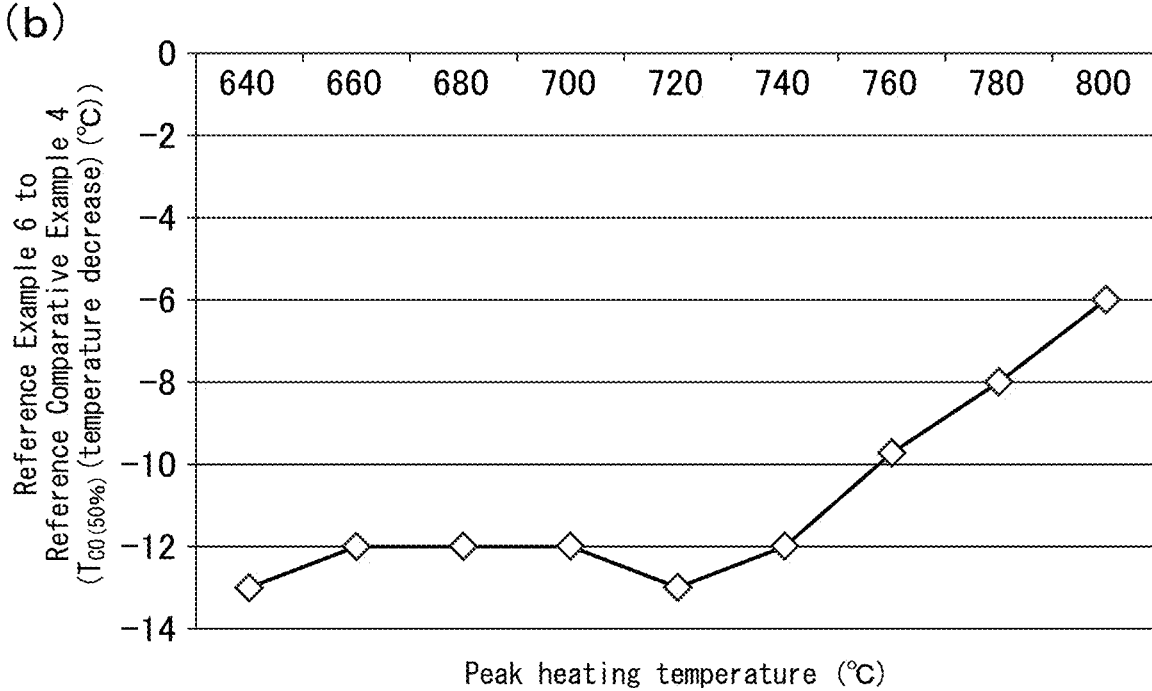

The evaluation results with temperature increase and temperature decrease are shown in FIGS. 8(a) and (b), as the difference between the results for Reference Example 6 and the results for Reference Comparative Example 4 (($T_{CO(50\%)}$ for Reference Example 6)–($T_{CO(50\%)}$ for Reference Comparative Example 4)). A negative value for the difference indicates that the $T_{CO(50\%)}$ of Reference Example 6 was lower than the $T_{CO(50\%)}$ of Reference Comparative Example 4, i.e. that the low-temperature activity of the catalyst of Reference Example 6 was excellent. In FIG. 8, the abscissa represents the temperature at which accelerated degradation treatment was carried out (the peak temperature in FIG. 5).

From FIGS. 8(a) and (b) it is implied that the catalyst of Reference Example 6 ($Rh_{cluster}$/MFI), having rhodium clusters supported on type ZSM-5 zeolite carrier particles (MFI), had significantly superior low-temperature activity for all of the peak heating temperatures, compared to the catalyst of Reference Comparative Example 4 ($Rh_{particle}$/MFI) having aggregated particles of rhodium clusters supported on type ZSM-5 zeolite carrier particles (MFI).

Without being limited to theory, it is possible that this is due to the fact that the particle sizes of the rhodium clusters used in the catalyst of Reference Example 6 were significantly smaller than the particle sizes of the aggregated particles of rhodium clusters used in the catalyst of Reference Comparative Example 4, whereby the low-temperature catalytic activity characteristic of clusters was exhibited, and a relatively large surface area could be provided for catalytic reaction.

Reference Examples 7 to 10

For Reference Examples 7 to 10, catalysts were obtained having rhodium clusters supported on zeolite carrier particles, and the obtained catalysts were evaluated for their catalyst durability.

Specifically, Reference Examples 7 to 10 were carried out in the following manner.

For Reference Examples 7 to 10, rhodium clusters were supported on zeolite carrier particles in the same manner as Reference Example 1, except that a rhodium target was used instead of the gold target, and the following carrier particles were used as the respective zeolite carrier particles.

Reference Example 7: Type ZSM-5 zeolite carrier particles (MFI) (Si/Al ratio: 1500)

Reference Example 8: Beta zeolite carrier particles (BEA) (Si/Al ratio: 1500)

Reference Example 9: Beta zeolite carrier particles (BEA) (Si/Al ratio: 40)

Reference Example 10: Type ZSM-5 zeolite carrier particles (MFI) (Si/Al ratio: 40)

For the obtained rhodium cluster-supported catalysts of Reference Examples 7 to 10, the temperature at which 50% of the supplied carbon monoxide was consumed ($T_{CO(50\%)}$) was evaluated during temperature increase and temperature decrease, in the same manner as Reference Example 4.

<Evaluation: Durability>

Figure 9:
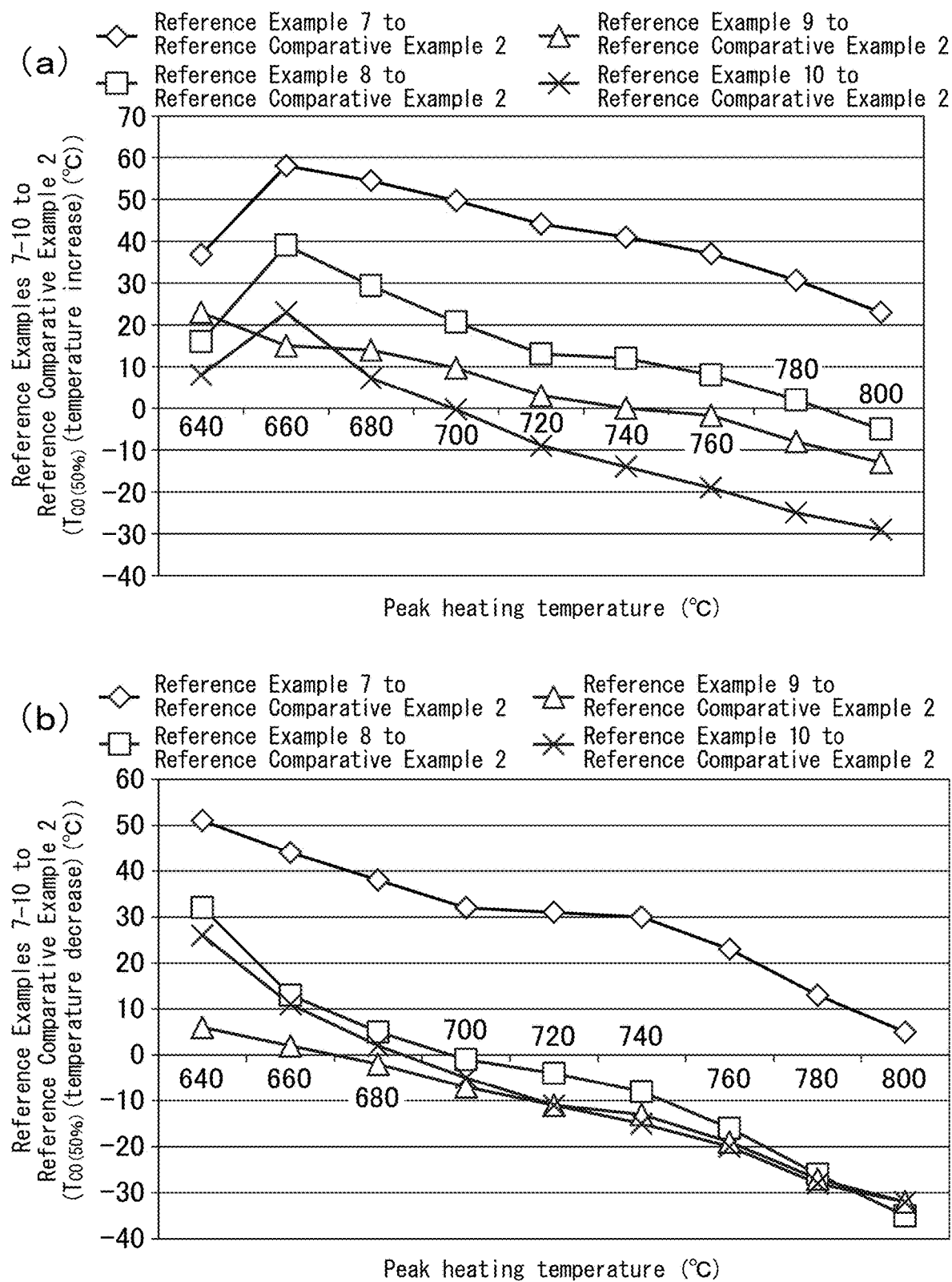
FIG. 9 is a pair of graphs showing carbon monoxide purification performance for the rhodium cluster-supported catalysts of Reference Examples 7 to 10.

The evaluation results with temperature increase and temperature decrease are shown in FIGS. 9(a) and (b), as the difference between the results for Reference Examples 7 to 10 and the results for Reference Comparative Example 2 (commercially available exhaust gas purifying catalyst) (($T_{CO(50\%)}$ for Reference Examples 7 to 10)−($T_{CO(50\%)}$ for Reference Comparative Example 2)). A negative value for the difference indicates that the $T_{CO(50\%)}$ of Reference Examples 7 to 10 was lower than the $T_{CO(50\%)}$ of Reference Comparative Example 2, i.e. that the low-temperature activity of the catalysts of Reference Examples 7 to 10 was excellent. In FIG. 9, the abscissa represents the temperature at which accelerated degradation treatment was carried out (the peak temperature in FIG. 5).

From FIGS. 6(a) and (b) it is implied that the catalysts of Reference Examples 7 to 10 exhibit superior or equivalent exhaust gas purification performance compared to the catalyst of Reference Comparative Example 2 as the peak heating temperature increases. This indicates that the catalysts of Reference Examples 7 to 10 are more resistant to degradation than the catalyst of Reference Comparative Example 2.

Without being limited to theory, it is possible that with the catalyst of Reference Comparative Example 2, random sintering of the rhodium particles took place as a result of heating at the peak heating temperature, since rhodium of various sizes from the single atom level to the submicrometer level was supported on the carrier, thus leading to degradation, whereas with the catalysts of Reference Examples 7 to 10, the rhodium clusters were stably supported within the zeolite pores, such that degradation did not take place by the heat at the peak heating temperature.

Incidentally, while the catalyst of Reference Example 7 exhibited inferior catalyst performance compared to the catalyst of Reference Comparative Example 2 in the temperature range of up to 800° C., it can be clearly seen from the curves in FIGS. 9(a) and (b) that when accelerated degradation was continued further, the performance of the catalyst of Reference Example 7 was superior to the performance of the catalyst of Reference Comparative Example 2.

Examining Reference Examples 7 and 10, which used type ZSM-5 zeolite carrier particles (MFI) as the carrier, shows that the catalyst of Reference Example 10, which used type ZSM-5 zeolite carrier particles having a Si/Al ratio of 40 (MFI(40)), had satisfactory catalyst performance compared to the catalyst of Reference Example 7 which used type ZSM-5 zeolite carrier particles with a Si/Al ratio of 1500 (MFI (1500)). This is thought to be because the type ZSM-5 zeolite carrier particles with a Si/Al ratio of 40 (MFI(40)) had more acid sites than the type ZSM-5 zeolite carrier particles with a Si/Al ratio of 1500 (MFI(1500)), whereby supporting of the rhodium clusters on the zeolite carrier particles was accomplished more satisfactorily via electrostatic interaction.

In addition, upon examining Reference Examples 8 and 9 which used beta zeolite as the carrier, the catalyst of Reference Example 9 which used beta zeolite carrier particles with a Si/Al ratio of 40 (BEA(40)), i.e. zeolite carrier particles with relatively numerous acid sites, was found, similar to MFI zeolite, to exhibit more satisfactory catalyst performance compared to the catalyst of Reference Example 8 which used beta zeolite carrier particles with a Si/Al ratio of 1500 (BEA(1500)), i.e. zeolite carrier particles with relatively few acid sites.

When using beta zeolite carrier particles (BEA), however, the difference in catalyst performance due to the difference in Si/Al ratio was not as notable as when using type ZSM-5 zeolite carrier particles (MFI). This is believed to be because beta zeolite carrier particles (BEA) have intrinsically greater surface solid acid strength, such that the effect of the difference due to different numbers of acid sites was less prominent.

For reference, the zeta potentials of the zeolite carrier particles used in Reference Examples 7 to 10 (as an index of solid acid strength), were as follows.

Reference Example 7: Type ZSM-5 zeolite carrier particles (MFI(1500)): −72.7 mV

Reference Example 8: Beta zeolite carrier particles (BEA (1500)): −96.8 mV

Reference Example 9: Beta zeolite carrier particles (BEA (40)): −117 mV

Reference Example 10: Type ZSM-5 zeolite carrier particles (MFI(40)): −87 mV

In other words, it is believed that with beta zeolite carrier particles (BEA), the zeta potential is low even with a large Si/Al ratio, whereby supporting of the rhodium clusters on the zeolite carrier particles is accomplished more satisfactorily via electrostatic interaction.

In order to confirm this belief, rhodium particles were supported on MFI(40) (zeta potential: −87 mV) and (MFI (1500)) (zeta potential: −72.7 mV) by submerged laser ablation, and it was found that coloration of the carrier particles by supporting of the rhodium particles in the carrier particles was more notable with MFI(40) than with MFI (1500).

This is understood to be because the rhodium particles were more satisfactorily supported in the carrier particles by electrostatic interaction between the rhodium particles and the acid sites of the carrier particles, compared to the MFI(40) which had relatively low zeta potential, i.e. relatively high acid strength.

Reference Examples 11 and 12

In Reference Examples 11 and 12, copper cluster-supported catalysts were obtained by submerged reduction, and the obtained catalysts were evaluated using fluorescence.

Reference Example 11

In Reference Example 11, zeolite carrier particles were dispersed in 2-propanol, to form a zeolite carrier particle dispersion, and then copper(II) chloride as a copper ion source and sodium borohydride (NaBH$_4$) as a reducing agent were mixed with the dispersion to synthesize copper clusters in the dispersion. The copper clusters synthesized in this manner were positively charged, whereby they were electrically drawn in and supported at the acid sites of the zeolite carrier particles.

Figure 10:
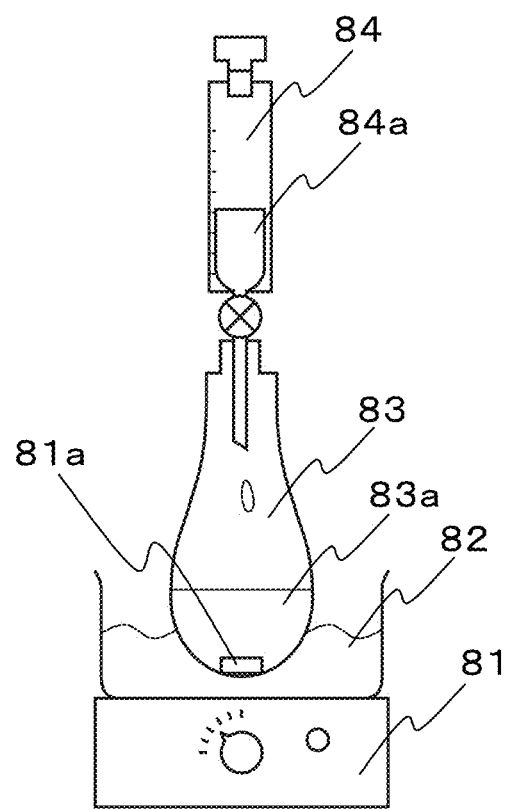
FIG. 10 is a schematic diagram of a device used to form clusters by submerged reduction.

Specifically, mixing of the copper(II) chloride and sodium borohydride was carried out using an apparatus such as illustrated in FIG. 10.

That is, a water bath 82 at approximately 10° C. was set on a magnetic stirrer 81, a flask 83 was placed inside it, a dropping funnel 84 was set on the flask 83, and the contents 84*a* of the dropping funnel 84 were dropped onto the contents 83*a* of the flask 83 while stirring with a stirrer 81*a*. The dropping was over a period of 1 hour while maintaining the temperature with the water bath, and upon completion of the dropping, stirring was continued for 1 hour which maintaining the temperature with the water bath, and then stirring was continued for another 2 hours at room temperature. The contents of the flask were then filtered and fired for 2 hours in air at a temperature of 300° C., to obtain a copper cluster-supported catalyst for Reference Example 11.

The contents 84*a* of the dropping funnel 84 and the contents 83*a* of the flask 83 for Reference Example 11 are shown in Table 2.

Reference Example 12

A copper cluster-supported catalyst was obtained for Reference Example 12 in the same manner as Reference Example 11, except that the contents 84*a* of the dropping funnel 84 and the contents 83*a* of the flask 83 were changed as shown in Table 2.

TABLE 2

|  |  | Example 11 |  | Example 12 |  |
|---|---|---|---|---|---|
| Dropping funnel | Sodium borohydride | 25 µmol | Copper chloride | 12 µmol |
|  | 2-Propanol | 10 mL | 2-Propanol | 5 mL |
| Flask | Copper chloride | 12 µmol | Sodium borohydride | 80 µmol |
|  | Zeolite carrier particles | 200 mg | Zeolite carrier particles | 200 mg |
|  | 2-Propanol | 200 mL | 2-Propanol | 200 mL |

<Evaluation: Fluorescence Spectra>

The fluorescence spectra at an excitation wavelength of 350 nm were measured for the copper cluster-supported catalysts prepared in Reference Examples 11 and 12, as well as for copper ion-exchanged zeolite carrier particles and protonated zeolite carrier particles as reference samples. The results are shown in FIG. 11.

Figure 11:
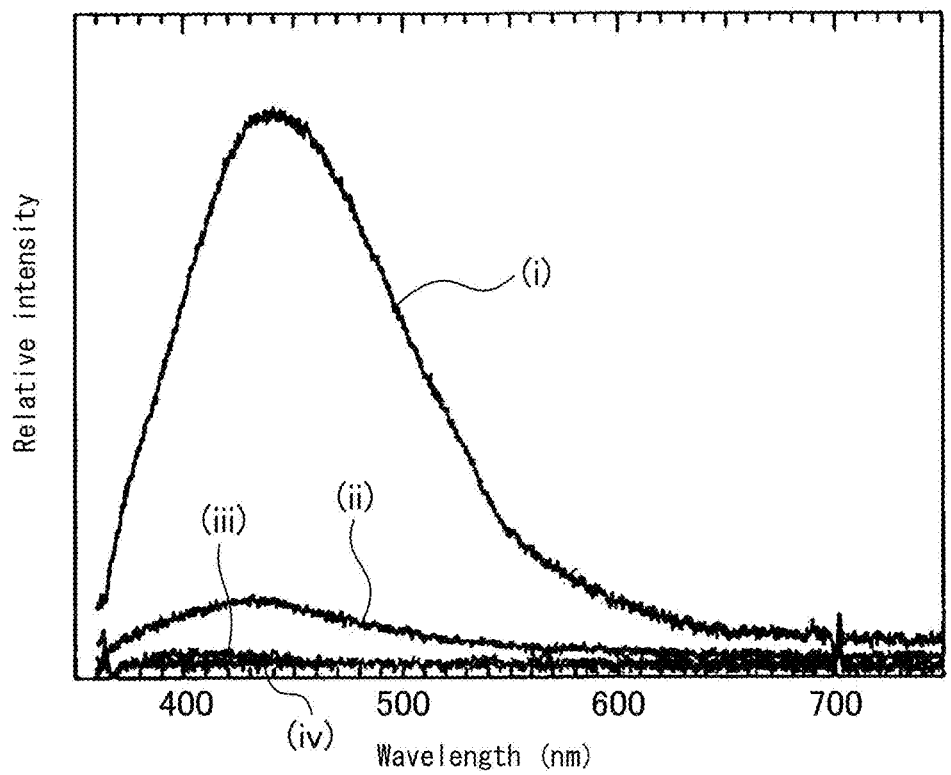
FIG. 11 is a graph showing fluorescence spectra (excitation wavelength: 350 nm) for a sample prepared in Reference Examples 11 and 12 in which clusters were formed by submerged reduction, and copper ion-exchanged zeolite carrier particles as a reference sample.

In FIG. 11, the results for Reference Example 11 are shown as spectrum (i), the results for Reference Example 12 are shown as spectrum (ii), the results for the copper ion-exchanged zeolite carrier particles as a reference sample are shown as spectrum (iii), and the results for the protonated zeolite carrier particles as a reference sample are shown as spectrum (iv).

As seen from FIG. 11, the copper cluster-supported catalyst obtained in Reference Examples 11 and 12, and particularly Reference Example 11, exhibited a peak at about 440 nm. The peak is assumed to be attributable to the copper clusters. With the copper cluster-supported catalyst obtained in Reference Example 11, the peak was broad with a half-width of about 100 nm, and is attributed to copper clusters.

<Evaluation: Fluorescence Spectra>

Also, the copper cluster-supported catalyst obtained in Reference Example 11 was measured to obtain the fluorescence spectrum with an excitation wavelength of 350 nm, and the excitation spectrum with fluorescence monitoring wavelengths of 440 nm and 520 nm. The results are shown in FIG. 12.

Figure 12:
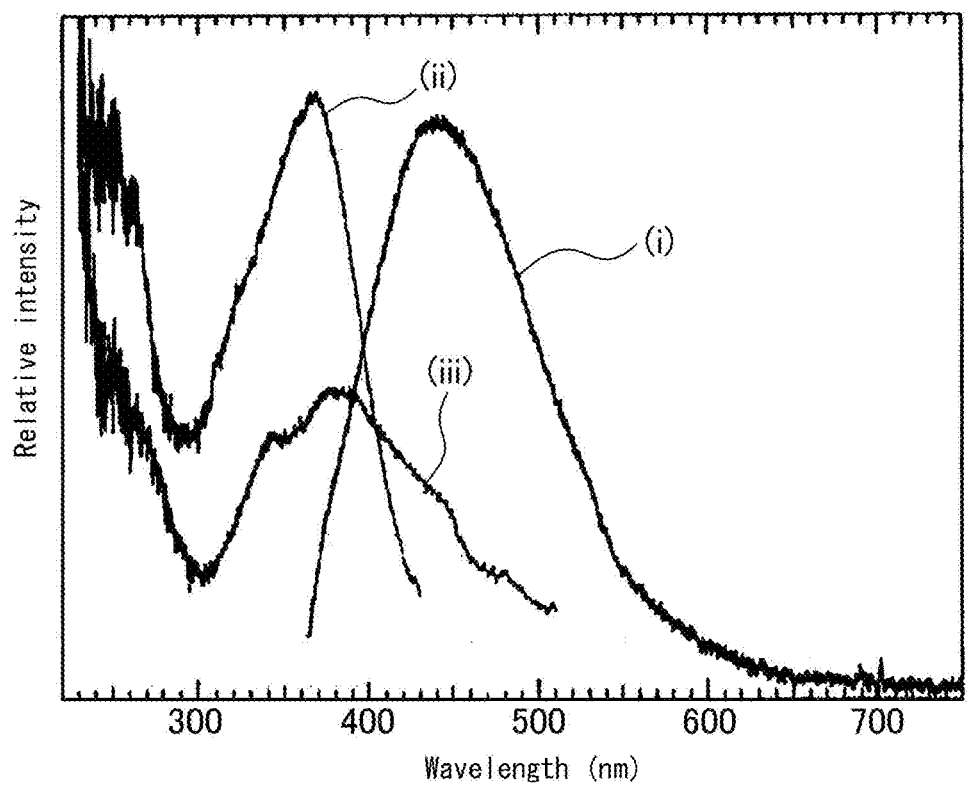
FIG. 12 is a graph showing fluorescence spectra (excitation wavelength: 350 nm) and excitation spectra (fluorescence monitor wavelengths: 440 nm, 520 nm) for Reference Example 11 in which clusters were formed by submerged reduction.

In FIG. 12, the results for the excitation wavelength of 350 nm are shown as fluorescence spectrum (i), the results for the fluorescence monitoring wavelength of 440 nm are shown as excitation spectrum (ii), and the results for the fluorescence monitoring wavelength of 520 nm are shown as excitation spectrum (iii).

The characteristic fluorescence of the copper clusters is seen in FIG. 12, thus indicating that the copper clusters were supported in the carrier particles.

Reference Example 13 and Reference Comparative Example 5

In Reference Example 13 and Reference Comparative Example 5, submerged laser ablation and ion-exchange/reduction, respectively, were used to obtain the rhodium cluster-supported catalysts.

Reference Example 13

For Reference Example 13, rhodium clusters were supported on zeolite carrier particles by submerged laser ablation in the same manner as Reference Example 1, except that a rhodium target was used instead of the gold target, and the zeolite carrier particles used were type ZSM-5 zeolite carrier particles (Si/Al ratio: 40).

Reference Comparative Example 5

For Reference Comparative Example 5, rhodium ions were supported on type ZSM-5 zeolite carrier particles (Si/Al ratio: 40) by ion-exchange, after which the rhodium ions were reduced to support the metal rhodium particles in the zeolite carrier particles, thereby supporting rhodium clusters in the zeolite carrier particles (ion-exchange/reduction). The rhodium ion source used was Rh(NO$_3$)$_3$, and the reducing agent used was NaBH$_4$.

<Evaluation: Fluorescence Spectra>

The fluorescence spectra of the supported catalysts of Reference Example 13 and Reference Comparative Example 5 were measured (excitation wavelength: 350 nm). The evaluation results for the fluorescence spectra are shown in FIG. 13, as a graph normalized to intensity per 1 mg of rhodium.

Figure 13:
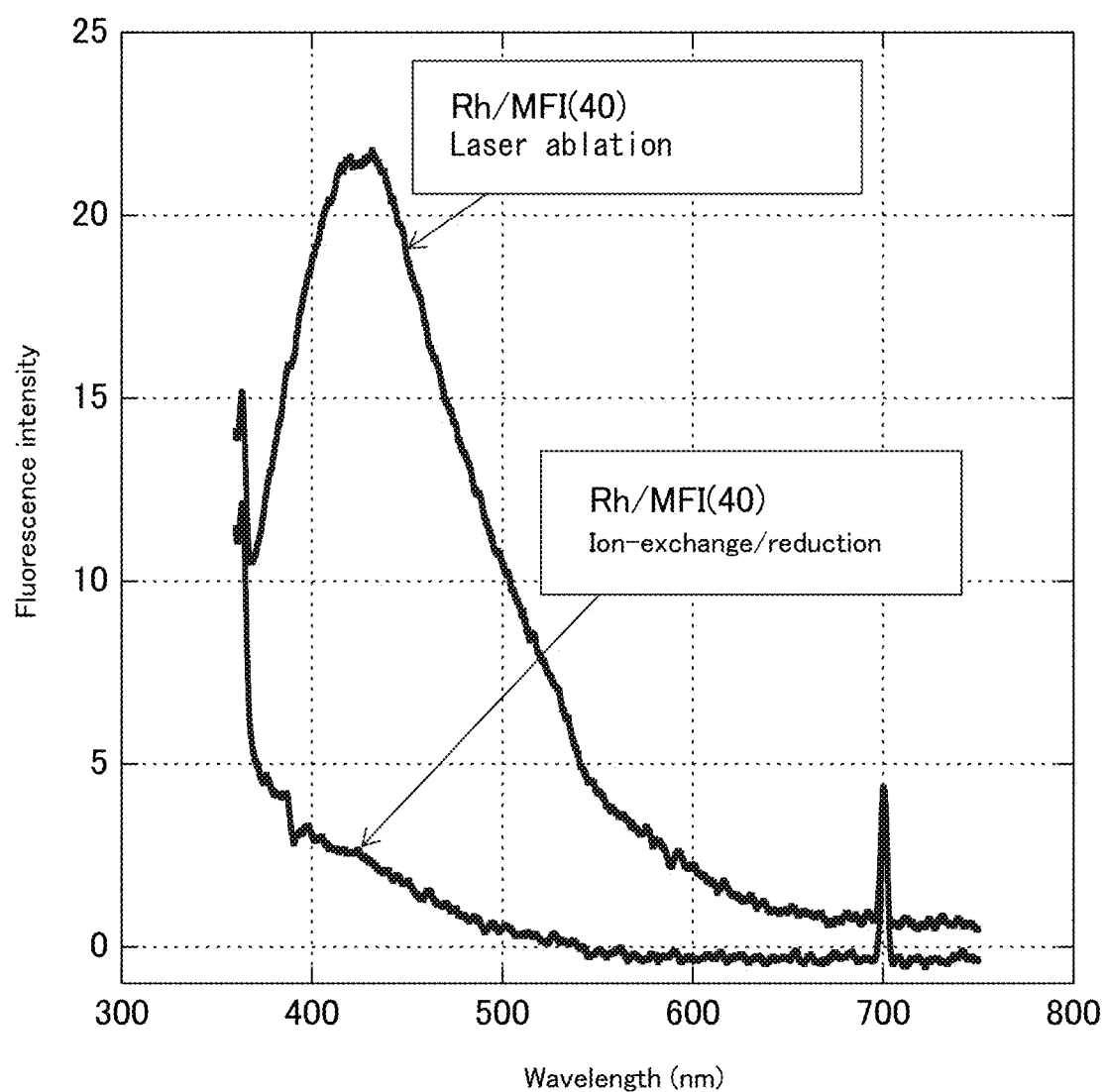
FIG. 13 is a graph showing fluorescence spectra for the rhodium cluster-supported catalysts of Reference Example 13 and Reference Comparative Example 5, prepared by submerged laser ablation and ion-exchange/reduction, respectively.

From FIG. 13 it is implied that in Reference Example 13 which used submerged laser ablation, the fluorescence peak was larger compared to Reference Comparative Example 5 which used ion-exchange/reduction, or in other words, relatively more rhodium particles had been supported in the zeolite carrier particles in the form of clusters.

Reference Example 14 and Reference Comparative Example 6

In Reference Example 14 and Reference Comparative Example 6, submerged laser ablation and ion-exchange/reduction, respectively, were used to obtain the gold cluster-supported catalysts.

Reference Example 14

For Reference Example 14, gold clusters were supported on zeolite carrier particles by submerged laser ablation in the same manner as Reference Example 1, except that the zeolite carrier particles used were type ZSM-5 zeolite carrier particles (MFI) (Si/Al ratio: 1500).

Reference Comparative Example 6

For Reference Comparative Example 6, gold ions were supported on type ZSM-5 zeolite carrier particles (MFI) (Si/Al ratio: 1500) by ion-exchange, after which the gold ions were reduced to support the gold clusters in the zeolite carrier particles (ion-exchange/reduction). The gold ion source used was chloroauric acid ($HAuCl_4$), and the reducing agent used was $NaBH_4$.

<Evaluation: Overall Composition Evaluation (ICP-OES)>

The overall elemental compositions of the supported catalysts of Reference Example 14 and Reference Comparative Example 6 were evaluated using inductively coupled plasma spectrometers (ICP-OES) (Agilent5100 by Agilent Technologies and SPS3000 by Hitachi High-Tech Science). The results are shown in Table 3 below.

<Evaluation: Surface composition evaluation (TEM-EDX)>

The supported catalyst surface elemental compositions of the supported catalysts of Reference Example 14 and Reference Comparative Example 6 were evaluated using a transmission electron microscope-energy dispersive X-ray spectroscope (TEM-EDX) (JEM-2100F and JED-2300 by JEOL Corp.). The results are shown in Table 3 below.

Reference Example 15 and Reference Comparative Example 7

In Reference Example 15 and Reference Comparative Example 7, submerged laser ablation and ion-exchange/reduction, respectively, were used to obtain the rhodium cluster-supported catalyst.

Reference Example 15

For Reference Example 15, rhodium clusters were supported on zeolite carrier particles by submerged laser ablation in the same manner as Reference Example 1, except that a rhodium target was used instead of the gold target, and the zeolite carrier particles used were type ZSM-5 zeolite carrier particles (Si/Al ratio: 40). The loading mass of rhodium with respect to the zeolite carrier particles was 0.1 mass %.

Reference Comparative Example 7

For Reference Comparative Example 7, rhodium ions were supported on type ZSM-5 zeolite carrier particles (Si/Al ratio: 40) by ion-exchange, after which the metal ions were reduced to carrier the metal rhodium particles in the zeolite carrier particles, thereby supporting rhodium clusters in the zeolite carrier particles (ion-exchange/reduction). The rhodium ion source used was $Rh(NO_3)_3$, and the reducing agent used was $NaBH_4$. The loading mass of rhodium with respect to the zeolite carrier particles was 0.051 mass %.

<Evaluation: $H_2$-TPR Test (Before Heat Endurance)>

The supported catalysts of Reference Example 15 and Reference Comparative Example 7 were pretreated by adsorbing oxygen in a 100 vol % oxygen atmosphere at 30° C. over a period of 1 hour, and then removing the excess oxygen in a helium atmosphere at 500° C. over a period of 1 hour.

The pretreated supported catalysts were subjected to a hydrogen temperature-programmed reduction ($H_2$-TPR) test by circulating reducing gas containing 0.5 vol % hydrogen and the remainder helium, with a space velocity of 10,000 $h^{-1}$, while raising the temperature from 20° C. at a rate of 10° C./min.

TABLE 3

| | | Example 14 (Au laser ablation/MFI (1500)) | Comp. Example 6 (Au ion-exchange reduction/MFI (1500)) |
|---|---|---|---|
| Overall (ICP-MASS) | Au (wt %) | 0.015 | 0.005 |
| | Si (wt %) | 38 | 41 |
| | Au/Si | $3.95 \times 10^{-4}$ | $1.22 \times 10^{-4}$ |
| Surface (TEM-EDX) | Au (wt %) | 0.46 | 0.44 |
| | Si (wt %) | 66.94 | 59.82 |
| | Au/Si | $6.87 \times 10^{-3}$ | $7.36 \times 10^{-3}$ |
| Non-homogeneity index | (Au/Si (surface))/ (Au/Si (overall)) | 17.39 | 60.33 |

From Table 3 it is implied that the supported catalyst of Reference Example 14 obtained by submerged laser ablation had a lower ratio between the overall proportion of gold atoms and the proportion of gold atoms on the surface, compared to the supported catalyst of Reference Comparative Example 6 obtained by ion-exchange/reduction, or in other words, that the gold clusters were dispersed more evenly in the supported catalyst.

Figure 14:
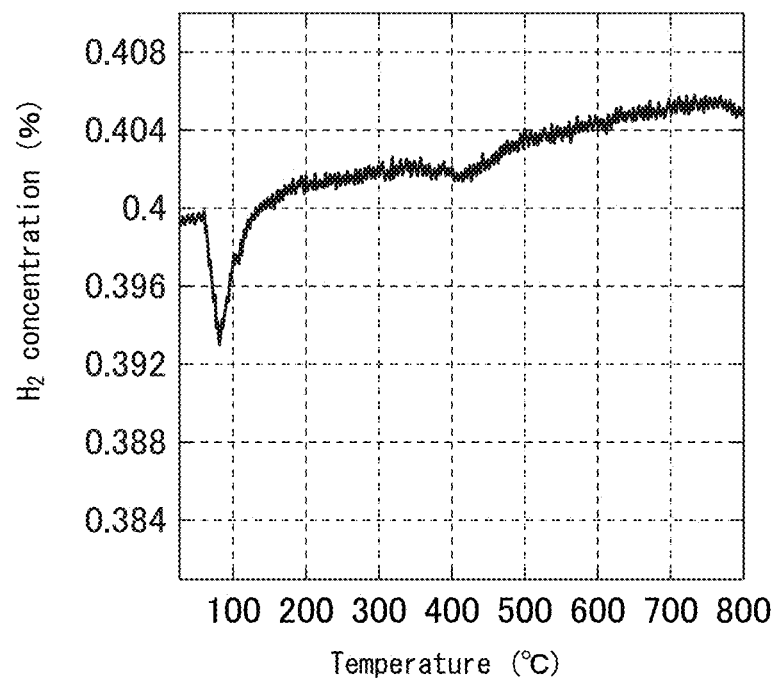
FIG. 14 is a pair of graphs showing the results of a hydrogen temperature-programmed reduction ($H_2$-TPR) test for the rhodium cluster-supported catalyst of Reference Example 15, prepared by submerged laser ablation.
Figure 14:
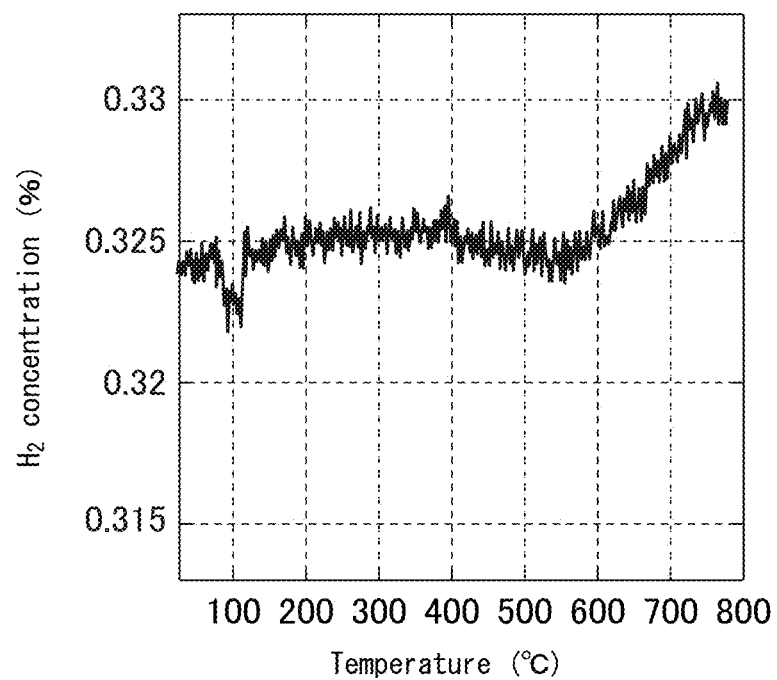
Figure 15:
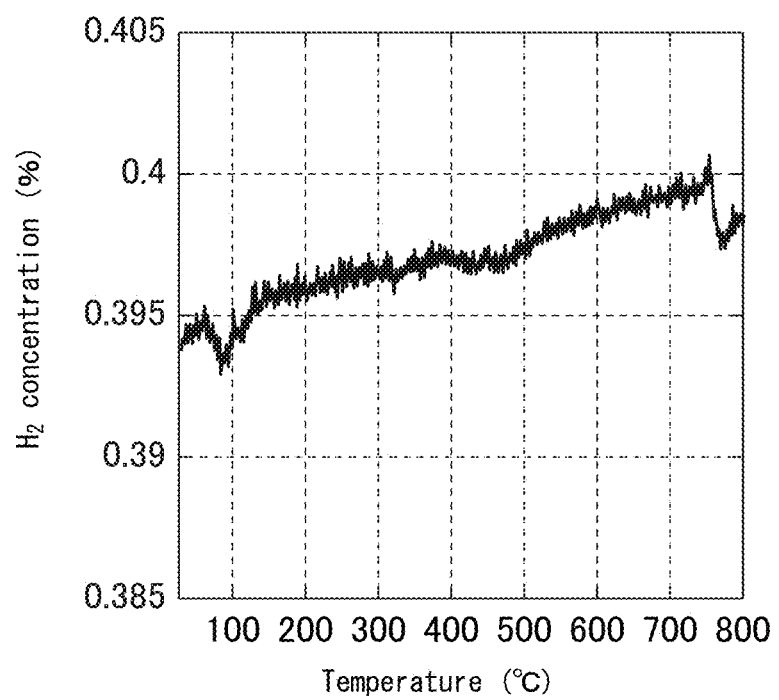
FIG. 15 is a pair of graphs showing the results of an $H_2$-TPR test for the rhodium cluster-supported catalyst of Reference Comparative Example 7, prepared by ion-exchange/reduction.
Figure 15:
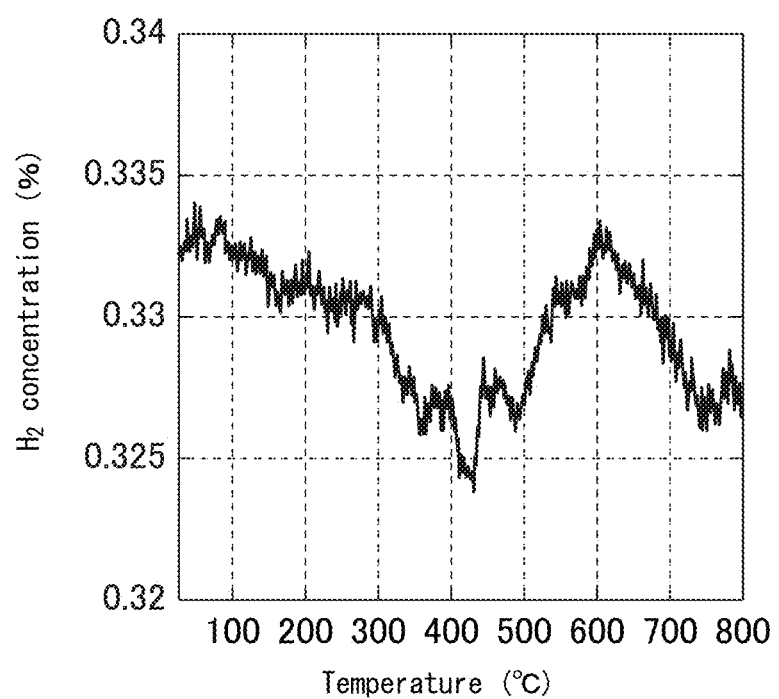

The results for the supported catalyst of Reference Example 15 are shown in FIG. 14(a), and the results for the supported catalyst of Reference Comparative Example 7 are shown in FIG. 15(a). The peak/noise ratio for the peak indicated by the arrow in FIG. 14(a) was 35.7 (noise level: 0.000215%), and the peak/noise ratio for the peak indicated by the arrow in FIG. 14(b) was 5.12 (noise level: 0.000394%).

From this graph it is implied that the supported catalysts of Reference Example 15 and Reference Comparative Example 7 both had a relatively large reaction peak between the supplied hydrogen and the oxygen adsorbed onto the cluster-supported catalysts i.e. a peak with a peak/noise ratio of 2.0 or greater, in a temperature range of 150° C. or below, or in other words, that they exhibited low-temperature activity.

<Evaluation: $H_2$-TPR Test (after Heat Endurance)>

The supported catalysts of Reference Example 15 and Reference Comparative Example 7 were subjected to heat endurance treatment in which they were heated for 2 hours in an atmosphere at 800° C. containing 20 vol % oxygen and the remainder helium, and then heated for 1 hour in an atmosphere at 800° C. containing 0.5 vol % hydrogen and the remainder helium.

The supported catalysts subjected to this heat endurance treatment were pretreated in the manner described above.

The pretreated supported catalysts were subjected to a $H_2$-TPR test in the manner described above.

The results for the supported catalyst of Reference Example 15 are shown in FIG. 14(b), and the results for the supported catalyst of Reference Comparative Example 7 are shown in FIG. 15(b). The peak/noise ratio for the peak indicated by the arrow in FIG. 15(a) was 7.76 (noise level: 0.000326%), and the peak/noise ratio for the peak indicated by the arrow in FIG. 15(b) was 1.62 (noise level: 0.000377%).

From FIG. 14(b) it is implied that the supported catalyst of Reference Example 15 had a relatively large reaction peak in the temperature range of 150° C. or below, i.e. that it exhibited low-temperature activity. From FIG. 15(b) it is implied that the supported catalyst of Reference Comparative Example 7 had essentially no peak in the temperature range of 150° C. or below, i.e. that it did not have a peak with a peak/noise ratio of 2.0 or greater. The fact that the supported catalyst of Reference Comparative Example 7 had essentially no peak in the temperature range of 150° C. or below means that it did not exhibit low-temperature activity. In other words, it is implied that with the supported catalyst of Reference Comparative Example 7 obtained by ion-exchange/reduction, the cluster particle dispersibility was low and the heat resistance was inferior as a result.

Reference Example 16 and Reference Comparative Example 8

In Reference Example 16 and Reference Comparative Example 8, submerged laser ablation and ion-exchange/reduction, respectively, were used to obtain palladium cluster-supported catalysts.

Reference Example 16

For Reference Example 16, palladium clusters were supported on zeolite carrier particles by submerged laser ablation in the same manner as Reference Example 1, except that a palladium target was used instead of the gold target, and the zeolite carrier particles used were type ZSM-5 zeolite carrier particles (Si/Al ratio: 40). The loading mass of palladium with respect to the zeolite carrier particles was 0.09 mass %.

Reference Comparative Example 8

For Reference Comparative Example 8, palladium ions were supported on type ZSM-5 zeolite carrier particles (Si/Al ratio: 40) by ion-exchange, after which the palladium ions were reduced to support the metal palladium particles in the zeolite carrier particles, thereby supporting palladium clusters in the zeolite carrier particles (ion-exchange/reduction). The palladium ion source used was $Pd(NH_3)_4Cl_2$—$H_2O$ (tetramine palladium(II) chloride monohydrate), and the reducing agent used was $NaBH_4$. The loading mass of palladium with respect to the zeolite carrier particles was 0.86 mass %.

<Evaluation: Carbon Monoxide Oxidation Test>

The supported catalysts of Reference Example 16 and Reference Comparative Example 8 were subjected to heat endurance treatment by heating for 10 hours in an atmosphere at 800° C. containing 20 vol % oxygen and the remainder helium.

A model gas containing 0.3 vol % carbon monoxide, 8.0 vol % oxygen and the remainder helium was circulated through the aforementioned supported catalysts that had been subjected to heat endurance treatment, at a rate of 10° C./min with a space velocity of 10,000 $h^{-1}$, and the temperature was increased from room temperature to 800° C., after which the temperature was decreased to room temperature, and the number of carbon monoxide molecules that could be oxidized to carbon dioxide molecules by one palladium atom at a temperature of 100° C. during the temperature decrease was evaluated.

The number of molecules can be determined by dividing the number of moles of carbon dioxide molecules in the post-reaction model gas flowing per second by the number of moles of palladium as the catalyst metal in the supported catalyst.

Figure 16:
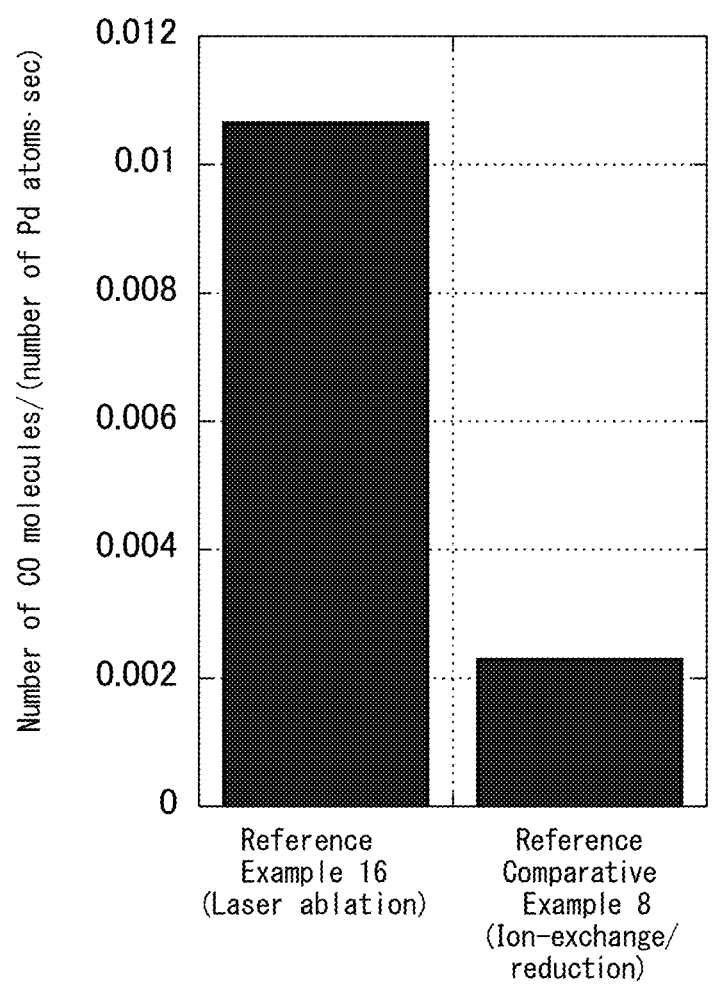
FIG. 16 is a graph showing the results of a carbon monoxide oxidation test for the palladium cluster-supported catalysts of Reference Example 16, prepared by submerged laser ablation, and Reference Comparative Example 8, prepared by ion-exchange/reduction.

FIG. 16 shows the results for the supported catalysts of Reference Example 16 and Reference Comparative Example 8. FIG. 16 shows that with the supported catalyst of Reference Example 16 that was obtained by laser ablation, the number of carbon monoxide molecules that could be oxidized to carbon dioxide molecules by one palladium atom was nearly 0.008, while the number did not reach 0.002 with the supported catalyst of Reference Comparative Example 8 that was obtained by ion-exchange/reduction. This indicates that with the supported catalyst of Reference Comparative Example 8 obtained by ion-exchange/reduction, the cluster particle dispersibility was low and the heat resistance was inferior as a result.

Reference Example 17 and Reference Comparative Example 9

In Reference Example 17 and Reference Comparative Example 9, submerged laser ablation and ion-exchange/reduction, respectively, were used to obtain platinum cluster-supported catalysts.

Reference Example 17

For Reference Example 17, platinum clusters were supported on zeolite carrier particles by submerged laser ablation in the same manner as Reference Example 1, except that a platinum target was used instead of the gold target, and the zeolite carrier particles used were type ZSM-5 zeolite carrier particles (Si/Al ratio: 40). The loading mass of platinum with respect to the zeolite carrier particles was 1.1 mass %.

Reference Comparative Example 9

For Reference Comparative Example 9, platinum ions were supported on type ZSM-5 zeolite carrier particles (Si/Al ratio: 40) by ion-exchange, after which the platinum ions were reduced to carrier the metal platinum particles in the zeolite carrier particles, thereby supporting platinum clusters in the zeolite carrier particles (ion-exchange/reduction). The platinum ion source used was $Pt(NH_3)_4Cl_2 \cdot xH_2O$ (tetramine platinum(II) chloride hydrate), and the reducing agent used was $NaBH_4$. The loading mass of platinum with respect to the zeolite carrier particles was 1.9 mass %.

<Evaluation: Carbon Monoxide Oxidation Test>

The supported catalysts of Reference Example 17 and Reference Comparative Example 9 were subjected to heat endurance treatment by heating for 10 hours in an atmosphere at 800° C. containing 20 vol % oxygen and the remainder helium.

A model gas containing 0.3 vol % carbon monoxide, 8.0 vol % oxygen and the remainder helium was circulated through the aforementioned supported catalysts that had been subjected to heat endurance treatment, at a rate of 10° C./min with a space velocity of 10,000 $h^{-1}$, and the temperature was increased from room temperature to 800° C., after which the temperature was decreased to room temperature, and the number of carbon monoxide molecules that could be oxidized to carbon dioxide molecules by one platinum atom at a temperature of 60° C. during the temperature decrease was evaluated.

Figure 17:
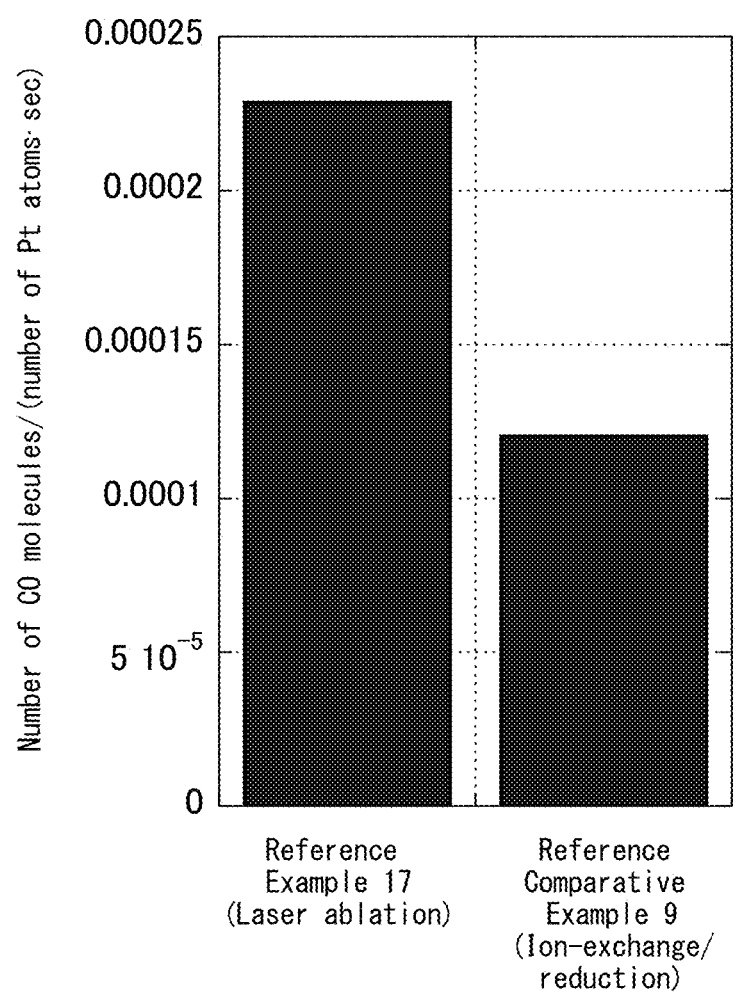
FIG. 17 is a graph showing the results of a carbon monoxide oxidation test for the platinum cluster-supported catalysts of Reference Example 17, prepared by submerged laser ablation, and Reference Comparative Example 9, prepared by ion-exchange/reduction.

FIG. 17 shows the results for the supported catalysts of Reference Example 17 and Reference Comparative Example 9. FIG. 17 shows that with the supported catalyst of Reference Example 17 that was obtained by laser ablation, the number of carbon monoxide molecules that could be oxidized to carbon dioxide molecules by one platinum atom was nearly 0.0002, while the number did not reach 0.0001 with the supported catalyst of Reference Comparative Example 9 that was obtained by ion-exchange/reduction. This indicates that with the supported catalyst of Reference Comparative Example 9 obtained by ion-exchange/reduction, the cluster particle dispersibility was low and the heat resistance was inferior as a result.

Reference Example 18 and Reference Comparative Example 10

In Reference Example 18 and Reference Comparative Example 10, submerged laser ablation and ion-exchange/reduction, respectively, were used to obtain copper cluster-supported catalysts.

Reference Example 18

For Reference Example 18, copper clusters were supported on zeolite carrier particles by submerged laser ablation in the same manner as Reference Example 1, except that a copper target was used instead of the gold target, and the zeolite carrier particles used were chabazite (CHA) zeolite carrier particles. The loading mass of copper with respect to the zeolite carrier particles was 0.9 mass %.

Reference Comparative Example 10

For Reference Comparative Example 10, copper ions were supported on chabazite (CHA) zeolite carrier particles by ion-exchange, after which the copper ions were reduced to carrier the metal copper particles in the zeolite carrier particles, thereby supporting copper clusters in the zeolite carrier particles (ion-exchange/reduction). The copper ion source used was copper nitrate, and the reducing agent used was $NaBH_4$. The loading mass of copper with respect to the zeolite carrier particles was 0.9 mass %.

<Evaluation: Nitrogen Monoxide Heating Desorption Test>

The supported catalysts of Reference Example 18 and Reference Comparative Example 10 were heated at 800° C. for 1 hour in an atmosphere containing 10 vol % oxygen and the remainder helium and heated at 800° C. for 30 minutes in an atmosphere containing 100 vol % helium, and the temperature of the atmosphere was raised to 25° C., after which they were held for 1 hour in an atmosphere containing 500 ppm by volume of nitrogen monoxide and the remainder helium and held for 1 hour in an atmosphere containing 100 vol % helium, to adsorb nitrogen monoxide onto the supported catalyst.

The supported catalyst with nitrogen monoxide adsorbed in this manner was heated to 800° C. at a temperature-elevating rate of 10° C./min in an atmosphere containing 100 vol % helium, and the amount of nitrogen monoxide desorbed during that time was detected with a mass spectrometer to obtain a nitrogen monoxide temperature-increase desorption spectrum. The gas flow rate of the atmosphere was 10 sccm for both.

Figure 18:
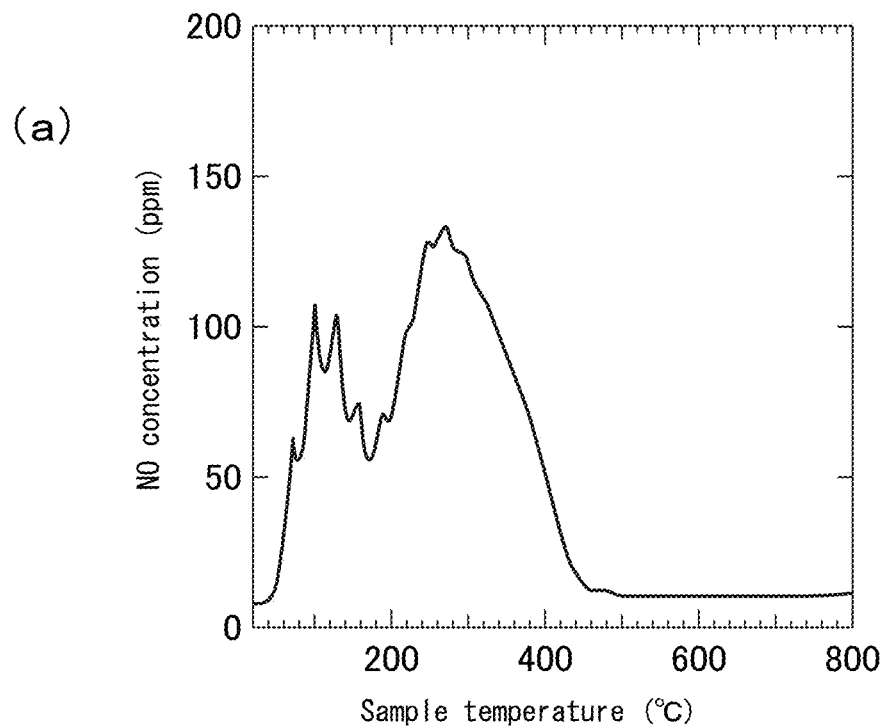
FIG. 18 is a pair of graphs showing the results of a nitrogen monoxide heating desorption test for the copper cluster-supported catalysts of Reference Example 18, prepared by submerged laser ablation, and Reference Comparative Example 10, prepared by ion-exchange/reduction.
Figure 18:
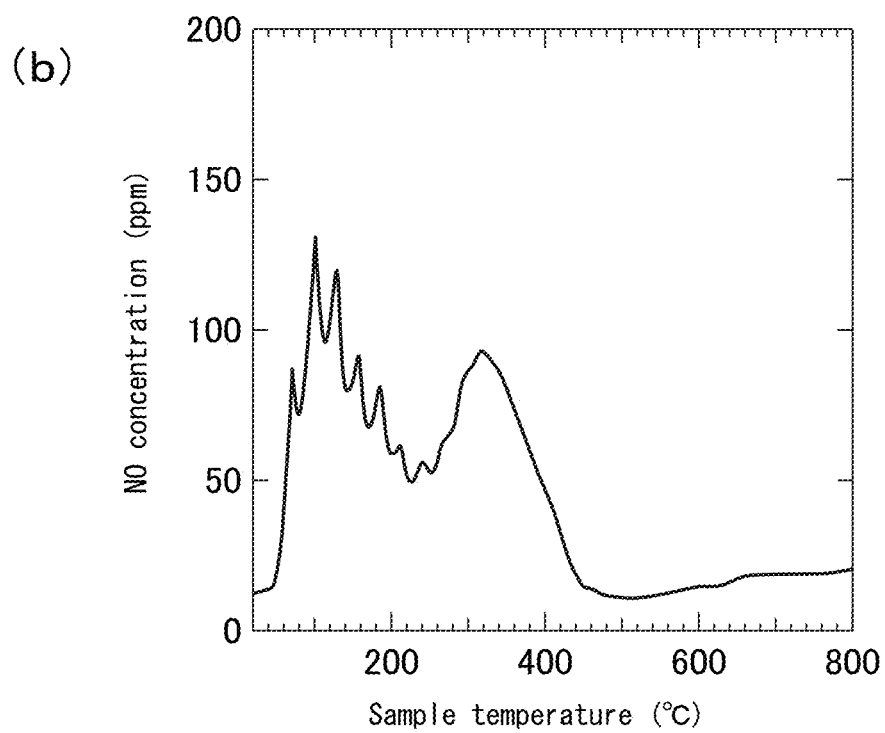

FIGS. 18(a) and (b) show the results for the supported catalysts of Reference Example 18 and Reference Comparative Example 10, respectively.

FIG. 18(a) shows that with the supported catalyst of Reference Example 18 obtained by laser ablation, the maximum peak in the range of 200° C. to 400° C. was at approximately 270° C. In contrast, FIG. 18(b) shows that with the supported catalyst of Reference Comparative Example 10 obtained by ion-exchange/reduction, the maximum peak in the range of 200° C. to 400° C. was at approximately 320° C. The sharp peak observed at a temperature of below approximately 200° C. is believed to be a measuring error due to fluctuation in the measuring temperature.

The difference in maximum peak temperatures shown in FIGS. 18(a) and (b) indicates that the supported catalyst of Reference Example 18 which was obtained by laser ablation and the supported catalyst of Reference Comparative Example 10 which was obtained by ion-exchange/reduction had mutually different structures.

Reference Example 19 and Reference Comparative Example 11

In Reference Example 19 and Reference Comparative Example 11, plus-minus inversion and ion-exchange/reduction, respectively, were used to obtain platinum cluster-supported catalysts.

Reference Example 19

In Reference Example 19, zeolite MFI (40) was added to 200 ml of an aqueous solution containing 10 mM $H_2[PtCl_6]$ in purified water and a pulse laser was focused to introduce it into the aqueous solution, decomposing the $H_2[PtCl_6]$ to form positively charged platinum clusters, and the positively charged platinum clusters were supported on the zeolite acid sites by electrostatic interaction.

Reference Comparative Example 11

In Reference Comparative Example 11, $H_2[PtCl_6]$ in purified water was supported on zeolite MFI (40) by ion-exchange. The loading mass of platinum with respect to the zeolite carrier particles was 0.003 mass %.

<Evaluation: Fluorescence Spectra>

Figure 19:
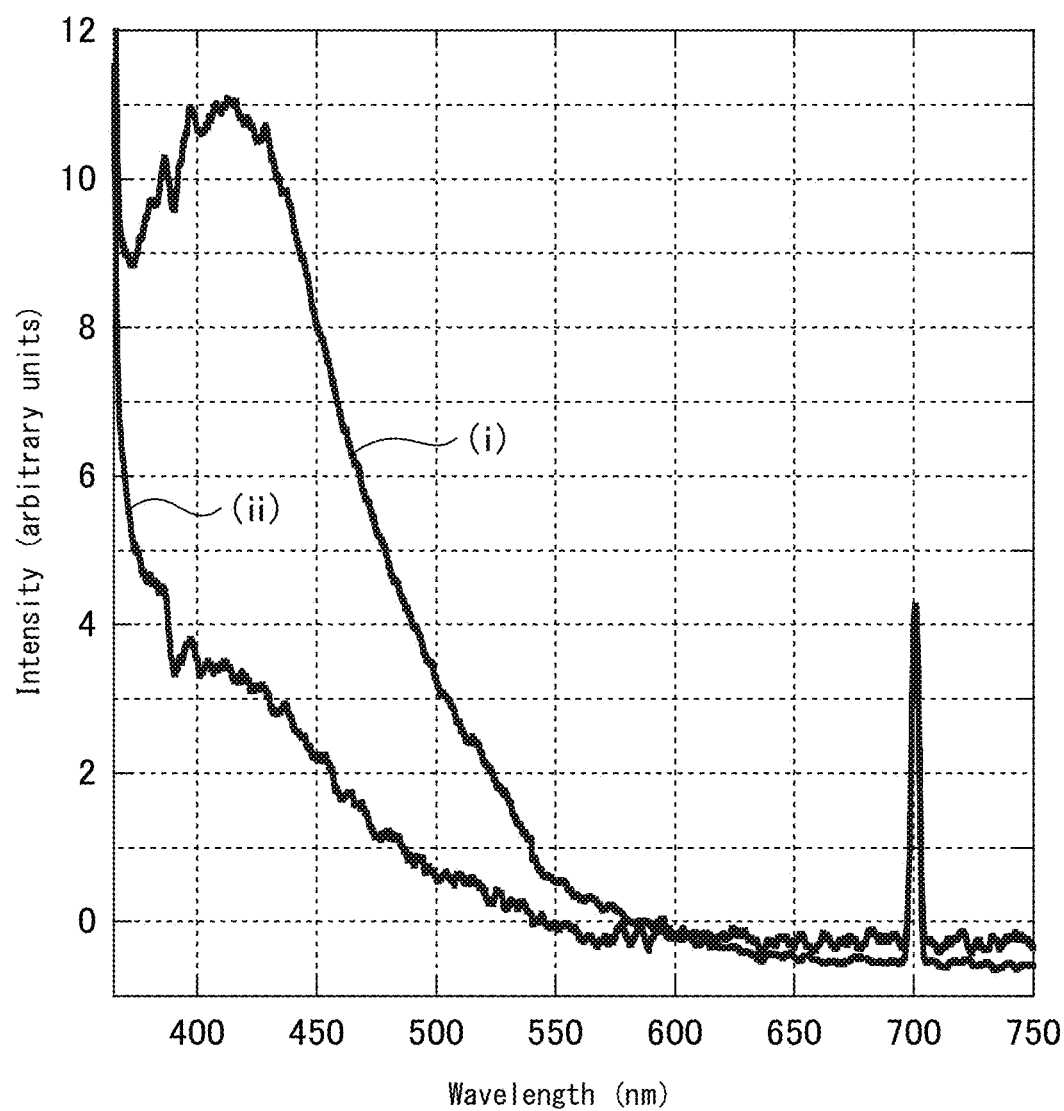
FIG. 19 is a graph showing fluorescence spectra for the platinum cluster-supported catalysts of Reference Example 19, prepared by plus-minus inversion, and Reference Comparative Example 11, prepared by ion-exchange/reduction.

The fluorescence spectra of the platinum cluster-supported catalysts of Reference Example 19 and Reference Comparative Example 11 were measured (excitation wavelength: 350 nm). The fluorescence spectrum evaluation results are shown in FIG. 19. In FIG. 19, the results for Reference Example 18 are shown as spectrum (i), and the results for Reference Comparative Example 11 are shown as spectrum (ii).

In FIG. 19, the fluorescent signal near 410 nm is the spectrum of overlapping fluorescence from approximately tetramer platinum clusters. Therefore, FIG. 19 indicates that with the platinum cluster-supported catalyst of Reference Example 18, approximately tetramer platinum clusters were supported relatively abundantly on the carrier particles. It also shows, in contrast, that such clusters were not significantly present in the platinum supported catalyst of Reference Comparative Example 11.

Reference Example 20 and Reference Comparative Example 12

In Reference Example 20 and Reference Comparative Example 12, submerged laser ablation and ion-exchange/reduction, respectively, were used to obtain the rhodium cluster-supported catalyst.

Reference Example 20

For Reference Example 20, rhodium clusters were supported on zeolite carrier particles by submerged laser ablation in the same manner as Reference Example 1, except that a rhodium target was used instead of the gold target, and the zeolite carrier particles used were type ZSM-5 zeolite carrier particles (Si/Al ratio: 40). The loading mass of rhodium with respect to the zeolite carrier particles was 0.1 mass %.

Reference Comparative Example 12

For Reference Comparative Example 12, rhodium ions were supported on type ZSM-5 zeolite carrier particles (Si/Al ratio: 40) by ion-exchange, after which the rhodium ions were reduced to carrier the rhodium clusters in the zeolite carrier particles. The rhodium ion source used was $Rh(NO_3)_3$, and the reducing agent used was $NaBH_4$. The loading mass of rhodium with respect to the zeolite carrier particles was 0.051 mass %.

<Evaluation: Nitrogen Monoxide Reduction Test>

Heating was carried out for 1 hour in an atmosphere at 800° C. containing 8 vol % oxygen, 0.3 vol % carbon monoxide and the remainder helium, for heat endurance treatment.

A model gas containing 0.1 vol % $^{15}NO$, 0.65 vol % CO and the remainder helium was circulated through the supported catalyst that had been subjected to heat endurance treatment, with a space velocity of 10,000 $h^{-1}$, the temperature was increased from room temperature to 800° C. at a rate of 10° C./min (temperature increase) and then decreased to room temperature (temperature decrease), and the nitrogen monoxide reduction reaction was measured.

Figure 20:
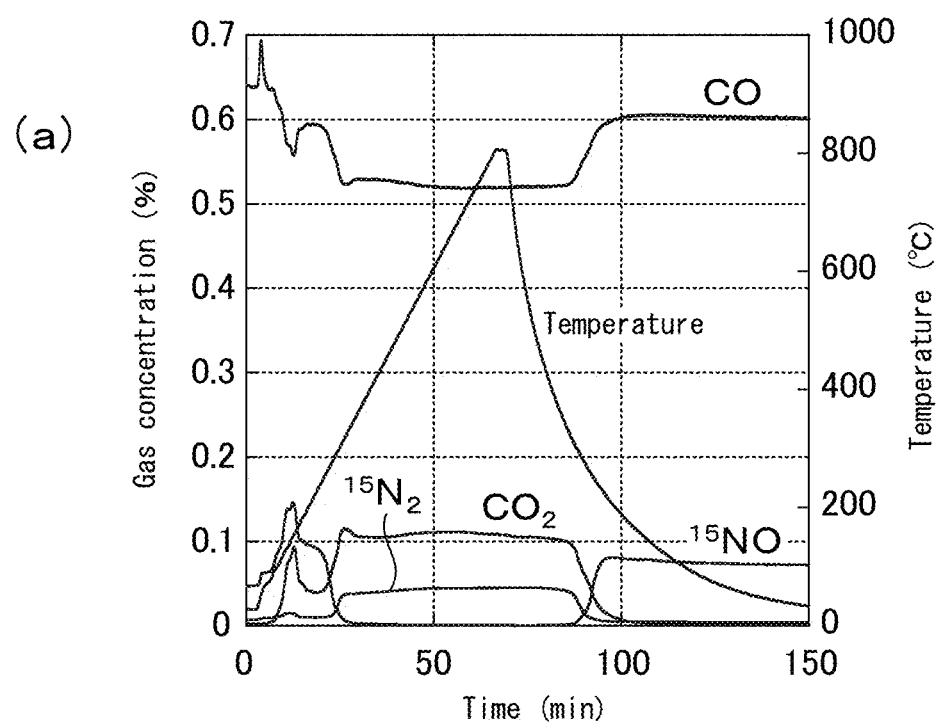
FIG. 20 is a pair of graphs showing the results of a nitrogen monoxide reduction test (gas composition) for the rhodium cluster-supported catalysts of Reference Example 20, prepared by submerged laser ablation, and Reference Comparative Example 12, prepared by ion-exchange/reduction.
Figure 20:
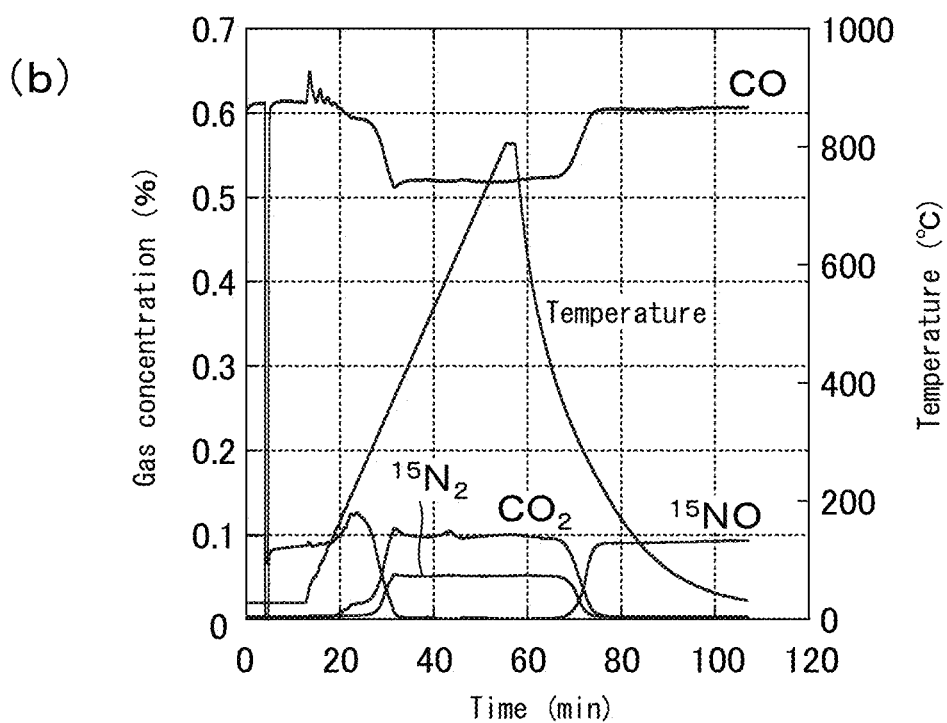

The evaluation results for the catalyst of Reference Example 20 are shown in FIG. 20(*a*) and the evaluation results for the catalyst of Reference Comparative Example 12 are shown in FIG. 20(*b*), as the changes in concentration of each component by the nitrogen monoxide reduction reaction.

In FIGS. 20(*a*) and (*b*), nitrogen monoxide showed a peak in the range of 100° C. to 200° C., but this was a concentration increase due to desorption of nitrogen monoxide that had adsorbed onto the catalyst. With further increase in the reaction temperature, the nitrogen monoxide concentration decreased, and a reaction commenced in which nitrogen monoxide ($^{15}NO$) was reduced by carbon monoxide (CO) to produce nitrogen ($N_2$).

The reaction temperature at which half of the supplied nitrogen monoxide was reduced to nitrogen, i.e. the reaction temperature at which the nitrogen concentration reached 0.05 vol %, was approximately 272° C. during the temperature increase and 254° C. during the temperature decrease with the catalyst of Reference Example 20, wile it was approximately 321° C. during temperature increase and 279° C. during temperature decrease with the catalyst of Reference Comparative Example 12. Therefore, the catalyst of Reference Example 20 which was obtained by submerged laser ablation clearly had superior low-temperature activity compared to the catalyst of Reference Comparative Example 12 which was obtained by ion-exchange/reduction.

Figure 21:
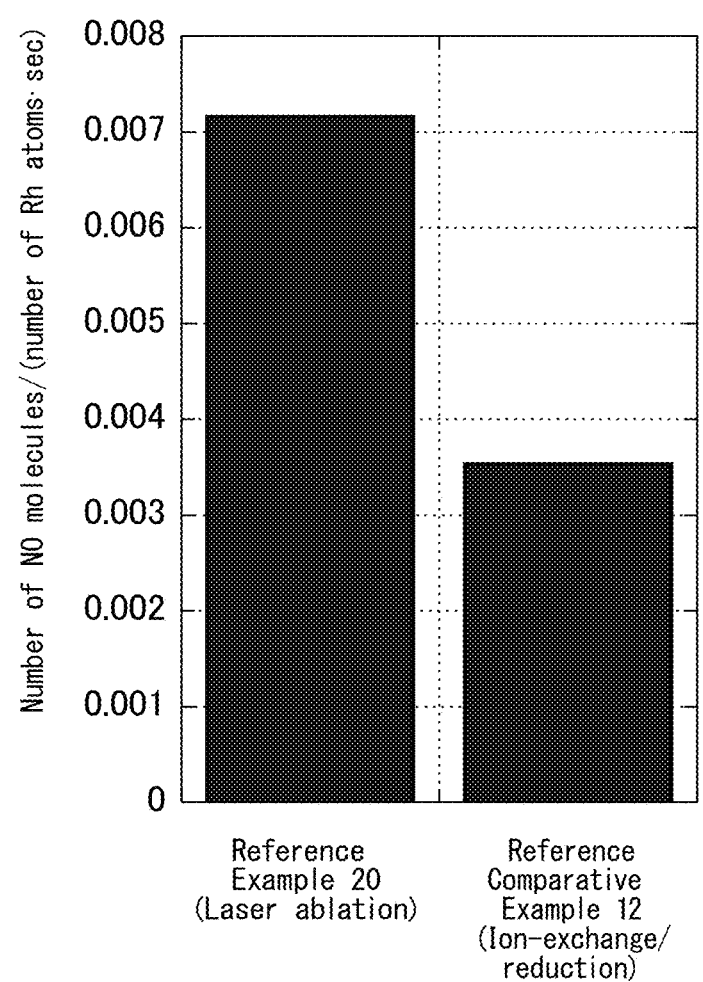
FIG. 21 is a pair of graphs showing the results of a nitrogen monoxide reduction test (gas composition) for the rhodium cluster-supported catalysts of Reference Example 20, prepared by submerged laser ablation, and Reference Comparative Example 12, prepared by ion-exchange/reduction.

FIG. 21 shows the evaluation results for the number of nitrogen monoxide molecules that could be reduced to nitrogen by one rhodium atom when the temperature was 250° C. during temperature decrease.

From FIG. 21 it is seen that with the supported catalyst of Reference Example 20 that was obtained by laser ablation, the number of nitrogen monoxide molecules that could be purified in 1 second by one rhodium atom exceeded 0.007, while the number did not reach 0.004 with the supported catalyst of Reference Comparative Example 12 that was obtained by ion-exchange/reduction. Therefore, the catalyst of Reference Example 20 which was obtained by submerged laser ablation clearly had superior low-temperature activity compared to the catalyst of Reference Comparative Example 12 which was obtained by ion-exchange/reduction.

Reference Examples 21 and 22 and Reference Comparative Example 13

In Reference Examples 21 and 22, submerged laser ablation was used to obtain a platinum cluster-supported catalyst and a rhodium cluster-supported catalyst, respectively. In Reference Comparative Example 13, a common three-way catalyst was used having platinum, rhodium and palladium supported on a mixed powder of alumina carrier particles and ceria/zirconia carrier particles.

Reference Example 21

For Reference Example 21, platinum clusters were supported on zeolite carrier particles by submerged laser ablation in the same manner as Reference Example 1, except that a platinum target was used instead of the gold target, and the zeolite carrier particles used were type ZSM-5 zeolite carrier particles (Si/Al ratio: 40). The loading mass of platinum with respect to the zeolite carrier particles was 0.59 mass %.

Reference Example 22

For Reference Example 22, rhodium clusters were supported on zeolite carrier particles by submerged laser ablation in the same manner as Reference Example 1, except that a rhodium target was used instead of the gold target, and the zeolite carrier particles used were type ZSM-5 zeolite carrier particles (Si/Al ratio: 40). The loading mass of rhodium with respect to the zeolite carrier particles was 0.1 mass %.

Reference Comparative Example 13

For Reference Comparative Example 13, a common three-way catalyst was used having platinum, rhodium and palladium supported on a mixed powder of alumina carrier particles and ceria/zirconia carrier particles. The loading masses of platinum, rhodium and palladium with respect to the carrier powder were 0.2 mass %, 0.19 mass % and 0.25 mass %, respectively.

<Evaluation: Oxygen Oxidation Reaction Test for Adsorbed Carbon Monoxide>

The catalysts of Reference Examples 21 and 22 and Reference Comparative Example 13 were held for 1 hour at 800° C. in an atmosphere containing 500 ppm by volume carbon monoxide and the remainder helium, adsorbing the carbon monoxide onto each supported catalyst, and then the carbon monoxide-adsorbed supported catalyst was heated to 800° C. at a temperature increase rate of 10° C./min in an atmosphere containing 10 vol % oxygen and the remainder helium, for an oxygen oxidation reaction test of the adsorbed carbon monoxide. The space velocity during the treatment was 10,000 $h^{-1}$.

The following treatments (i) to (iv) were carried out to wash the catalysts of Reference Examples 21 and 22 and Reference Comparative Example 13.

(i) The catalyst is placed in a 1 M sodium chloride aqueous solution at a concentration of 4 mass % and stirred at 80° C. for a period of 10 days, (ii) following (i), the catalyst is rinsed with ion-exchanged water, (iii) following (ii), the catalyst is placed at a concentration of 4 mass % in an aqueous solution containing 6 mass % polyoxyethylenesorbitan monolaurate, 0.25 M trisodium ethylenediaminetetraacetate and 0.01 M sodium borohydride, and stirred at 80° C. for a period of 10 days, and (iv) following (iii), the catalyst is rinsed with ion-exchanged water.

The washed catalysts of Reference Examples 21 and 22 and Reference Comparative Example 13 were subjected to an oxygen oxidation reaction test for adsorbed carbon monoxide, in the same manner as described above.

Figure 22:
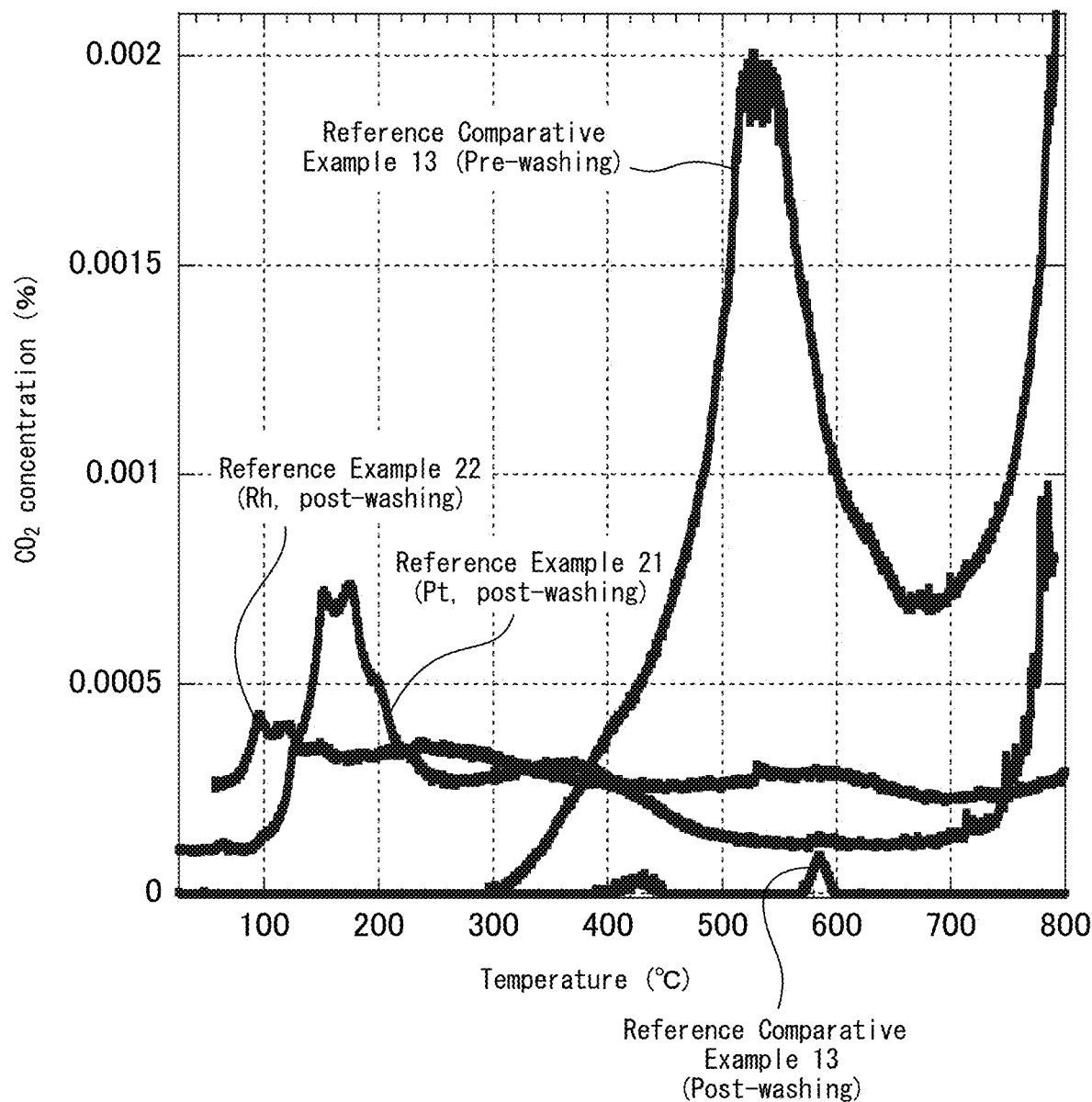
FIG. 22 is a graph showing the results of an oxygen oxidation reaction test of adsorbed carbon monoxide after washing treatment, for the platinum cluster-supported catalyst of Reference Example 21, prepared by submerged laser ablation, and the rhodium cluster-supported catalyst of Reference Example 22, prepared by submerged laser ablation, and an oxygen oxidation reaction test of adsorbed carbon monoxide before and after washing treatment, for a common three-way catalyst.

The results of the oxygen oxidation reaction test for adsorbed carbon monoxide before and after washing are shown in FIG. 22, for the catalysts of Reference Examples 21 and 22 and Reference Comparative Example 13.

As clearly seen from FIG. 22, with the catalysts of Reference Examples 21 and 22 which were obtained by submerged laser ablation, a signal was present at the low-temperature end below 200° C. after washing, whereas with the catalyst of Reference Comparative Example 13 which was a common three-way catalyst, the difference in the evaluation results before and after washing was large, and no signal was observed at the low-temperature end below 200° C.

This suggests that with the catalysts of Reference Examples 21 and 22 which were obtained by submerged laser ablation, the catalyst metal clusters were supported within the pores of the zeolite, such that the catalyst metal clusters were not lost even with washing, whereas with the common three-way catalyst, the catalyst metal particles were supported on the outer surfaces of the carrier particles, resulting in loss of the catalyst metal particle by washing.

REFERENCE SIGNS LIST

11 Dispersing medium
12 Catalyst metal or metal oxide target
13 Vessel
14 Lens
15 Laser
16 Cluster
18 Catalyst metal or metal oxide particle
20 Zeolite carrier particle

The invention claimed is:

1. A method for producing a cluster-supporting porous carrier, wherein:
   the cluster-supporting porous carrier has porous carrier particles and metal oxide clusters supported within the pores of the porous carrier particles, and
   the method for producing a cluster-supporting porous carrier includes the following steps:
   providing a dispersion containing a dispersing medium and porous carrier particles dispersed in the dispersing medium, and
   forming positively charged metal oxide clusters in the dispersion by plus-minus inversion or submerged reduction and supporting the metal oxide clusters within the pores of the porous carrier particles by electrostatic interaction,
   wherein the metal ion forming the metal oxide is reduced by submerged reduction using a reducing agent to form clusters in the dispersion, and the dispersion is irradiated with plasma and/or microwaves to accelerate reduction by the reducing agent, and
   the dispersing medium of the dispersion is an organic solvent having a dielectric constant of 30 or less.

2. The method according to claim 1, wherein the porous support particles are zeolite particles.

3. The method according to claim 1, wherein the metal oxide clusters are clusters of a base metal oxide or clusters of a complex metal oxide containing the base metal.

4. The method according to claim 3, wherein the metal oxide clusters are clusters of an oxide of a metal selected from the group consisting of cerium, zirconium, manganese, molybdenum, vanadium, aluminum and their combinations, or clusters of a complex oxide including such metals.

5. The method according to claim 4, wherein the metal oxide clusters are selected from the group consisting of ceria-zirconia complex oxide, alumina-ceria-zirconia complex oxide, ceria-zirconia-lanthanum oxide-yttrium oxide complex oxide and alumina-ceria-zirconia-lanthanum oxide-yttrium oxide complex oxide.

6. The method according to claim 1, which additionally has catalyst metal clusters supported within the pores of the porous carrier particle.

7. The method according to claim 6, wherein the catalyst metal clusters are selected from the group consisting of rhodium, palladium, platinum or copper clusters, and their combinations.

8. The method according to claim 6, wherein the catalyst metal clusters are positively charged, and are supported at the acid sites within the pores of the porous support particles by electrostatic interaction.

9. A method for producing a cluster-supporting porous support, wherein the method includes:
mixing the cluster-supporting porous support produced by the method according to claim 1 and a metal cluster-supporting porous support, wherein
the metal cluster-supporting porous support has porous support particles and catalyst metal clusters supported within the pores of the porous support particles.

\* \* \* \* \*